United States Patent
Takeda et al.

(10) Patent No.: US 6,178,244 B1
(45) Date of Patent: Jan. 23, 2001

(54) CRYPTOSYSTEM

(75) Inventors: Noriko Takeda; Seiichi Shinoda; Toshio Haseyama, all of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/775,292

(22) Filed: Dec. 31, 1996

(30) Foreign Application Priority Data

Jan. 12, 1996 (JP) .................................. 8-003997
Jul. 31, 1996 (JP) .................................. 8-202491

(51) Int. Cl.$^7$ ..................................... H04L 9/00
(52) U.S. Cl. .................... 380/277; 380/259; 380/283; 713/168
(58) Field of Search ...................... 380/25, 4, 23, 380/21, 18, 49, 258, 26; 375/2; 364/200; 340/149

(56) References Cited

U.S. PATENT DOCUMENTS

| | | |
|---|---|---|
| 4,227,253 | 10/1980 | Ehrsam et al. . |
| 5,222,136 | * 6/1993 | Rasmussen et al. ................. 380/9 |
| 5,568,554 | * 10/1996 | Eastlake ............................. 380/25 |
| 5,579,393 | * 11/1996 | Conner et al. ...................... 380/25 |

FOREIGN PATENT DOCUMENTS

| | | |
|---|---|---|
| 55-133177 | 10/1980 | (JP) . |
| 56-14280 | 2/1981 | (JP) . |
| 2-135937 | 5/1990 | (JP) . |
| 5-75595 | 3/1993 | (JP) . |
| 5-316098 | 11/1993 | (JP) . |
| 6-188878 | 7/1994 | (JP) . |

OTHER PUBLICATIONS

Toshikazu Yamaguchi et al., "An Implementation for LAN Cipher Communications and it's Evaluation," pp. 7–12, NTT Human Interface Laboratories, IEICE, OFS 93–38, Mar. 1994 (w/ English Translation).

IEEE Communications Magazine, Sep. 1994, vol. 32, No. 9, Kerbero, "An Authentication Service for Computer Networks".

* cited by examiner

Primary Examiner—Tod R. Swann
Assistant Examiner—Todd Jack
(74) Attorney, Agent, or Firm—Burns, Doane, Swecker & Mathis, LLP

(57) ABSTRACT

In a cryptosystem, communication terminals and encryptors can be grouped physically and logically. The communication mode can be switched by the encryptor between ciphertext communication and plaintext communication. The encryptor includes the session key memorizing unit for memorizing the session key and the mode switch for switching the communication mode between ciphertext communication and plaintext communication. The key manager distributes the session key generated by the session key generating unit and the valid/invalid information set by the valid/invalid setting unit to each encryptor. The valid/invalid judging unit judges whether the communication data should be sent in ciphertext or plaintext using the mode switch and the valid/invalid information.

20 Claims, 38 Drawing Sheets

Fig.7

| VAL/INV<br>MODE SW. | VALID(1) | INVALID(0) |
|---|---|---|
| OFF(0) | ENCRYPTION(0) | ENCRYPTION(0) |
| ON(1) | TRANSPARENT(1) | ENCRYPTION(0) |

BASIC PASS 1 : APP.(ALL) ,    - - - KEY A

SPE. PASS 0  : DEST. IP ADD. (ALL)
&
APP. (MAIL) ,    - - - TRANSPARENT

SPE. PASS 1  : DEST. IP ADD. (COM. TERM. 26)
&
APP. (AP 11)
&
DIRECTION (OUT) ,    - - - KEY B

811 : ENCRYPTION COND . MEM .

Fig.24

PORT 1
    B. PASS 1 : APP.(ALL) , --- KEY A

PORT 2
    B. PASS 2 : APP.(MAIL) , --- TRANSPARENT

S. PASS 1 : DEST. IP ADD. (COM. TERM. 26)
                & APP. (AP 11)
                & DIR. (OUT) , --- KEY B

PORT 3
    B. PASS 3 : APP.(AP22)
               & DIR. (IN) , --- KEY A

S. PASS 1 : DEST. IP ADD. (COM. TERM. 26)
                & APP. (AP 11)
                & DIR. (OUT) , --- KEY B

S. PASS 2 : DEST. IP ADD. (COM. TERM. 28)
                & APP. (SPPR) , --- KEY C

921: PORT COND. MEM.

Fig.36

| KEY No. | PER. FLAG | KEY | ATTRIBUTE |
|---|---|---|---|
| 1 | ○ | LOCAL KEY 1 | |
| 2 | ○ | LOCAL KEY 2 | |
| 3 | ○ | LOCAL KEY 3 | |
| 4 | ○ | LOCAL KEY 4 | |
| 5 | X | COMMON S. KEY 1 | COMMON(A,B) |
| ⋮ | ⋮ | | |
| 8 | X | COMMON S. KEY 2 | COMMON(A,B) |
| ⋮ | ⋮ | | |
| 30 | ○ | LOCAL KEY 28 | |
| 31 | ○ | LOCAL KEY 29 | |
| 32 | X | COMMON S. KEY 3 | COMMON(A,B) |

CRYPTOSYSTEM

BACKGROUND OF THE INVENTION

1. Field of the Invention

The present invention relates to a cipher communication in the communication network.

2. Description of the Related Art

One example of a conventional cipher communication system is disclosed in "Installment and evaluation of the LAN cipher communication system", OFS-38(1994-3) p. 7–p. 12, published by the Institute of Electronics, Information and Communication Engineers. This system is configured by a communication terminal and a key managing workstation, which include ciphertext communication boards and are connected to the Local Area Network ("LAN", hereinafter).

The above conventional cipher communication system is shown in FIG. 38.

Communication terminals 210 and 220 are connected to the LAN 10 through encryptors 410 and 420. 30 denotes a key manager.

The communication terminals respectively include applications 2110 and 2210, communication controlling units 2120 and 2220, and cipher communication controlling units 2130 and 2230. The key manager 30 includes a session key generating unit 310, a session key managing unit 320, a session key encrypting unit 340, a session key sending unit 350 and a session key enquiry receiving unit 360. The encryptors 410 and 420 respectively include session key decrypting units 4110 and 4210, user data encrypting/decrypting units 4130 and 4230, user data sending/receiving units 4140 and 4240, and session key enquiring units 4160 and 4260.

FIG. 39 shows a configuration of the session key enquiring unit 4160 in detail. The session key enquiring unit 4160 includes a session key memorizing unit 4161, a session key enquiry sending unit 4162, and a session key receiving unit 4163. The session key enquiring unit 4260 has the same configuration as the above session key enquiring unit 4160.

Data communication procedure will be explained in the following in the above conventional cipher communication system.

Both encryptors connected to the communication terminals have the common session key to encrypt/decrypt data for the cipher communication between two terminals. To have the common session keys in the encryptors, a procedure called "key distribution" is executed.

The cipher communication requires a key distribution procedure and a user data sending/receiving procedure. Conventionally, every sending/receiving procedure of user data has to follow the key distribution procedure in the cipher communication with an arbitrary partner.

In the following, the key distribution procedure is explained when the application 2110 of the communication terminal 210 communicates with the application 2210 of the communication terminal 220 connected through the LAN 10.

It is assumed that an address of the communication terminal 210, which sends data first, is "A" and the communication terminal 220 has an address "B".

FIG. 40 is a sequence chart showing a procedure of distributing the session key in the conventional cipher communication system.

When the application 2110 of the communication terminal 210 starts to communicate with the application 2210 of the communication terminal 220 connected through the LAN 10, the application 2110 activates the communication controlling unit 2120. The application 2110 sends information of the address "B" of the communication terminal 220 to the communication controlling unit 2120 as an address of the communicating partner.

The communication controlling unit 2120 stores the address "B" of the communication terminal 220 in storage (this is not shown in the figure) and sends information of the address "B" of the communication terminal 220 to the cipher communication controlling unit 2130.

The cipher communication controlling unit 2130 sends a requesting command of starting communication including the information of the address "B" to the encryptor 410. The requesting command of starting communication is sent to the session key enquiry sending unit 4162 of the session key enquiring unit 4160 of the encryptor 410.

The session key enquiry sending unit 4162 gets the information of the address "B" included in the above requesting command of starting communication. The session key enquiry sending unit 4162 generates a key distribution requesting command "KEYREQ" including the address "B" and sends the key distribution requesting command "KEYREQ" to the key manager 30 through the LAN 10 (see S13 in FIG. 40). The session key memorizing unit 4161 receives the information of the address "B" from the session key enquiry sending unit 4162 and memorizes the information of the address "B".

The key distribution requesting command "KEYREQ" received by the key manager 30 is sent to the session key enquiry receiving unit 360. The session key enquiry receiving unit 360 gets the address "A" of the instructing partner of the key distribution requesting command. The address "A" is defined as an address of a key distribution requesting partner. The session key enquiry receiving unit 360 also gets the address "B" from the information included in the key distribution requesting command "KEYREQ". The address "B" is defined as an address of a communicating partner and is sent to the session key managing unit 320.

The session key managing unit 320 stores a pair of the address "A" of the key distribution requesting partner and the address "B" of the communicating partner in the storage (not shown in the figure). The session key managing unit 320 also activates the session key generating unit 310.

When activated by the session key managing unit 320, the session key generating unit 310 generates a random number. This random number is sent to the session key managing unit 320 as a session key.

The session key managing unit 320 stores a pair of the above session key and the pair of the address "A" and the address "B" in the storage. The session key managing unit 320 also sends the session key to the session key encrypting unit 340.

The session key encrypting unit 340 encrypts the session key by a master key (key encryption key) and sends the encrypted result to the session key managing unit 320 as an encryption session key.

The session key managing unit 320 sends the encryption session key and the pair of the address "A", the address of the key distribution requesting partner, and the address "B", the address of the communicating partner, stored in the storage, to the session key sending unit 350.

The session key sending unit 350 generates a session key distributing command "KEYDIST" including the encryption session key and the address "B" of the communicating partner and sends "KEYDIST" to the encryptor 410 connected to the communication terminal 210 located in the address "A" of the key distribution requesting partner (see S14).

The session key distributing command "KEYDIST" received from the encryptor 410 is sent to the session key receiving unit 4163 of the session key enquiring unit 4160.

The session key receiving unit 4163 gets the encryption session key and the address "B" of the communicating partner from the session key distributing command "KEYDIST". The session key receiving unit 4163 stores the address "B" in the storage and sends the encryption session key to the session key decrypting unit 4110.

The session key decrypting unit 4110 decrypts the encryption session key by the preset master key. The decrypted result is sent to the session key receiving unit 4163 as the session key.

The session key receiving unit 4163 sends the session key to the session key memorizing unit 4161. The session key receiving unit 4163 also sends a session key acknowledging command "KEYDIST-ACK" to the key manager 30 (see S15). The session key memorizing unit 4161 memorizes the information of the address "B" of the communicating partner stored in the storage and the session key as a pair.

The session key acknowledging command "KEYDIST-ACK" received by the key manager 30 is sent to the session key sending unit 350. The address "A" the address of the command sending partner, is obtained from the command and stored in the storage as the address of the key distribution requesting partner. The address "A" is also sent to the session key managing unit 320.

The session key managing unit 320 checks the address of the key distribution requesting partner with the address of the key distribution requesting partner previously stored in the storage. Based on the above check result, a pair of information, that is, the address "B" of the communicating partner and the session key, corresponding to the address of the key distribution requesting partner, is selected. The address "B" is stored in the storage and the session key is also sent to the session key encrypting unit 340.

The session key encrypting unit 340 encrypts the session key by the preset master key and the encrypted result is sent to the session key managing unit 320 as the encryption session key.

The session key managing unit 320 sends a pair of information of the encryption session key and the address "B" of the communicating partner stored in the storage to the session key sending unit 350. The session key sending unit 350 generates the session key distributing command "KEYDIST" including the encryption session key and the address "A" of the key distribution requesting partner stored in the storage. The "KEYDIST" is sent to the encryptor 420 connected to the communication terminal located in the address "B" of the communicating partner (see S16).

The encryptor 420 executes the same operation as the above encryptor 410. The encryptor 420 generates and sends the session key acknowledging command "KEYDIST-ACK" to the key manager 30 (see S17).

The "KEYDIST-ACK" received by the key manager 30 is sent to the session key sending unit 350. The address "B" of command sending partner is got from the command and stored in the storage as the address of the communicating partner. The address "B" is also sent to the session key managing unit 320.

The session key managing unit 320 checks the above address of the communicating partner with the address of the communicating partner previously stored in the storage. Based on the above check result, the address "A" of the key distribution requesting partner, stored as a pair with the above matched address of the communicating partner, is selected and sent to the session key sending unit 350.

The session key sending unit 350 generates a communication starting command "START" including the address "B" of the communicating partner stored in the storage. This communication starting command "START" is sent to the encryptor 410 connected to the communication terminal located in the address "A" of the key distribution requesting partner (see S18).

The communication starting command "START" received by the encryptor 410 is sent to the user data sending/receiving unit 4140. The user data sending/receiving unit 4140 gets information of the address "B" of the communicating partner from the communication starting command "START" and stored in the storage. The user data sending/receiving unit 4140 also sends a key distribution recognizing command to the communication terminal 210.

The key distribution recognizing command is sent to the cipher communication controlling unit 2130 of the communication terminal 210. The cipher communication controlling unit 2130 gets information of the address "B" of the communicating partner included in the key distribution recognizing command. A pair of the obtained address as the address of the communicating partner and information showing "ON" of a communication starting flag is stored in the storage. A communication starting notice including the address of the communicating partner is sent to the communication controlling unit 2120.

The keys are distributed as described above and the encryptors 410 and 420 have the common session keys.

In the following, sending procedure of the user data will be explained in detail when the application 2110 of the communication terminal 210 communicates with the application 2210 of the communication terminal 220 connected through the LAN 10.

The application 2110 of the communication terminal 210 sends a pair of user data and the address "B" of the communication terminal 220 to the communication controlling unit 2120. The communication controlling unit 2120 sends the pair of user data and the address "B" of the communication terminal 220 to the encryptor 410.

The pair of the user data and the address "B" of the communication terminal 220 is sent to the user data sending/receiving unit 4140. The user data sending/receiving unit 4140 sends the pair of user data and the address "B" of the communication terminal 220 to the user data encrypting/decrypting unit 4130.

The user data encrypting/decrypting unit 4130 checks the address "B" of the communication terminal 220 with the address stored in the storage as a pair of the address and the session key. The user data encrypting/decrypting unit 4130 encrypts the user data using the session key stored as a pair with the address "B" of the communicating partner. A pair of the encrypted user data and the address of the communicating partner is sent to the user data sending/receiving unit 4140.

The user data sending/receiving unit 4140 generates a user data sending command including the encrypted user data from the pair of the encrypted user data and the address "B" of the communicating partner and sends the user data sending command to the encryptor 420.

The user data sending command received by the encryptor 420 is sent to the user data sending/receiving unit 4240. The user data sending/receiving unit 4240 gets information of the encrypted user data and the address "A" of the communicating partner included in the user data sending command. The user data sending/receiving unit 4240 sends a pair of the encrypted user data and the address "A" to the user data encrypting/decrypting unit 4230.

The user data encrypting/decrypting unit 4230 checks the address "A" of the communicating partner with the address of the pair of the address and the session key stored in the storage. The user data encrypting/decrypting unit 4230 decrypts the encrypted user data using the paired session key stored with the address "A". A pair of the decrypted result of user data and the address of the communicating partner is sent to the user data sending/receiving unit 4240.

The user data sending/receiving unit 4240 sends the pair of the user data and the address to the communication terminal 220. The pair of the user data and the address received by the communication terminal 220 is further sent to the communication controlling unit 2220. The communication controlling unit 2220 sends the pair of the user data and the address to the application 2210.

In the conventional cipher communication system, every sending/receiving of user data should be preceded by the key distribution on communicating with an arbitrary partner as described above. The information of the encryption key should be registered for each communicating partner. An extra unit of the cipher communication controlling unit should be included in the communication terminal to utilize the cipher.

As another example of conventional cipher communication system, "Common operation key setting device for an encryptor" for a plurality of domains of data communication network is disclosed in the Japanese unexamined patent publication No. SH054-93937, (corresponding U.S. patent application: U.S. Ser. No. 857,531 filed on Dec. 5, 1977, issued Oct. 7, 1980 as U.S. Pat. No. 4,227,253).

In the conventional cipher communication system, the communication terminal has to request the session key from the key manager for each communicating partner. The session key is distributed to the communication terminal from the key manager prior to starting the communication. In the conventional cipher communication system, it has not been considered a case that a plurality of communication terminals located in the same location are bound as a group.

Another problem is that the communication terminals connected to the encryptors cannot send/receive plaintext (unencrypted text) such as electronic mail, etc.

Another problem is that it is impossible to choose the communication mode between plaintext and ciphertext depending on the communication terminal, application or communicating direction. It is also impossible to encrypt data using an arbitrary key selected from a plurality of keys.

Another problem is that data cannot be encrypted under various condition being different for each communication terminal, when a plurality of communication terminals are connected to one encryptor.

In Japanese unexamined patent publication No. SH054-93937, a common encryption key can be set for encrypting data among plural domains, however, it is not disclosed a case that the cipher communication can be performed using the common encryption key in a plurality of overlapped groups.

SUMMARY OF THE INVENTION

The present invention is provided to solve the above problems. The invention provides a cryptosystem where a plurality of physical groups is formed by communication terminals performing cipher data communication on one network.

The invention also provides a cryptosystem which enables an arbitrary encryptor to switch the communication mode between ciphertext communication and plaintext communication.

Further, an object of the invention is to provide a cryptosystem where a plurality of overlapped logical groups can be formed on one network or among a plurality of domains.

A cryptosystem according to the present invention includes:

a plurality of groups of communication terminals;

a plurality of encryptors, each of which corresponds to at least one of communication terminals, and each of which comprises:

(a) a session key memorizing unit for memorizing at least one session key for encrypting/decrypting communication data sent/received by the communication terminal which belongs to each of the plurality of groups;

(b) a cipher processing unit for encrypting/decrypting the communication data using the session key; and (c) a data sending/receiving unit for sending/receiving the communication data processed by the cipher processing unit.

According to the invention, a cryptosystem includes a plurality of cipher managing domains, each of which includes one of a plurality of key managers, at least one encryptor and at least one communication terminal. In the cryptosystem, each of the plurality of key managers includes a session key generating unit for generating a session key to be used for its own cipher managing domain. And in the cryptosystem, one of the session key generating unit of the plurality of key managers generates a common session key for the other key managers to be used for ciphertext communication among the plurality of cipher managing domains.

BRIEF EXPLANATION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 7 shows AND results of the information of the mode switch and the valid/invalid information in the cryptosystem of FIG. 2;

FIG. 24 shows an example of the port condition to be memorized in the port condition memorizing unit shown in FIG. 22;

FIG. 36 shows the session key table shown in FIG. 35;

DESCRIPTION OF PREFERRED EMBODIMENT

Embodiment 1

In a first embodiment of the invention, a cryptosystem will be described, where each encryptor memorizes one session key and the communication mode can be switched between ciphertext communication and plaintext communication (unencrypted communication).

Figure 1:
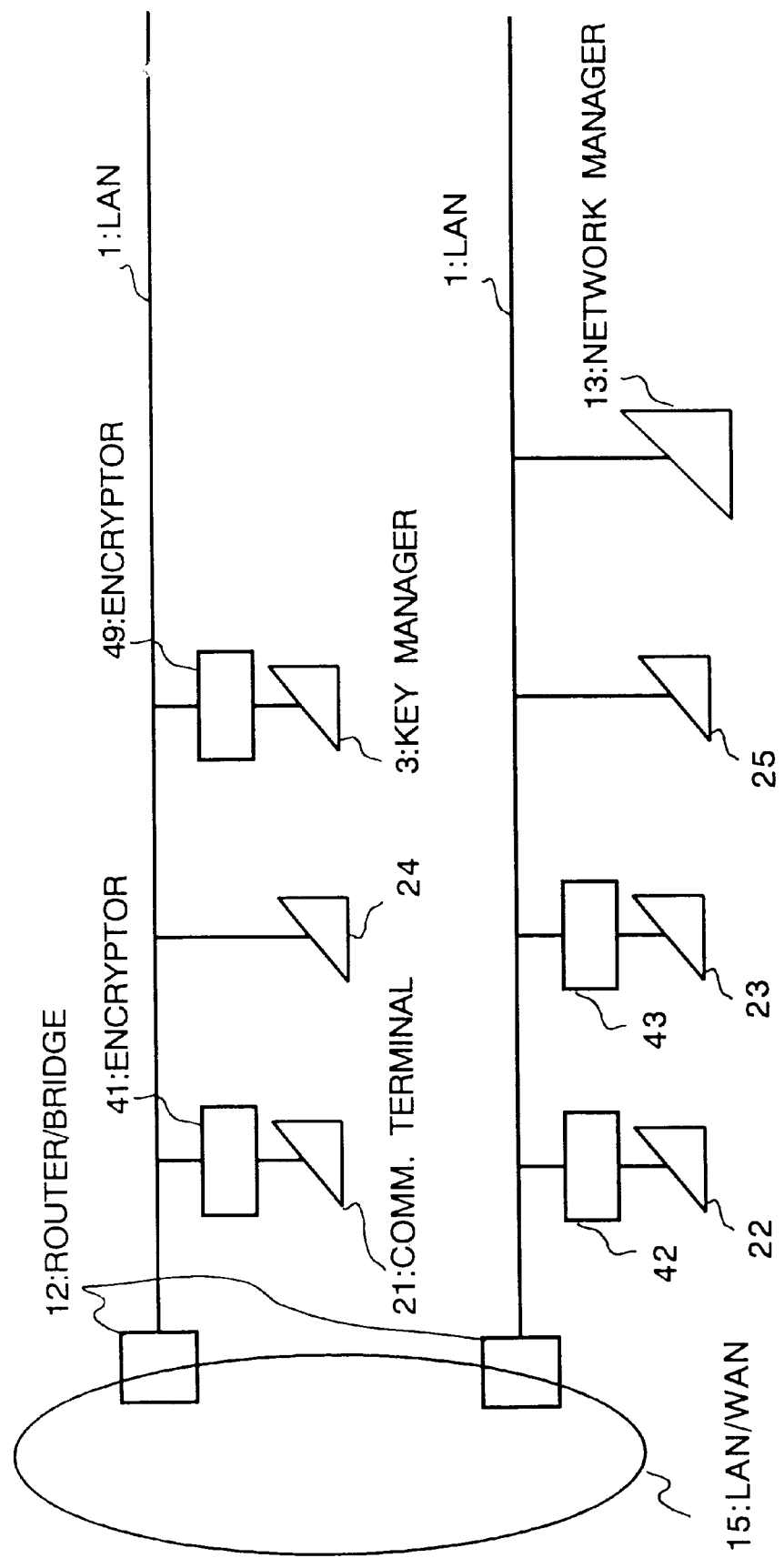
FIG. 1 shows an example of a network system according to the first embodiment of the invention.

FIG. 1 shows an example of a network system according to the first embodiment of the invention.

This network system includes two LANs (Local Area Networks) connected to LAN/WAN (Wide Area Network) 15 via a router/bridge (a router or a bridge) 12. A key manager 3 is connected to the LAN 1 via an encryptor 49. Communication terminals (communication apparatuses) 21, 22, 23 are respectively connected to the LAN 1 via encryptors 41, 42, 43. Communication terminals 24, 25 are directly connected to the LAN 1 without any intervening encryptors. Further, a network manager 13 is connected to the LAN 1.

In the example shown in FIG. 1, the encryptor 49 is connected to the key manager 3 and it is assumed that the key manager 3 and other communication terminals form a group. The network can be configured in various ways, for example, the encryptor 49 may not be connected to the key manager 3, or another example, a plurality of communication terminals may be connected to one encryptor.

Each of the encryptors 41–43 is located between the LAN 1 and each of the communication terminals 21–23 for encrypting/decrypting data, which prevents the communication data on the LAN 1 from being intercepted. User data is encrypted by a specific secret key encryption method, which operates fast and is highly concealable. Data should be encrypted on the network from the encryptor of the sending partner to the encryptor of the receiving partner.

The key manager 3 distributes session keys to the encryptors for encrypting data and observes the encryptors 41–43.

Figure 2:
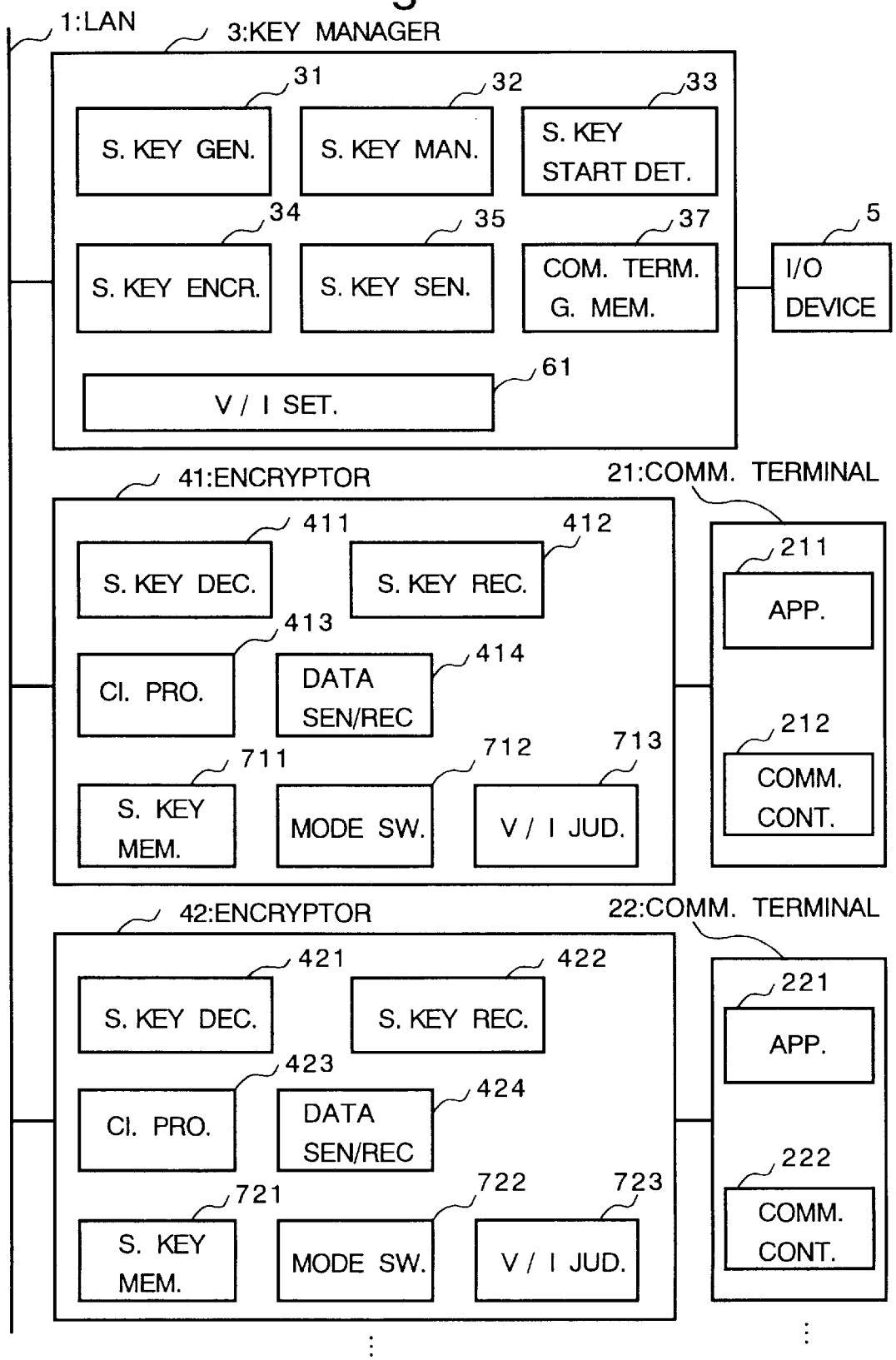
FIG. 2 is a block diagram showing a cryptosystem according to the first embodiment of the invention.

FIG. 2 is a block diagram showing the cryptosystem according to the first embodiment.

As shown in FIG. 2, the key manager 3 and the encryptors 41, 42, . . . are connected to the LAN 1. An input/output device 5 is connected to the key manager 3. The communication terminals 21, 22, . . . are connected to the encryptors 41, 42, . . . In the figure, only two encryptors 41 and 42, and only two communication terminals 21 and 22 are shown, while further more encryptors and communication terminals are used in an actual case. To facilitate an explanation of the operation of the system, an encryptor is not connected to the key manager 3 in the example shown in the figure, and one encryptor is connected to one communication terminal.

The communication terminals 21 and 22 respectively include applications 211 and 221, communication controllers 212 and 222.

The key manager 3 includes a session key generating unit 31, a session key managing unit 32, a session key start detecting unit 33, a session key encrypting unit 34, a session key sending unit 35, a communication terminal group memorizing unit 37 and a valid/invalid setting unit 61. The session key generating unit 31 generates a session key for encrypting data. The session key encrypting unit 34 encrypts the session key, generated by the session key generating unit 31, by a key encryption key. The session key sending unit 35 sends an encrypted session key to each encryptor. The communication terminal group memorizing unit 37 memorizes grouped communication terminals. The valid/invalid setting unit 61 sets information showing validity/invalidity of the mode switch of the encryptor for each of the encryptors. The valid/invalid setting unit 61 sends the information to the corresponding encryptor.

The encryptors 41 and 42 respectively include session key decrypting units 411 and 421, session key receiving units 412 and 422, cipher processing units 413 and 423, data sending/receiving units 414 and 424. session key memorizing units 711 and 721, mode switches 712 and 722, and valid/invalid judging units 713 and 723. The session key receiving units 412 and 422 receive the encrypted session key sent from the key manager 3. The session key decrypting units 411 and 421 decrypt the encrypted session key received by the session key receiving units 412 and 422 with the key encryption key, being specific for each encryptor. The cipher processing units 413 and 423 encrypt/decrypt communication data by the session key. The data sending/receiving units 414 and 424 sends/receive the communication data processed by the cipher processing units 413 and 423. The session key memorizing units 711 and 721 memorize at least one session key for encrypting/decrypting communication data. The mode switches 712 and 722 set the communication mode between ciphertext communication or plaintext communication in the cryptosystem. The valid/invalid judging units 713 and 723 judge and determine the communication mode between ciphertext communication and plaintext communication based on the set of the mode switches 712 and 722 and the valid/invalid information sent by the key manager 3.

The following will explain the session key and the key encryption key.

The session key is used for encrypting user data, whereas the key encryption key encrypts the session key. The key encryption key is used for distributing the session keys to each encryptor from the key manager 3 without being intercepted by a third party. The session key encrypting unit 34 of the key manager 3 encrypts the session key with the key encryption key. The session key decrypting units 411 and 421 of the encryptors 41 and 42 decrypt the encrypted session key with the key encryption key. Each key encryption key differs for each encryptor.

Setting the key encryption key is performed without passing through the communication line.

Setting procedure of the key encryption key will be explained below.

1. The key manager 3 generates a key encryption key, which is different for each encryptor.

2. A key encryption key setting command is input from a local console connected to the encryptor to change the mode into key inputting mode.

3. The key encryption key generated by the key manager is manually input from the local console of the encryptor.

4. The encryptor is powered OFF and then powered ON.

The session key is used for encrypting/decrypting the user data. The session keys for the encryptors belonging to the same group of the encryptors are all the same. However, by providing a plurality of the session keys, it is possible to make overlapped logical groups of a plurality of the encryptors (this is explained later).

Setting the session key is performed ON-LINE.

The following is setting procedure of the session key by a request of the encryptor.

1. The key manager 3 generates a session key.

2. The session key is encrypted by the key encryption key, being different for each encryptor.

3. When the encryptor is powered ON, a command requesting the sending of the session key is automatically output to the key manager 3 from the encryptor.

4. The encrypted session key is sent to the requesting encryptor from the key manager 3.

In the following, another setting procedure of the session key will be explained in case the session key is set by an instruction of a key managing person.

1. The key manager 3 generates a session key.

2. The session key is encrypted by the key encryption key, which is different for each encryptor.

3. The extent of the encryptors for sending the generated session keys is decided by the instruction of the key managing person. The instruction can be manually input previously or whenever it is needed. Four kinds of the extent of the encryptors can be considered as follows:

(1) All the encryptors being powered ON when the key manager 3 previously observes the status of the encryptors.

(2) All the encryptors being powered ON when the key manager 3 previously observes the status of the encryptors, and belonging to a predetermined group.

(3) Predetermined encryptors.

(4) All the encryptors.

4. The encrypted session keys are distributed to all the encryptors included in the extent determined at the above step.

Another setting procedure of the session keys will be explained below referring to FIG. 2. In this case, a timer is provided in the key manager 3 to automatically generate the session key when a predetermined time period has passed and the session key is distributed to each of the encryptors belonging to the same group.

The session key is distributed to each of the encryptors belonging to the same group connected to the LAN 1 from the key manager 3 every predetermined time period. And the session keys previously set in the encryptors are immediately updated by the newly distributed session keys.

The communication terminals 21 and 22, and the encryptors 41 and 42 are grouped as "group A" and the group A is registered in the communication terminal group memorizing unit 37. The timer corresponding to the group A is included in the session key start detecting unit 33 of the key manager 3.

The cipher communication requires the key distributing procedure and the actual sending/receiving procedure of user data. In this embodiment, these two procedures can be executed respectively.

Figure 3:
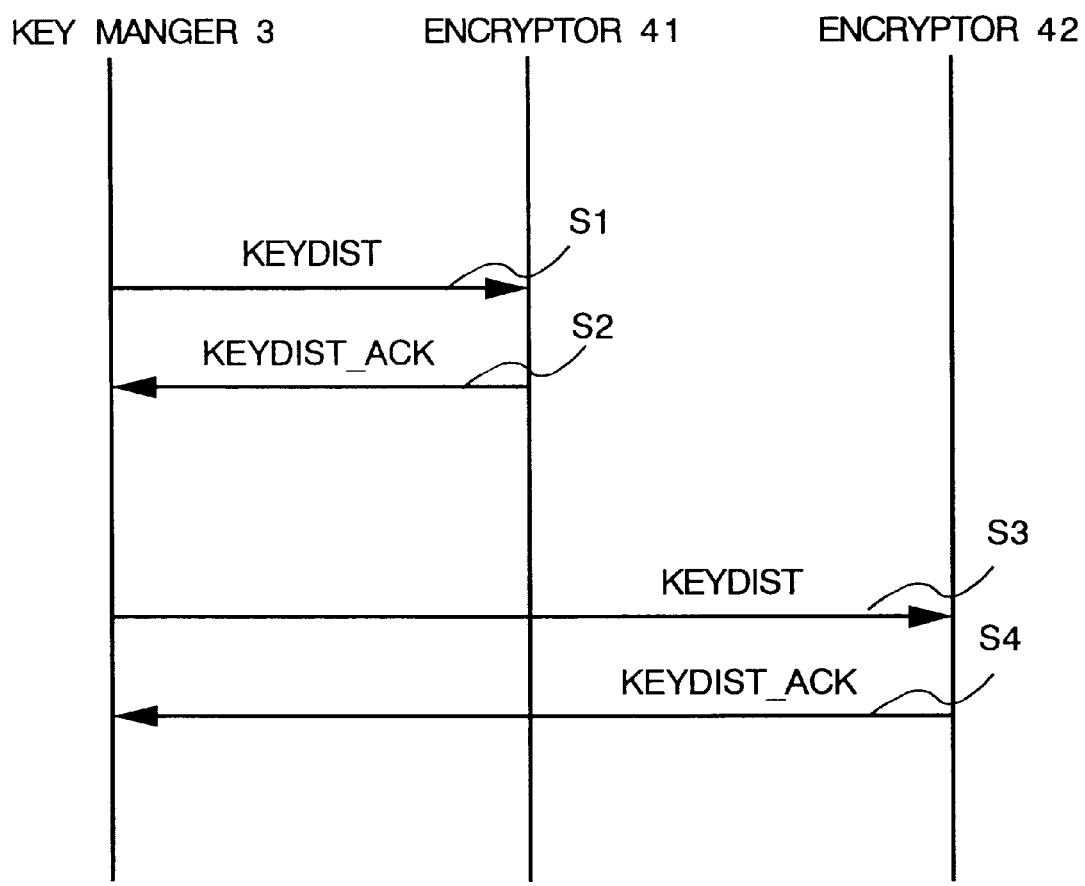
FIG. 3 is a sequence chart showing the distributing procedure of the session key in the cryptosystem of FIG. 2.

FIG. 3 is a sequence chart showing the distributing procedure of the session key.

In the figure, S1 shows the session key distributing command "KEYDIST" from the key manager 3 to the encryptors 41, S2 shows the session key acknowledging command "KEYDIST-ACK" from the encryptor 41 to the key manager 3. S3 shows the session key distributing command "KEYDIST" from the key manager 3 to the encryptor 42 and S4 shows the session key acknowledging command "KEYDIST-ACK" from the encryptor 42 to the key manager 3.

(step 1-1) When the timer corresponding to the group A included in the session key start detecting unit 33 of the key manager 3 reaches timeout, the session key start detecting signal is generated and sent to the session key managing unit 32 by the session key start detecting unit 33.

(step 1-2) The session key managing unit 32 activates the session key generating unit 31 on receiving the session key start detecting signal.

(step 1-3) On activation by the session key managing unit 32, the session key generating unit 31 generates a random number and sends the random number as a session key to the session key managing unit 32.

(step 1-4) The session key managing unit 32 stores the above session key in the storage as the session key for the group A. The session key managing unit 32 searches the encryptor corresponding to the group A from the communication terminal group memorizing unit 37 and finds the encryptor 41. The session key managing unit 32 sends the session key to the session key encrypting unit 34 and informs of encryption of the key for the encryptor 41.

(step 1-5) The session key encrypting unit 34 encrypts the session key with the key encryption key corresponding to the encryptor 41. The encrypted result is sent to the session key managing unit 32 as the encrypted session key.

(step 1-6) The session key managing unit 32 sends the above encrypted session key and the address of the encryptor 41 to the session key sending unit 35.

(step 1-7) The session key sending unit 35 generates the session key distributing command "KEYDIST" including the encrypted session key to store in the storage. The session key sending unit 35 sends the above session key distributing command "KEYDIST" to the encryptor 41 located in the received address (see S1 in FIG. 3).

(step 1-8) The session key receiving unit 412 of the encryptor 41 receives the session key distributing command "KEYDIST".

(step 1-9) The session key receiving unit 412 extracts the data portion including the encrypted session key from the session key distributing command "KEYDIST" and sends the data portion to the session key decrypting unit 411.

(step 1-10) The session key decrypting unit 411 decrypts the data portion including the encrypted session key with the key encryption key, which has been preset in the encryptor 41 by some other way as described before. The decrypted result is sent to the session key receiving unit 412 as the session key.

(step 1-11) The session key receiving unit 412 sends the session key acknowledging command "KEYDIST-ACK" to the key manager 3 (see S2). The session key is also memorized in the session key memorizing unit 711.

(step 1-12) The session key acknowledging command "KEYDIST-ACK", received by the key manager 3 from the encryptor 41, is sent to the session key sending unit 35. The session key sending unit 35 informs the session key managing unit 32 of completion of distributing the session key to the encryptor 41. The session key managing unit 32 sends the session key for the group A to the session key encrypting unit 34 and informs of encryption for the encryptor 42.

(step 1-13) The session key encrypting unit 34 encrypts the session key for the encryptor 42 in the same way as the above step (step 1-5). The session key sending unit 35 generates the session key distributing command "KEYDIST" including the above encrypted session key and sends the session key distributing command to the encryptor 42 (see S3).

(step 1-14) The above session key distributing command is received by the session key receiving unit 422 of the encryptor 42.

(step 1-15) The session key receiving unit 422 extracts the encrypted session key from the session key distributing command and sends the encrypted session key to the session key decrypting unit 421.

(step 1-16) The session key decrypting unit 421 decrypts the encrypted session key with the key encryption key, which has been preset by some other way. The decrypted result is sent to the session key receiving unit 422 as the session key.

(step 1-17) The session key receiving unit 422 sends the session key acknowledging command "KEYDIST-ACK" to the key manager 3 (see S4). The session key is also memorized in the session key memorizing unit 721.

(step 1-18) The session key acknowledging command "KEYDIST-ACK" received by the key manager 3 is further sent to the session key sending unit 35.

(step 1-19) The session key sending unit 35 informs the session key managing unit 32 of completion of distributing the session key to the encryptor 42. The session key managing unit 32 recognizes completion of distributing the session keys to the communication terminals included in the group A because no other encryptor belongs to the group A.

By the above procedure, the encryptors 41 and 42. belonging to the same group, have the common session keys.

Then, the application 211 of the communication terminal 21 starts to communicate with the application 221 of the communication terminal 22 connected through the LAN 1. The user data of the application 211 is encrypted by the cipher processing unit 413 of the encryptor 41, decrypted by the cipher processing unit 423 of the encryptor 42, and sent to the application 221.

For another example, the session key start detecting signal, which is generated by the session key start detecting unit 33 when the timer reaches timeout in the above procedure, can be generated by a manual input by the key managing person of the key manager 3.

Further, the session key start detecting signal, which is generated by the session key start detecting unit 33 in the above procedure, can be generated by detecting a power ON of the encryptor.

In the above key distributing procedure, the keys are distributed to two encryptors. The keys can be distributed to an arbitrary numbers of the encryptors belonging to the same group.

In the above key distributing procedure, the session key is updated right after receiving the session key. However, the session key can be updated when the communication is interrupted. Further, the session key can be updated when a predetermined time period has passed after receiving the session key.

In the following, switching the communication mode between ciphertext communication and plaintext communication, which is an important feature of this embodiment, will be explained.

Figure 4:
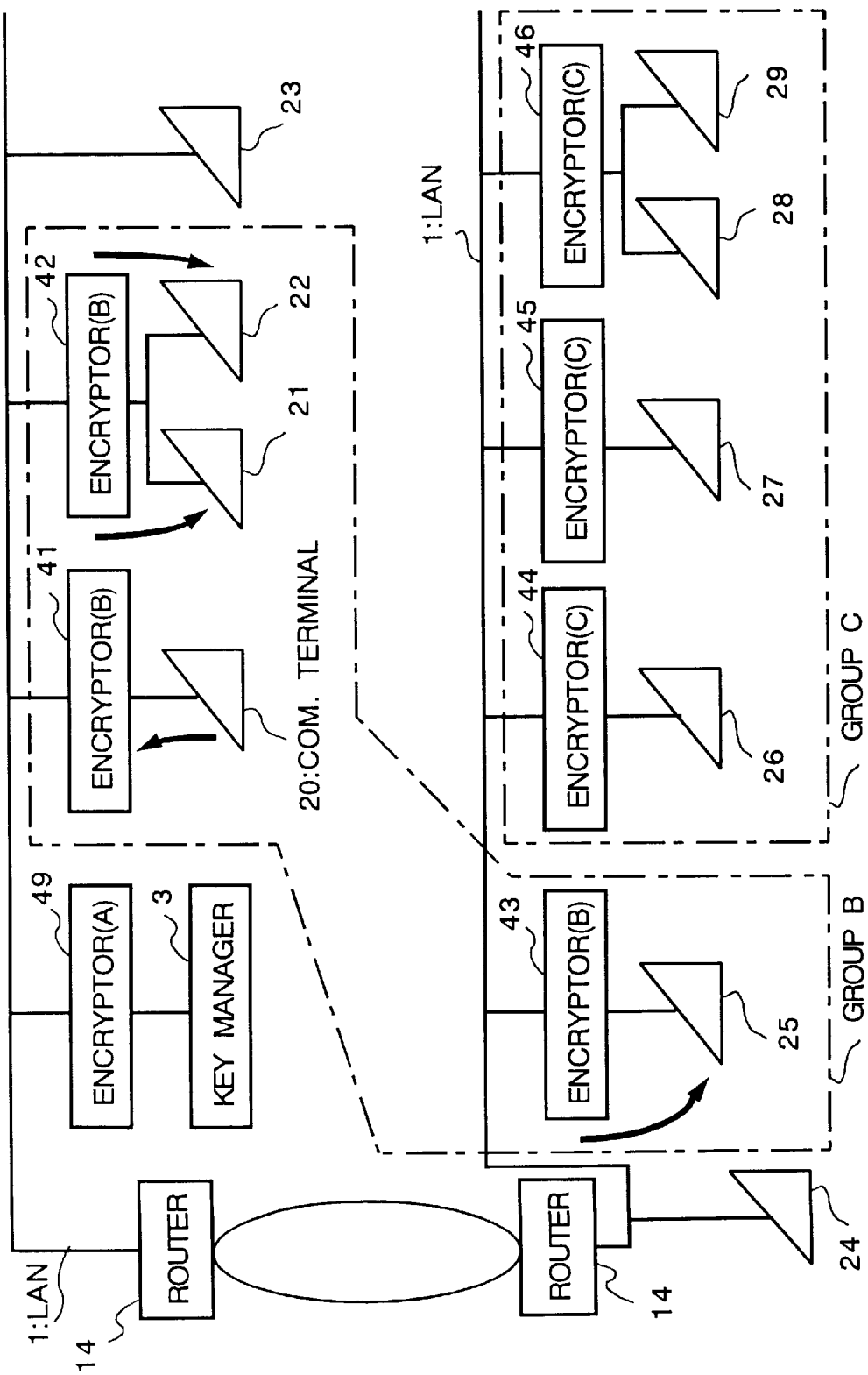
FIG. 4 shows an example of grouping in the cryptosystem of FIG. 2.

FIG. 4 shows an example of grouping in the cryptosystem.

The key manager 3 is connected to the LAN 1 via the encryptor 49. The communication terminals 20–22. 25–29 are connected to the LAN 1 via the encryptors 41–46. The communication terminals 21 and 22 are connected to the same encryptor 42. The communication terminals 28 and 29 are connected to the same encryptor 46. The communication terminals 23 and 24 are directly connected to the LAN 1 without any intervening encryptors.

The key manager 3 and the encryptor 49 belong to the group A. The encryptors 41–43 and the communication terminals 20–22, 25 belong to "group B". The encryptors 44–46 and the communication terminals 26–29 belong to "group C". These groups are memorized by the communication terminal group memorizing unit 37. It is assumed that user data sent from the communication terminal 20 is encrypted by the encryptor 41. The encrypted data can be received by the communication terminals 21, 22 and 25. The communication terminals 23 and 24, which are connected without intervening encryptors, and the communication terminals 26–29 belonging to the group C cannot decrypt the encrypted data, thus cannot receive the data.

In this way, the communication terminals, which are connected to the encryptors belonging to the same cipher group, can mutually communicate in ciphertext easily as if in plaintext. In contrast, the communication terminals, connected to the encryptors belonging to a different cipher group or the communication terminals connected without intervening encryptors, cannot decrypt the ciphertext data, thus cannot intercept the communication data even if the encrypted data is received by such communication terminals. If the encryptor itself is stolen by a third party, it is impossible to know which group the encryptor belongs to based on the encryptor itself, thus the third party cannot pretend to be a communicating partner.

However, when one communication terminal wants to communicate with a communication terminal belonging to a different cipher group or a communication terminal connected without intervening encryptors, the communication terminal has to suspend the encryption/decryption of the communication data by the encryptors. To switch the communication mode between ciphertext communication and plaintext communication is performed by switching ON/OFF the mode switch provided in the encryptors 41, 42, . . . When the mode switches 712, 722, . . . are turned ON, plaintext communication is performed. While, the mode switches 712, 722 . . . are turned OFF, cipher communication is performed. It is not preferable for communication security that the communication mode can be simply changed between ciphertext communication and plaintext communication only by turning ON/OFF the mode switch because the encryptor may be freely accessed by the user of the communication terminal. Accordingly, in the cryptosystem of the present invention, the key manager sets valid/invalid information which indicates the validity/invalidity of the switch setting of the mode switch for each of the encryptors. Accordingly, the key manager can control the encryptor, which switches the communication mode between plaintext communication and ciphertext communication.

Figure 5:
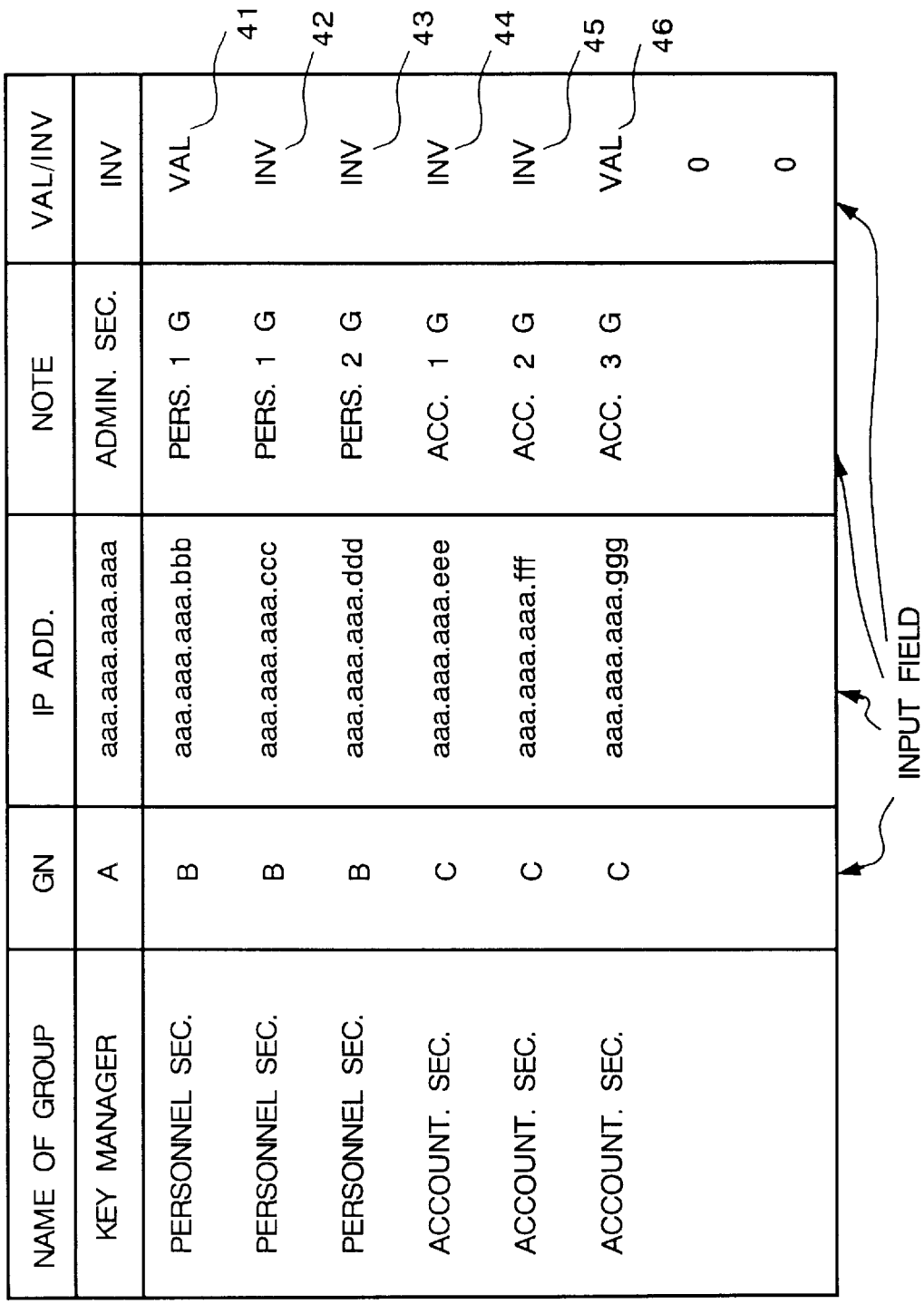
FIG. 5 shows an example of a screen for setting a valid/invalid information in the encrypting system.

FIG. 5 shows an example of a screen for inputting the valid/invalid information set by the key manager 3. The valid/invalid setting unit 61 displays the screen and executes the following operation.

Data is input at input fields. The data of a group number (GN), an IP address, a note, and the valid/invalid information is input to the input fields. A name of each group is automatically displayed on the screen when the group number (GN) is input. "0" (invalid) is preset as the valid/invalid information. Inputting "1" changes the valid/invalid information to valid. In the displayed data, the first line corresponds to the encryptor 49, and the second to the seventh lines respectively correspond to the encryptors 41–46. In the example of FIG. 5, the valid/invalid information of the encryptors 41 and 46 is valid. "Valid" means that the mode switch of the corresponding encryptor is valid. While, "invalid" means that the mode switch of the corresponding encryptor is invalid even if the switch is changed.

When the key manager 3 sends the encrypted session key to each encryptor with "KEYDIST" command, the valid/invalid information is appended to the command.

Figure 6:
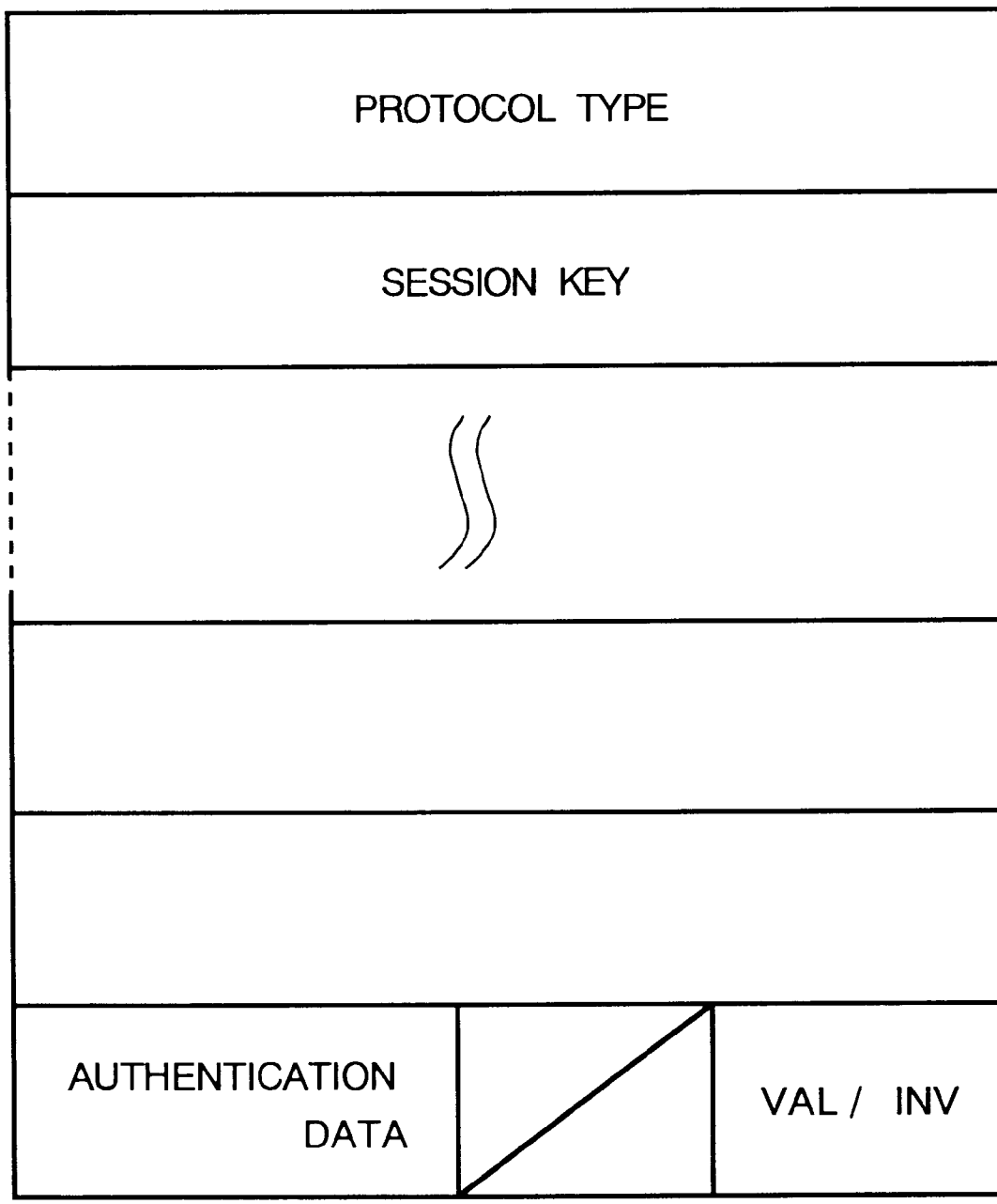
FIG. 6 shows the contents of the "KEYDIST" command.

FIG. 6 shows the contents of the "KEYDIST" command.

In FIG. 6, "protocol type" shows a type of communication protocol. "Authentication data" is a fixed pattern for checking whether the encrypted data is decrypted or not by the encryptors, to which the command is distributed. When a predefined part of the data decrypted by the encryptor, to which the command is distributed, is matched with the fixed pattern, the encryptor, to which the command is distributed, can know that the decryption is properly executed. The valid/invalid information, in which "1" shows valid and "0" shows invalid, is appended to the last bit.

"0" is set for other parts having no data in the contents of the "KEYDIST" command. The contents of the "KEYDIST" command is encrypted by the key encryption key and the encrypted result is sent.

The valid/invalid setting unit 61 of the key manger 3 sends the valid/invalid information set by the input screen to the session key sending unit 35, which generates the session key distributing command "KEYDIST". The session key sending unit 35 generates "KEYDIST" command with the valid/invalid information appended to the last bit as shown in FIG. 6.

In the encryptor 41, for example, the session key receiving unit 412 receives the "KEYDIST" command and sends the command to the session key decrypting unit 411. The session key is decrypted by the session key decrypting unit 411 and the decrypted result is sent to the session key receiving unit 412. The session key receiving unit 412 extracts the valid/invalid information from the contents of the decrypted "KEYDIST" command and sends the command to the valid/invalid judging unit 713. The valid/invalid judging unit 713 judges whether the communication is performed by ciphertext communication or plaintext communication based on an AND result of ON/OFF of the mode switch 712 and the valid/invalid information.

FIG. 7 shows AND results of the mode switch and the valid/invalid information.

OFF of the mode switch is logically (0), and ON is (1). "Valid" of the valid/invalid information is logically (1), and "invalid" is (0). Accordingly, when two pieces of information are ANDed, only when the mode switch is ON and also the valid/invalid information is valid, the AND result shows (1), that is, user data should be transmitted transparently without encryption. In the other cases, user data should be encrypted regardless of the value of the mode switch. The "transparent" means to perform plaintext communication.

Figure 8:
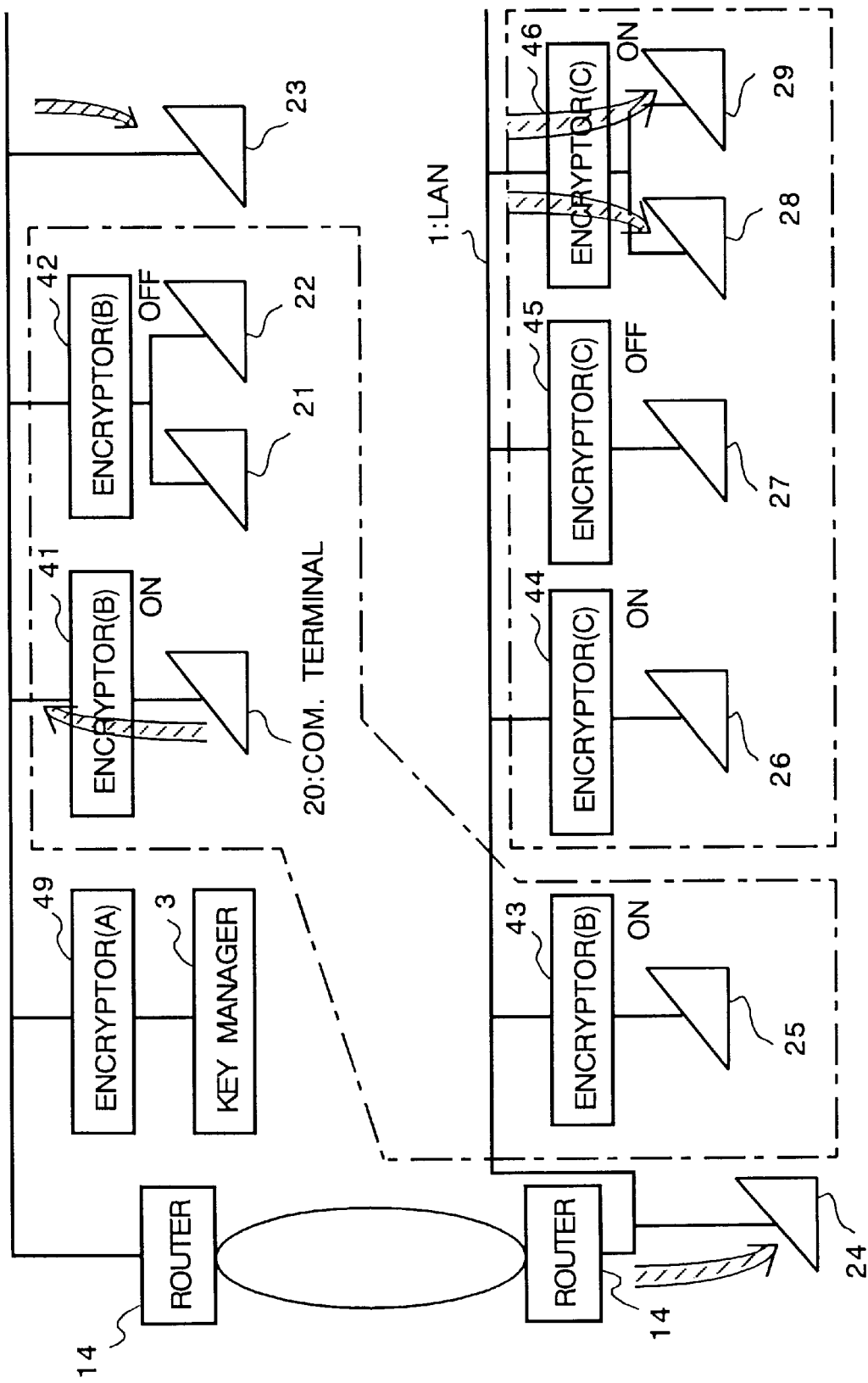
FIG. 8 shows a flow of the communication data in plaintext after switching the mode switch and setting the valid/invalid information in the cryptosystem of FIG. 4.

FIG. 8 shows plaintext communication in the cryptosystem, where the encryptors are grouped as shown in FIG. 4.

As shown in the figure, the mode switches of the encryptors 41, 43, 44 and 46 are turned ON. Namely, these encryptors have switched their mode to plaintext communication. However, in the valid/invalid information of the key manager 3, only the information for the encryptors 41 and 46 is valid as shown in FIG. 5. Accordingly, user data from the communication terminal 20 is sent in plaintext without being encrypted by the encryptor 41. This plaintext can be received by the communication terminals 23 and 24, where the encryptors are not provided. As the mode switch of the encryptor 46 is ON and the valid/invalid information shows "valid", the communication data from the communication terminal 20 is not decrypted by the encryptor 46. The communication terminals 28 and 29 receive the plaintext data sent from the communication terminal 20. The encryptors 43 and 44 cannot receive the plaintext data because the valid/invalid information show "invalid", though each of the mode switches is ON.

The encryptor 41 belongs to the group B and the encryptor 46 belongs to the group C. The plaintext communication enables a plurality of communication terminals to mutually communicate even if some of the plurality of communication terminals are not connected to any encryptors or some of the communication terminals belong to different groups.

As has been described, in the cryptosystem of this embodiment, the encryptors of the same group have the same session keys, which prevents mutual communication among the communication terminals belonging to the different groups. This system further prevents an intercept of data on the network. The communication mode can be switched between ciphertext communication and plaintext communication by the instruction of the key manager or the encryptor itself. This enables the cryptosystem to be more flexible, that is, in the cryptosystem, the communication terminal can communicate with the communication terminal belonging to a different group or with the communication terminal connected without through any encryptors. Further, the embodiment provides a cryptosystem having good security because the key manager can control all the mode switches of the encryptors when the mode switches of the encryptors set the communication mode between ciphertext communication and plaintext communication.

In the block diagram of FIG. 2, the mode switches 712 and 722 can be removed from the encryptors 41 and 42. In this case, the key manager 3 directly sets the communication mode to the encryptors 41 and 42. The encryptor 41, which is set as valid by the valid/invalid setting unit 61 of the key manager 3, always performs plaintext communication. And the encryptor 42, which is set as invalid by the valid/invalid setting unit 61 of the key manager 3, performs ciphertext communication. The valid/invalid information set by the valid/invalid setting unit 61 is sent to the valid/invalid judging units 713 and 723. It is judged whether the communication should be performed in ciphertext or plaintext by the valid/invalid judging unit of each encryptor.

In another way, in the cryptosystem shown in the block diagram of FIG. 2, the valid/invalid setting unit 61 and the valid/invalid judging units 713, 723 of the encryptors 41, 42 can be removed from the system. In this case, the communication mode is determined only by ON/OFF of the mode switches 712, 722 of the encryptors 41, 42 between ciphertext communication and plaintext communication.

Figure 9:
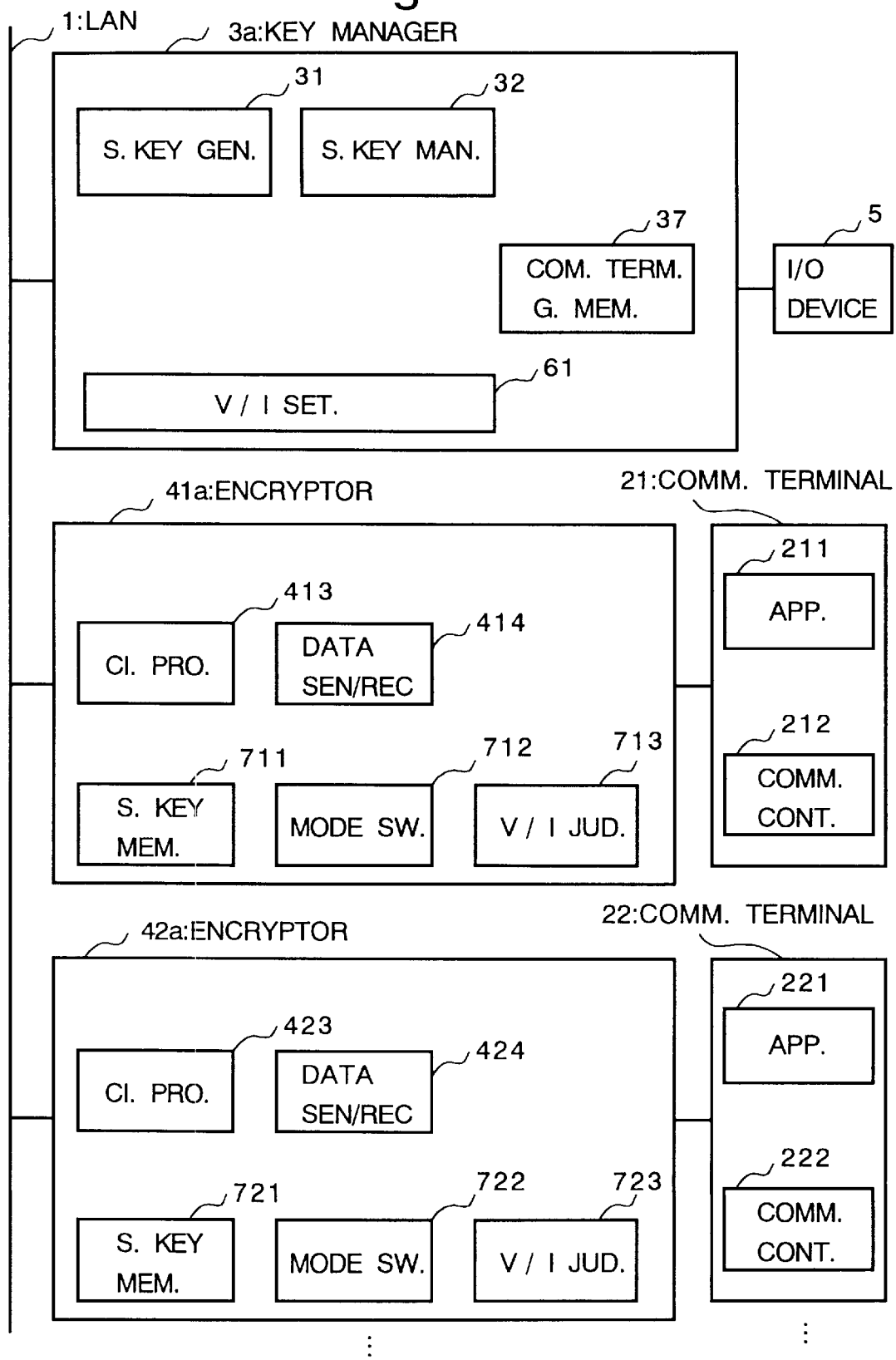
FIG. 9 is a block diagram showing another configuration of the cryptosystem of FIG. 2.

FIG. 9 is a block diagram showing the cryptosystem when the key manager 3a does not distribute the session key.

The session key start detecting unit 33, the session key encrypting unit 34 and the session key sending unit 35, which are provided in the cryptosystem of FIG. 2, are removed from the key manager 3a as shown in FIG. 9. The session key decrypting units 411, 421 and the session key receiving units 412, 422 are removed from the encryptors 41a, 42a. In this case, the session key generating unit 31 of the key manager 3a generates the session key for each group memorized in the communication terminal group memorizing unit 37. The session key generated in the key manager 3a is not sent on the network, but is input to the session key memorizing unit of each encryptor by some other way to be memorized there. The other operation is the same as the above-described case.

Figure 10:
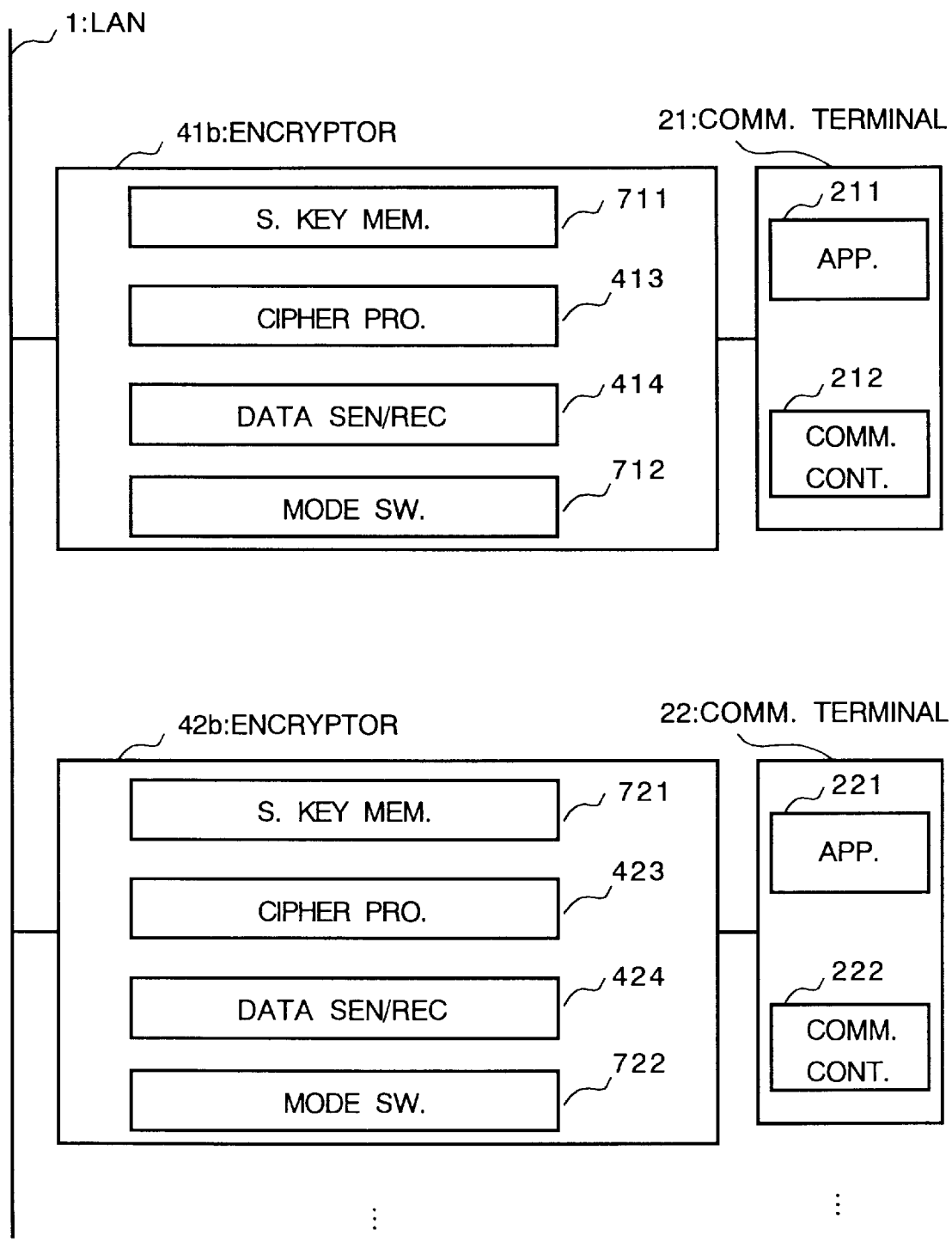
FIG. 10 is a block diagram showing another configuration of the cryptosystem of FIG. 2.

FIG. 10 shows another modification of the cryptosystem shown in FIG. 2, where the key manager is removed from the system.

The communication terminals 21, 22 are connected to the LAN 1 through the encryptors 41b, 42b. More encryptors and communication terminals are connected to the system, which are not shown in the figure. The encryptors 41b, 42b include the session key memorizing units 711, 721, the cipher processing units 413, 423, the data sending/receiving units 414, 424 and the mode switches 712, 722. The communication terminals 21, 22 are the same as ones in the system of FIG. 2. The session key is generated by another processing unit (this is not shown in the figure) which operates in the same way as the session key generating unit. The session keys are input to the session key memorizing units 711, 721 and memorized there. The plurality of encryptors having the same session keys are grouped as one group. The communication mode is determined by ON/OFF of the mode switches 712, 722 between ciphertext communication and plaintext communication.

Embodiment 2

In a second embodiment of the present invention, another cryptosystem will be explained, where the communication mode can be selected between ciphertext communication and plaintext communication by setting an encryption condition. The encryption condition is set based on the communication terminal of the communicating partner, the application and communicating direction.

Further, in the cryptosystem of this embodiment, a plurality of session keys is provided in one encryptor and one of the plurality of session keys to be used is determined by the encryption condition.

Figure 11:
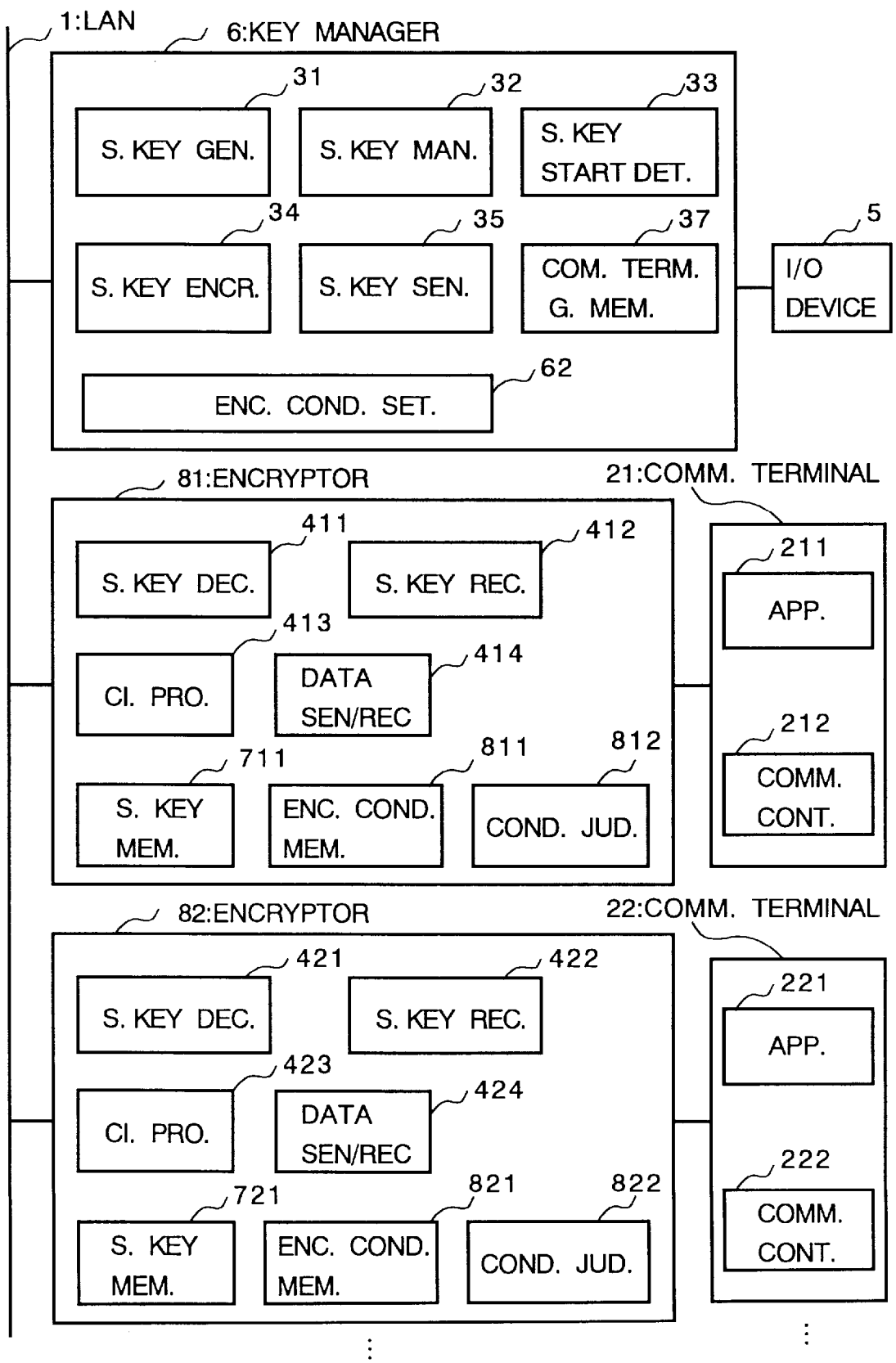
FIG. 11 is a block diagram showing a cryptosystem according to the second embodiment of the invention.

FIG. 11 is a block diagram showing the cryptosystem of the second embodiment.

A key manager 6 and encryptors 81, 82 are connected to the LAN 1. The input/output device 5 is connected to the key manager 6. The communication terminals 21, 22 are connected to the encryptors 81, 82. The key manager 6 includes the session key generating unit 31, the session key managing unit 32, the session key start detecting unit 33, the session key encrypting unit 34, the session key sending unit 35, the communication terminal group memorizing unit 37 and an encryption condition setting unit 62. The encryptor 81 includes the session key decrypting unit 411, the session key receiving unit 412, the cipher processing unit 413. the data sending/receiving unit 414, the session key memorizing unit 711, the encryption condition memorizing unit 811 and a condition judging unit 812. The encryptor 82 is configured as the same as the encryptor 81. The communication terminals 21, 22 are the same as ones shown in FIG. 2. The encryption condition memorizing units 811, 821 memorize the encryption condition for communication data. The communication mode is selected between ciphertext communication and plaintext communication based on the encryption condition including information of the communication terminal of the communicating partner, the application, the communicating direction. When a plurality of session keys is provided in one encryptor, one session key to be used is selected among the plurality of the session keys based on the encryption condition including information of the communicating partner, the application and the communicating direction. The encryption condition memorizing units 811, 821 memorize the encryption condition. The encryption condition for each encryptor is set by the key managing person of the key manager 6 with the encryption condition setting unit 62 of the key manager 6 and the encryption condition is sent to each encryptor. In another way, the encryption condition setting unit 62 can be removed from the key manager 6. In this case, the encryption condition is set by each user of the encryptor and memorized in the encryption condition memorizing units 811, 821. The condition judging units 812, 822 judge and determine which communication mode is selected between ciphertext communication and plaintext communication, and which session key is used if there are plural session keys, when the communication terminal of the communicating partner, the communicating direction and the application of the received data are matched with the encryption condition memorized in the encryption condition memorizing units 811, 821.

Figure 12:
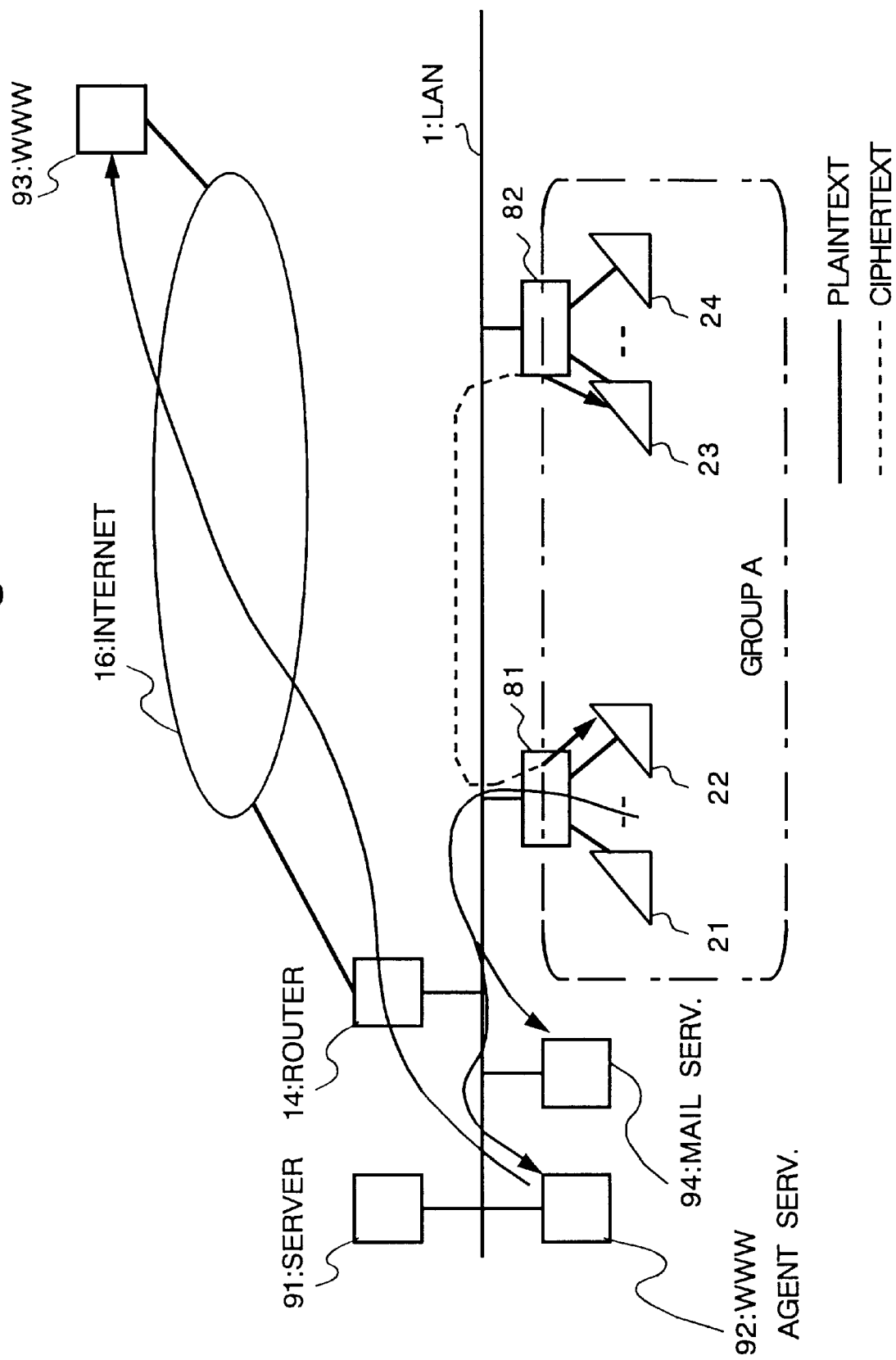
FIG. 12 shows an example of a network including the cryptosystem of FIG. 11.

FIG. 12 shows one example of the network system where the cryptosystem of the embodiment is applied.

A server 91, a WWW (World Wide Web) agent server 92 and a mail server 94 are connected to the Internet 16 via the LAN 1 and the router 14. A WWW 93 is also connected to the Internet 16. The encryptors 81, 82 are connected to the LAN 1. The communication terminals 21. 22 are connected to the encryptor 81. The communication terminals 23, 24 are connected to the encryptor 82. Other encryptors and communication terminals (they are not shown in the figure) are connected to the LAN 1. The encryptors 81, 82 belong to the group A.

In the network shown in FIG. 12, the encryption condition of the encryptor 81 is set as follows:

Basic pass: applications (all), ---encryption

Special pass 1: IP address (mail server) & application (mail) & communicating direction (output), ---transparent Special pass 2: IP address (WWW agent server) & application (http) & communicating direction (output), ---transparent Special pass 3: IP address (server) & application (name server), ---transparent In the above encryption condition, the special pass condition has a priority over the basic pass condition. Ordinary communication is performed according to the basic pass condition. When the communication data is matched with one of the above special pass condition 1, 2 and 3, the communication is performed according to the special pass condition. In FIG. 12, for example, when the communication terminal 21 or 22 sends the data to the communication terminal 23 or 24 of the group A, communication data processed by all applications is encrypted according to the basic pass condition. This ciphertext communication is shown as a broken line in the figure. When the communication terminal 21 or 22 sends a mail to the mail server 94, the data is transmitted according to the special pass condition 1, that is, plaintext communication is performed.

When the communication terminal 21 or 22 sends user data processed by the application (http) to the WWW agent server 92, plaintext communication is performed according to the special pass condition 2.

When the communication terminal 21 or 22 sends/receives communication data processed by the application (name server), plaintext communication is performed according to the special pass condition 3. The communicating direction is not specified in the special pass condition 3, thus the data of both direction (output/input) is transparently transmitted, that is, plaintext communication is performed. The encryption condition can be set respectively in the encryptors 81 and 82. Further, different encryption condition (special pass condition) can be set for each communication terminal when a plurality of communication terminals is connected to the encryptor.

The basic pass condition and the special pass condition will be explained in detail later in the embodiment.

As has been described, in one encryptor, the communication among the communication terminals of the same group is encrypted, while public service such as mail or WWW service can be received in plaintext.

Figure 13:
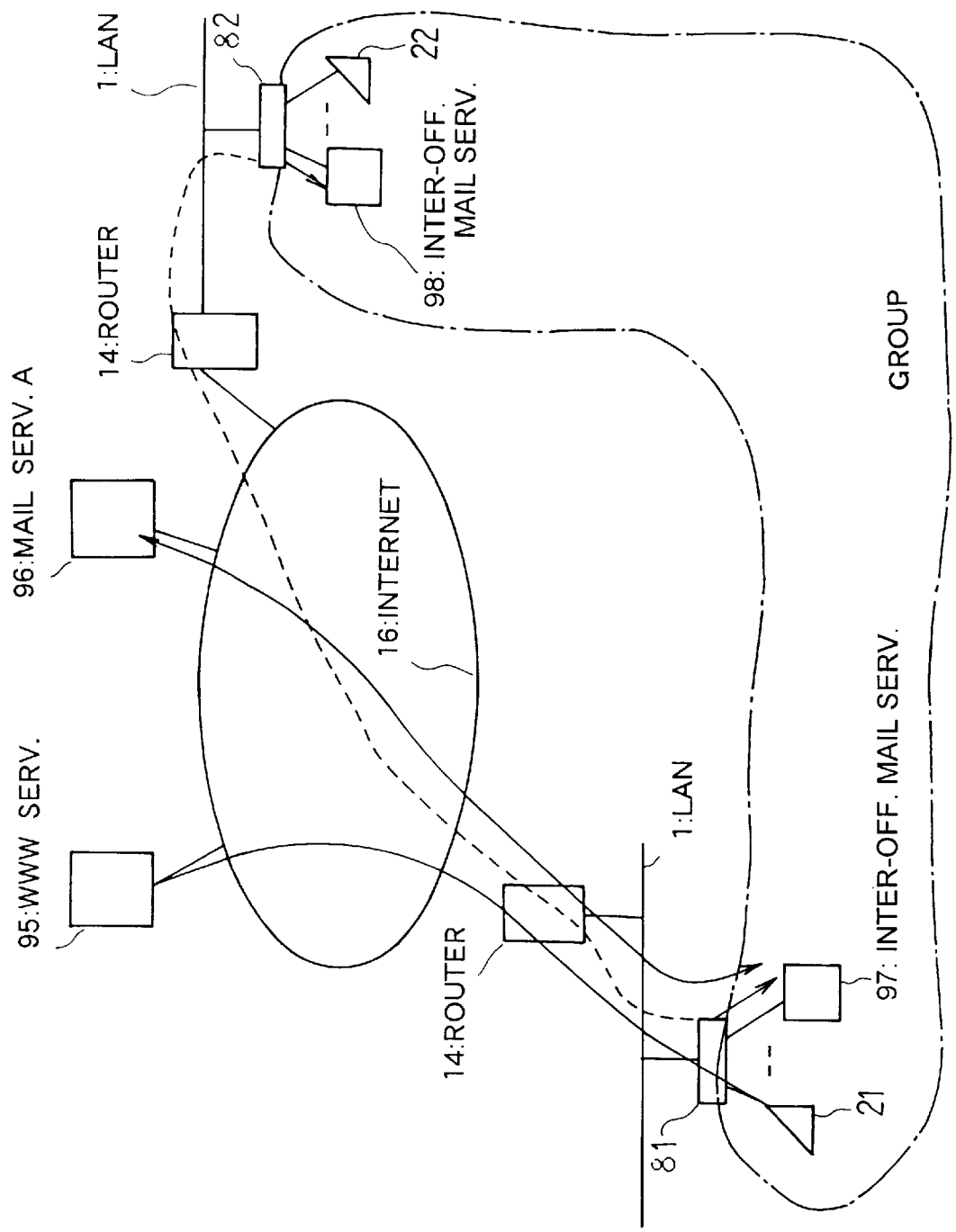
FIG. 13 shows another example of a network including the cryptosystem of FIG. 11.

FIG. 13 shows another network example of the cryptosystem according to the second embodiment of the invention.

A WWW server 95 and a mail server "A" 96 are connected to the Internet 16. One of two LANs 1, which are coupled via the router 14, connects the encryptor 81. The communication terminal 21 and an inter-office mail server 97 are connected to the encryptor 81. The encryptor 82 is connected to the other LAN 1. An inter-office mail server 98 and the communication terminals 22 are connected to the encryptor 82. The encryptors 81 and 82, the communication terminals 21 and 22, the inter-office mail servers 97 and 98 belong to one group.

The following encryption condition is set in the encryptor 81 in the network shown in FIG. 13.

Basic pass: application (mail+WWW), ---transparent

Special pass 1: IP address (all addresses of the encryptors for the inter-office mail) & applications (all), ---encryption Under the above encryption condition, all the inter-office mails and inter-office application data are encrypted by the encryptor 81, while the public data communication with the mail server "A" 96 and the WWW server 95 is transparently transmitted, that is, plaintext communication is performed.

In the above way, even if the communication terminal is connected to the Internet, ciphertext communication can be performed through the encryptor when all the inter-office encryptors are grouped as one group. Thus, an intercept of the data is prevented even if the communication is performed through the Internet.

Figure 14:
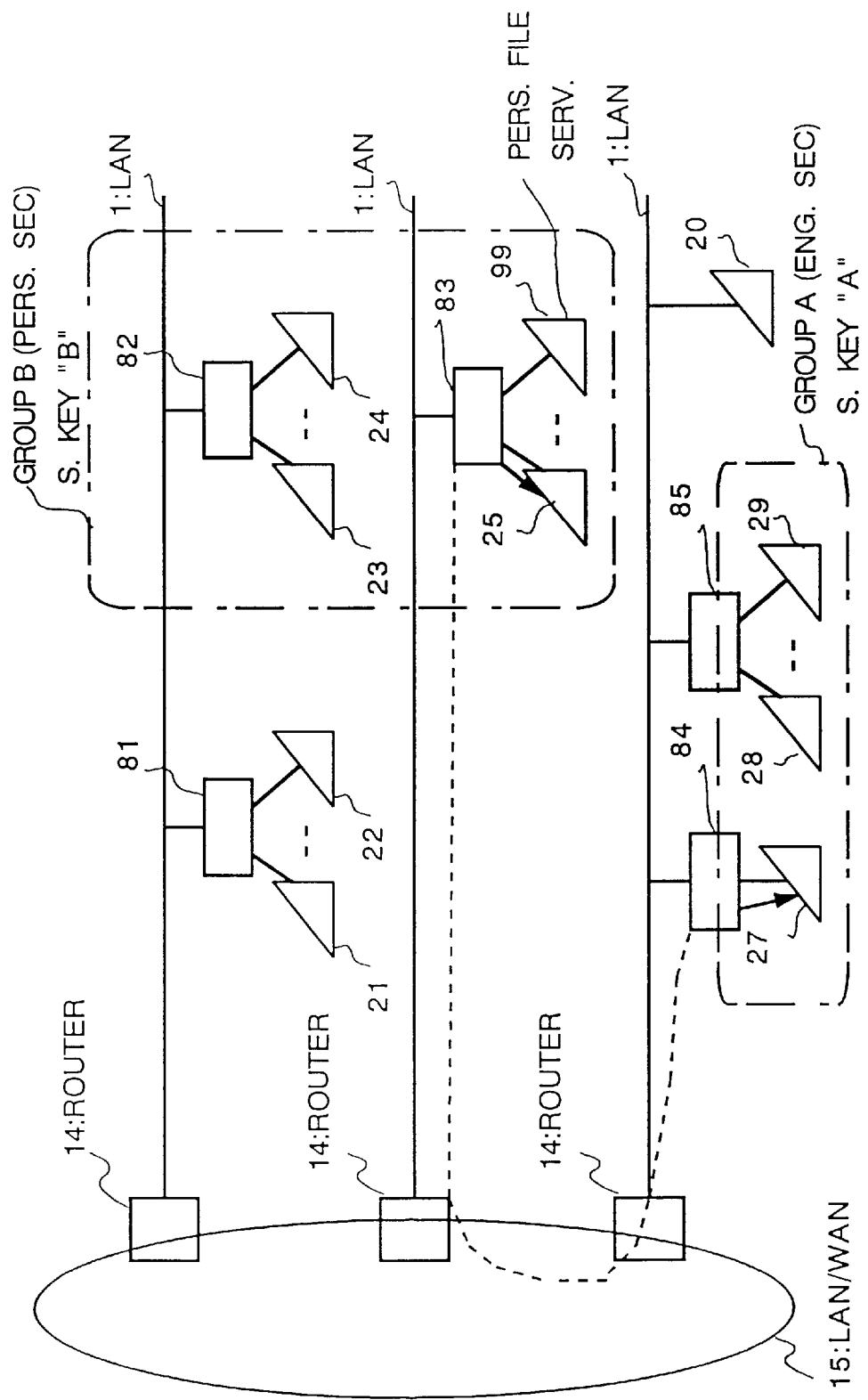
FIG. 14 shows another example of a network including the cryptosystem of FIG. 11.

FIG. 14 shows another network example of the cryptosystem according to the embodiment.

Three LANs 1 are connected to the LAN/WAN 15 via the router 14. The encryptors 81–85 are connected to the LAN 1. The communication terminals 21–29 are connected to the encryptors. The communication terminal 20 is directly connected to the LAN 1 without an intervening encryptor. A personnel file server 99 is connected to the encryptor 83.

The encryption condition is set as follows in the encryptor 84 in the network shown in FIG. 14.

Basic pass: applications (all), ---encryption by the session key "A"

Special pass 1: IP address (personnel file server) & applications (all), ---encryption by the session key "B"

In FIG. 14, the session key "A" is used in the group A, for example, the engineering section. The session key "B" is used in the group B, for example, the personnel section. The personnel file server 99, to which it is desirable to forbid a general access, belongs to the group B. Under the above encryption condition, the communication data to/from all the communication terminals of the group A (all the applications of the group A) can be sent/received by the communication terminal 27 using the session key "A". The communication terminal 27 also sends/receives the communication data to/from the personnel section, namely, the personnel file server 99 of "group B" and all the applications of the group B using the session key "B". Accordingly, the user of the communication terminal 27 should be an executive in charge of personnel matters.

In this way, a plurality of session keys is included in one encryptor and various combination of groups can be set and overlapped because various encryption condition can be set for each session key. The encryption condition can be set for each session key, which prevents the communication from being intercepted and an access to the communication data can be controlled. The personnel information server can be connected to the inter-office LAN. The personnel information server can be accessed only the men in charge of personnel matters and the executives.

Figure 15:
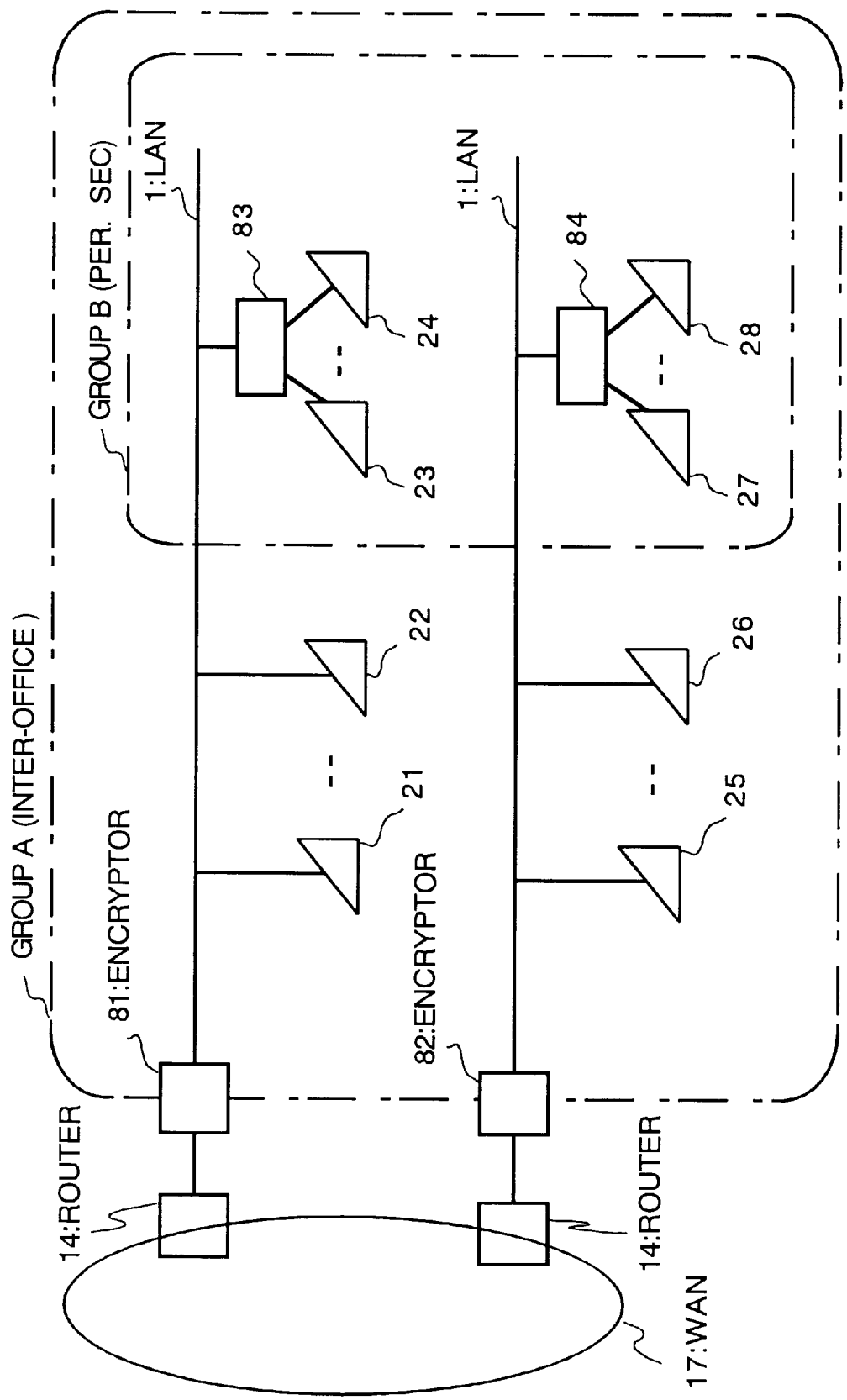
FIG. 15 shows another example of a network including the cryptosystem of FIG. 11.

FIG. 15 shows another network example of the cryptosystem according to the embodiment.

Two LANs 1 are connected to WAN 17 via the routers 14. The encryptors 81 and 82 are respectively connected to the LANs 1 and connected to the routers 14. In this configuration, for example, all inter-office communication terminals can be grouped as one group, "group A". The encryptors 83 and 84 are respectively connected to two LANs 1. The communication terminals 23, 24, 27 and 28 are connected to the encryptors 83 and 84. A large number of communication terminals can be further connected to the encryptors. The communication terminals connected to the encryptors 83 and 84 are grouped as "group B", for example, the personnel section. The group B belongs to the group A. The communication terminals 21, 22, 25 and 26 of the group A, which are directly connected to the LAN 1 without the intervening encryptors 83 and 84, cannot communicate with the communication terminals 23, 24, 27 and 28 of the group B.

The communication terminals 21, 22, 25 and 26 mutually send/receive the communication data and the communication data among these communication terminals 21, 22, 25 and 26 is not encrypted in the LANs 1. In case of the communication between the communication terminals 21 and 25, the communication data is encrypted by the encryptor 81 connected to the LAN 1 of the communication terminal 21. The encrypted data passes through the WAN 17 and is then decrypted by the encryptor 82. Namely, in this case, ciphertext data is sent only from the encryptor 81 to the encryptor 82. The decrypted communication data is received by the communication terminal 22 in plaintext. Accordingly, the communication data is encrypted when sent through a public network as the WAN 17, which prevents an intercept of the data.

The communication data is prevented from being intercepted as described above. The inter-office communication can be performed through the public network by providing encryptors in the system, while conventionally, the inter-office communication is performed only by using private line.

Figure 16:
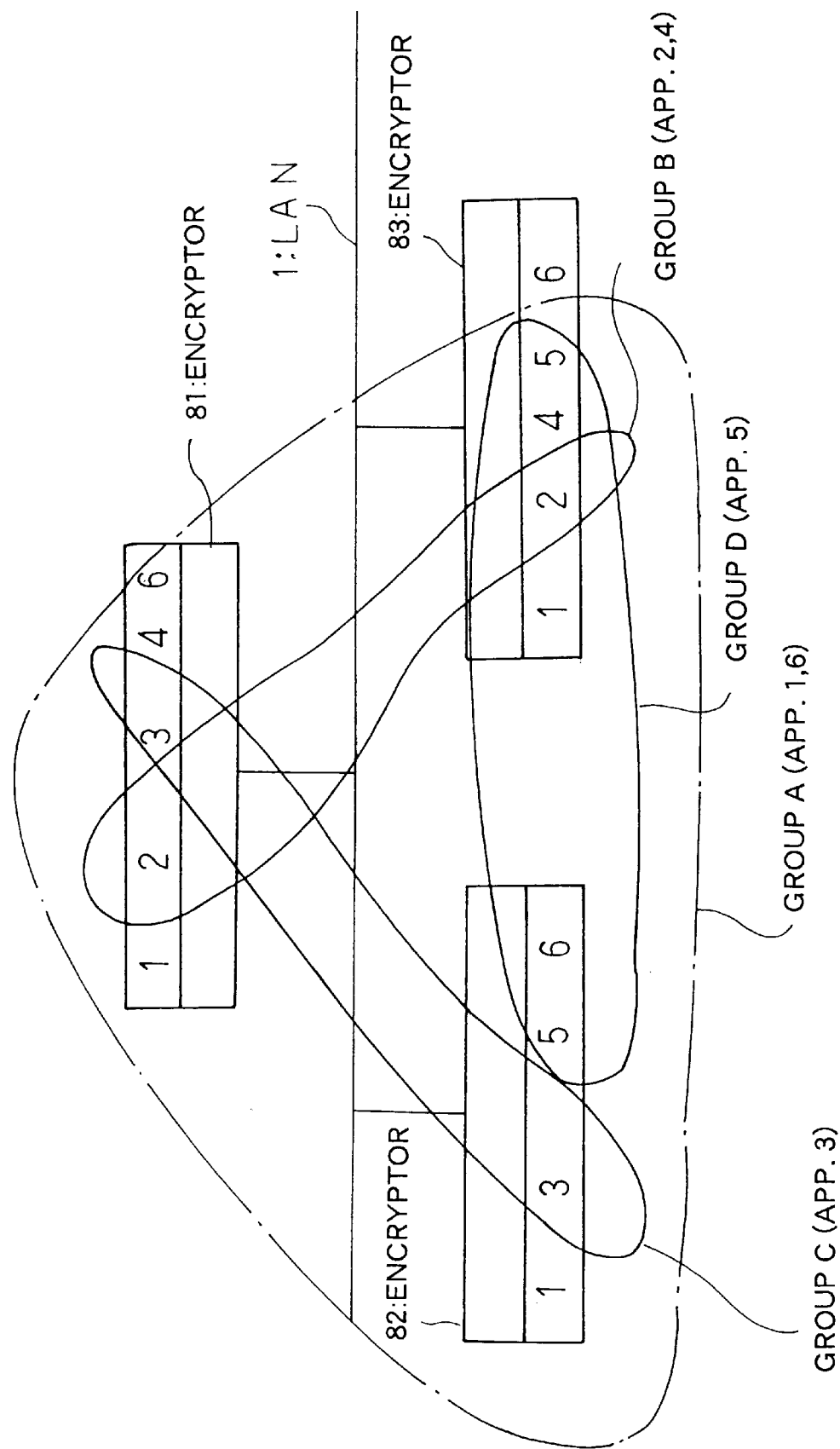
FIG. 16 shows logical groups in the cryptosystem of FIG. 11.

FIG. 16 shows another network example, where the communication terminals are divided into a plurality of groups and the groups can be overlapped by setting the encryption condition for each application and each session key.

The encryptors 81–83 are connected to the LAN 1. The encryptor 81 executes the applications 1–4 and 6. The encryptor 82 executes the applications 1, 3, 5 and 6. The encryptor 83 executes the applications 1, 2 and 4–6. The same session key is used for encrypting/decrypting communication data in the encryptors where the application of the same number is registered. The encryptors 81–83, where the applications 1 and 6 are specified, are grouped as "group A". "Group B" is formed by the encryptors 81 and 83. where the applications 2 and 4 are specified. The encryptors 81 and 82, where the application 3 is specified, are grouped as "group C". "Group D" is formed by the encryptors 82 and 83, where the application 5 is specified.

As described above, the plurality of groups can be overlapped and formed according to the encryption condition. In the above example, various kinds of the applications are specified in the encryption condition. Types of the communication protocol can be also specified and used for condition of grouping.

When an encryptor has only one session key, each of the encryptors corresponds to one certain session key. Therefore, encryptors are grouped according to the session keys. In this case, the encryptors can be grouped as "physical network groups".

When the encryptor has a plurality of session keys, one encryptor can belong to a plurality of groups, some of which are overlapped, according to combination of such as the application or the communication protocol and the session key. In this case, the groups are called "logical network groups".

Figure 17:
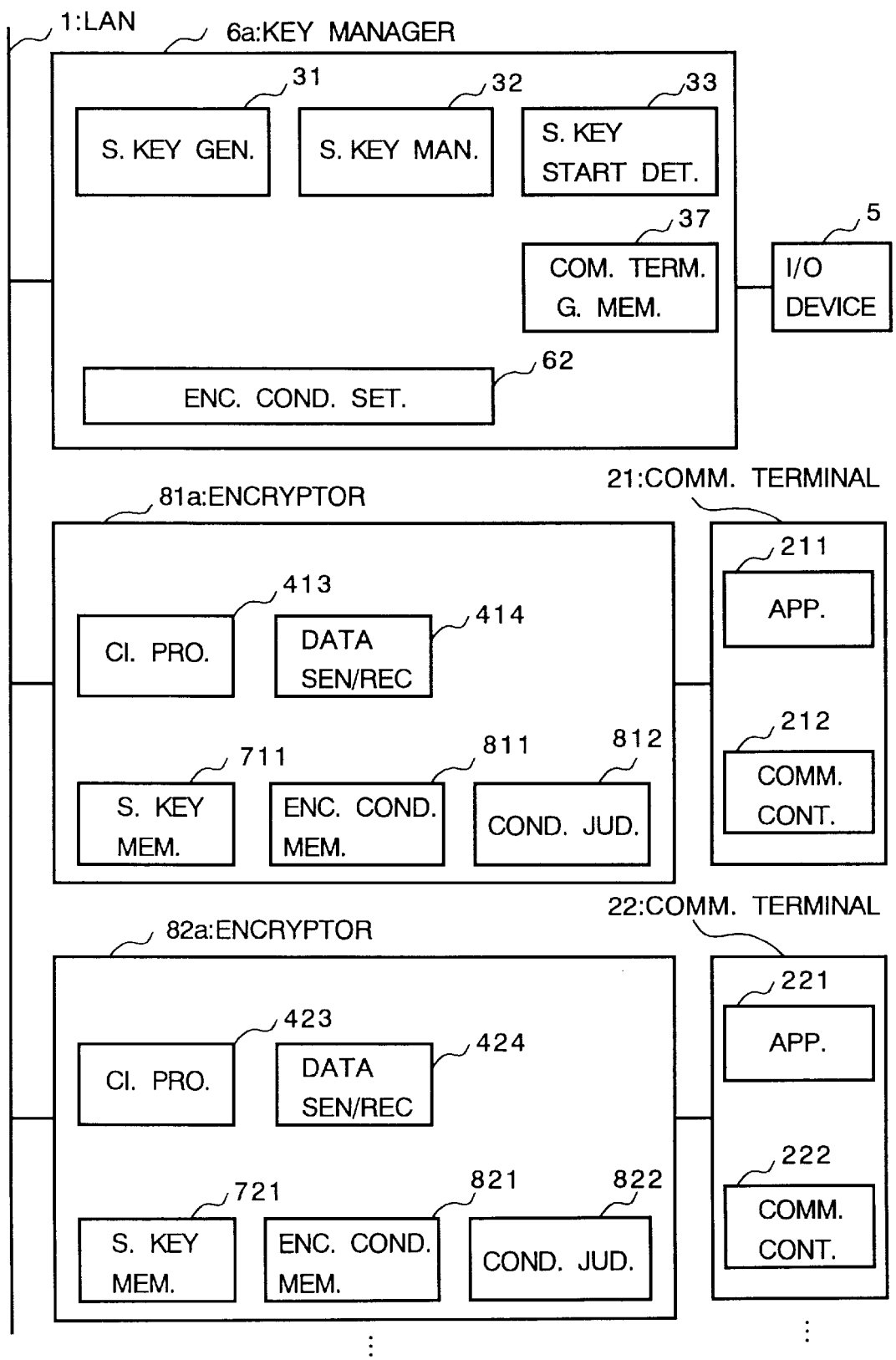
FIG. 17 shows another configuration of the cryptosystem of FIG. 11.

FIG. 17 is a block diagram showing another example of the cryptosystem, where the key manager 6a generates the session key, but does not distribute the session keys to the encryptors 81a and 82a via the network in the cryptosystem of FIG. 11. The encryption condition is set the same as described above.

Figure 18:
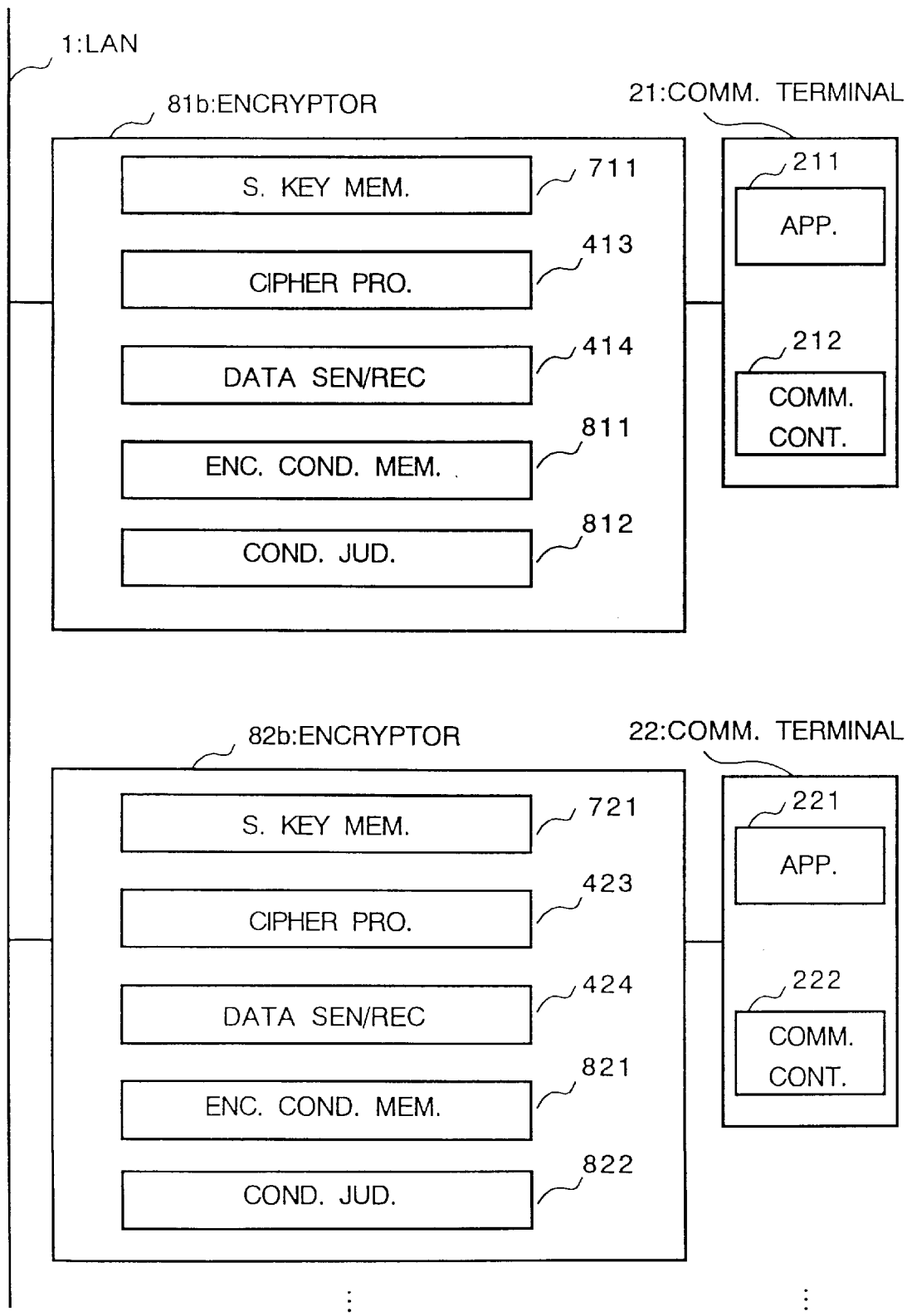
FIG. 18 shows another configuration of the cryptosystem of FIG. 11.

FIG. 18 is a block diagram showing the cryptosystem, where the key manager is removed from the cryptosystem of FIG. 11.

The session key used in each encryptor is generated by an extra processing unit (this is not shown in the figure), which has a function equivalent to the session key generating unit 31 of the key manager 6, and is input to the session key memorizing unit 711 to be memorized there. In this case, a plurality of the session keys can be generated and memorized in the session key memorizing unit 711. The encryptors 81b and 82b include the session key memorizing units 711 and 721, the cipher processing units 413 and 423, the data sending/receiving units 414 and 424, the encryption condition memorizing units 811 and 821 and the condition judging units 812 and 822. The encryption condition is respectively memorized in the encryption condition memorizing units 811 and 821 by each user of the encryptors. Logical network groups are formed according to the encryption condition as well as above-described cryptosystem.

For another example of the cryptosystem of the embodiment, the mode switch can be provided in the encryptor. In this case, when the mode switch is ON, the communication mode is always switched to plaintext communication regardless of the encryption condition.

As explained above, according to the second embodiment of the invention, the intercept prevention system, which is conventionally structured only by private line, can be realized by the cryptosystem using the public network or the Internet.

Further, in case of the information service through the network, the users can be grouped into plural groups, in each of which only the users having the encryption key can receive the information service.

Further, the information server such as the personnel information server, which should be accessed by only the men of the personnel section and the executives, can be connected to the inter-office LAN. The personnel information server cannot be intercepted or accessed by general users by setting the encryption condition.

Further, a plurality of logical groups can be formed and overlapped on the same network based on the functions of the encryption condition (communication protocol, application, etc.) and the session key.

Embodiment 3

In a third embodiment of the present invention, the encryption condition including the basic pass condition and the special pass condition can be set for each connecting port of the encryptor for connecting the communication terminals when a plurality of communication terminals are connected to one encryptor in the cryptosystem.

Figure 19:
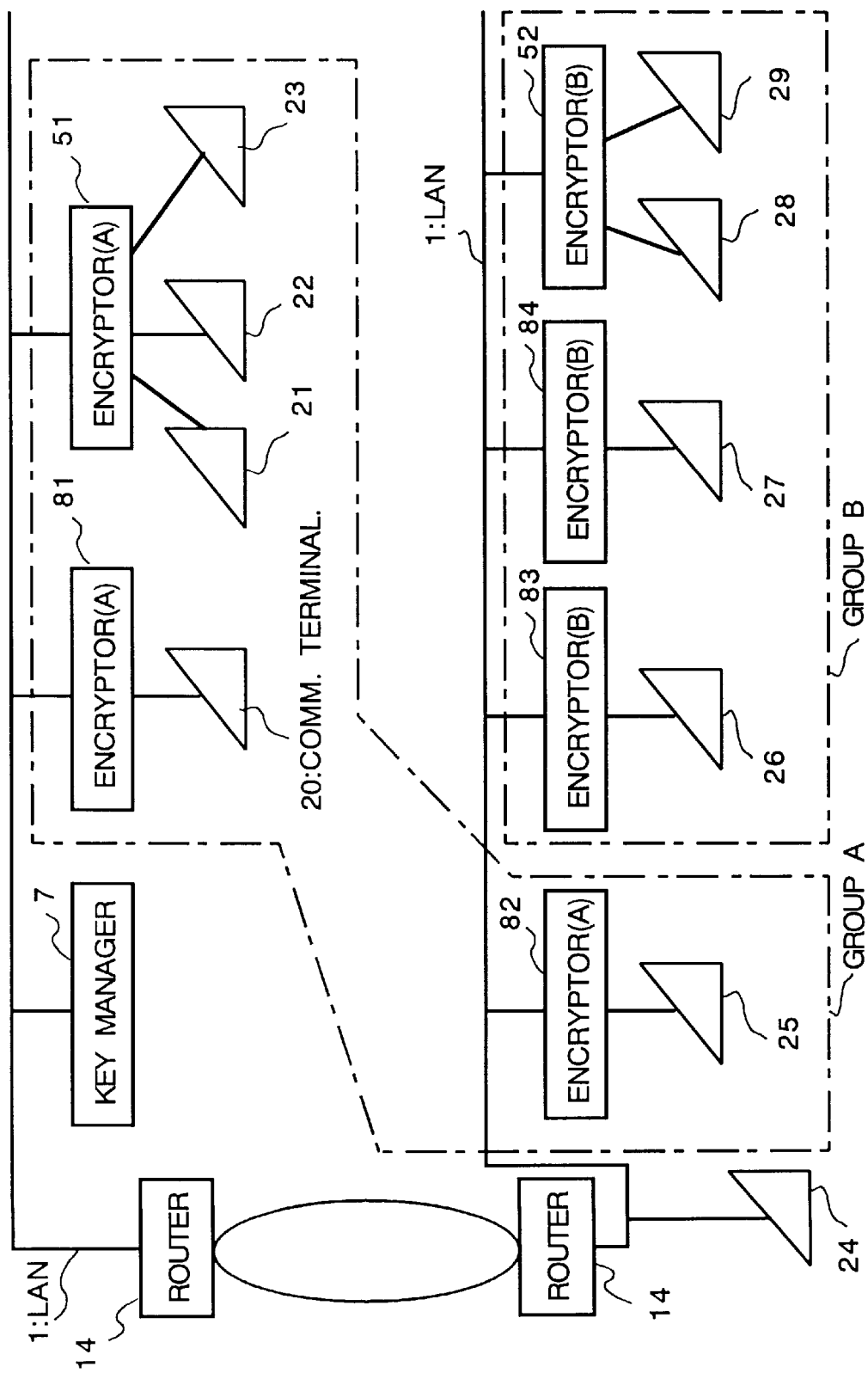
FIG. 19 shows a network system according to the third embodiment of the invention.

FIG. 19 shows a network system according to the third embodiment of the invention.

In the figure, the encryptors 81–84 are NODE encryptors for connecting one communication terminal. The encryptors 51 and 52 are HUB encryptors for connecting a plurality of the communication terminals. The encryptors 81, 51 and 82 form "group A" with the communication terminals 20–23, 25 connected to these encryptors. The encryptors 83, 84 and 52 form "group B" with the communication terminals 26–29. A key manager 7 is connected to the LAN 1 and generates the session key for encrypting/decrypting communication data in the encryptors 81–84, 51 and 52 and distributes the session keys to each of the encryptors. The communication terminal 24 sends/receives only plaintext communication.

Figure 20:
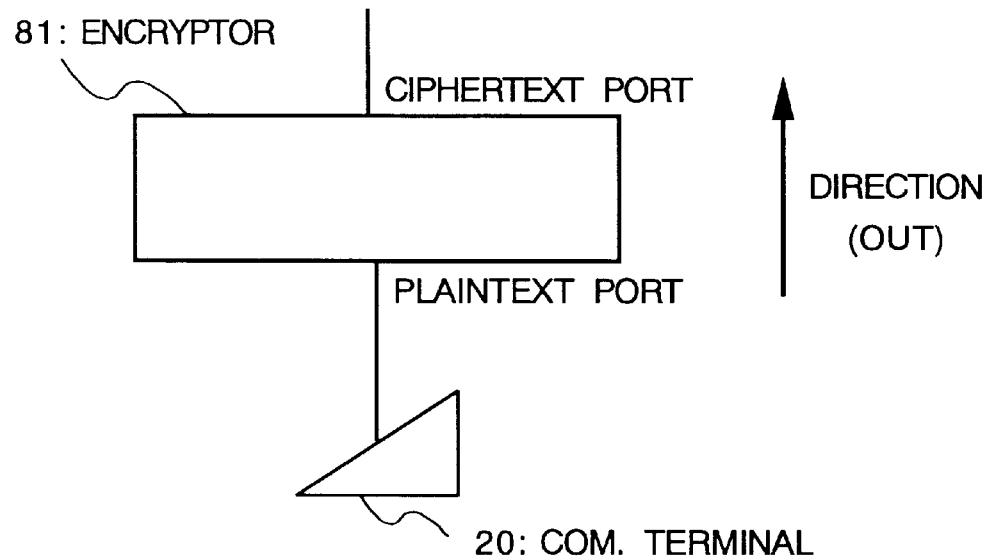
FIG. 20 shows a NODE encryptor.

FIG. 20 shows the NODE encryptor 81, which connects one communication terminal.

The encryptor 81 includes a plaintext port and a ciphertext port. The communication terminal 20 is connected to the plaintext port. The data runs between the communication terminal 20 and the encryptor 81 in plaintext. The ciphertext port of the encryptor 81 is connected to the LAN 1. The data running through the ciphertext port of the encryptor 81 is either of ciphertext and plaintext. Only one communication terminal can be connected to the plaintext port of the NODE encryptor and any other HUB encryptor or bridge/router cannot be connected to the plaintext port of the NODE encryptor. The communicating direction from the plaintext port to the ciphertext port is defined as (output), that is, "outputting direction" in the encryption condition.

Figure 21:
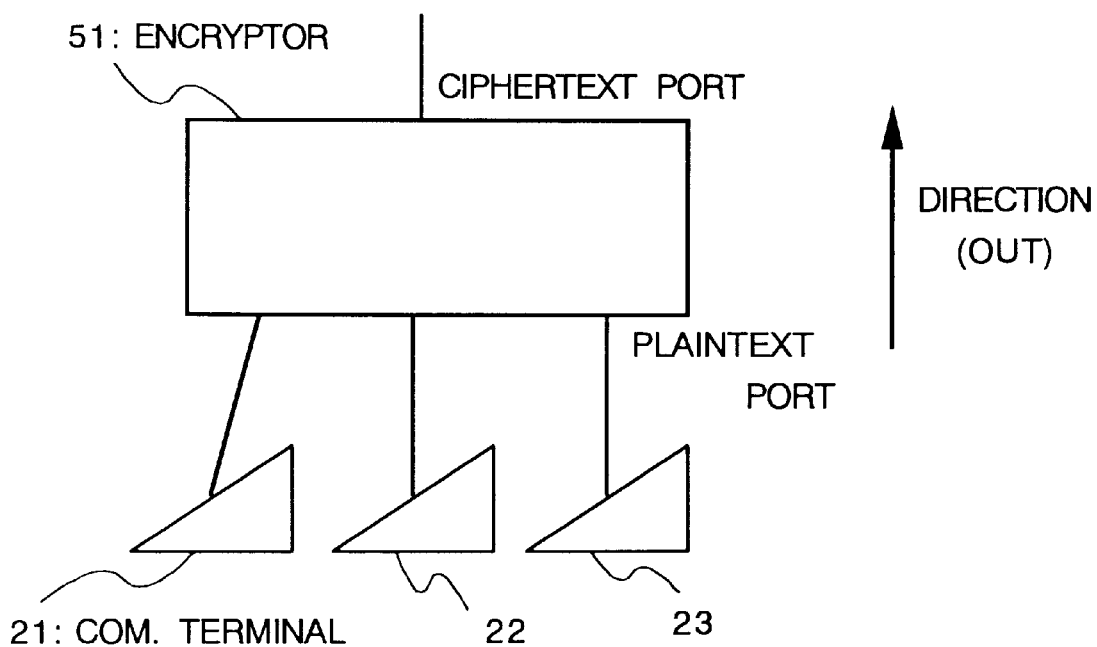
FIG. 21 shows a HUB encryptor.

FIG. 21 shows the HUB encryptor 51 where a plurality of the communication terminals are connected to one encryptor.

The communication terminals 21, 22 and 23 are connected to the plaintext ports of the encryptor 51. The ciphertext port of the encryptor 51 is connected to the LAN 1. In the HUB encryptor, to each of the plurality of plaintext ports, only one communication terminal can be connected and any other HUB encryptor or bridge/router is forbidden to be connected. The communicating direction from the plaintext port to the ciphertext port is defined as (output), that is, "outputting direction" in the encryption condition.

Figure 22:
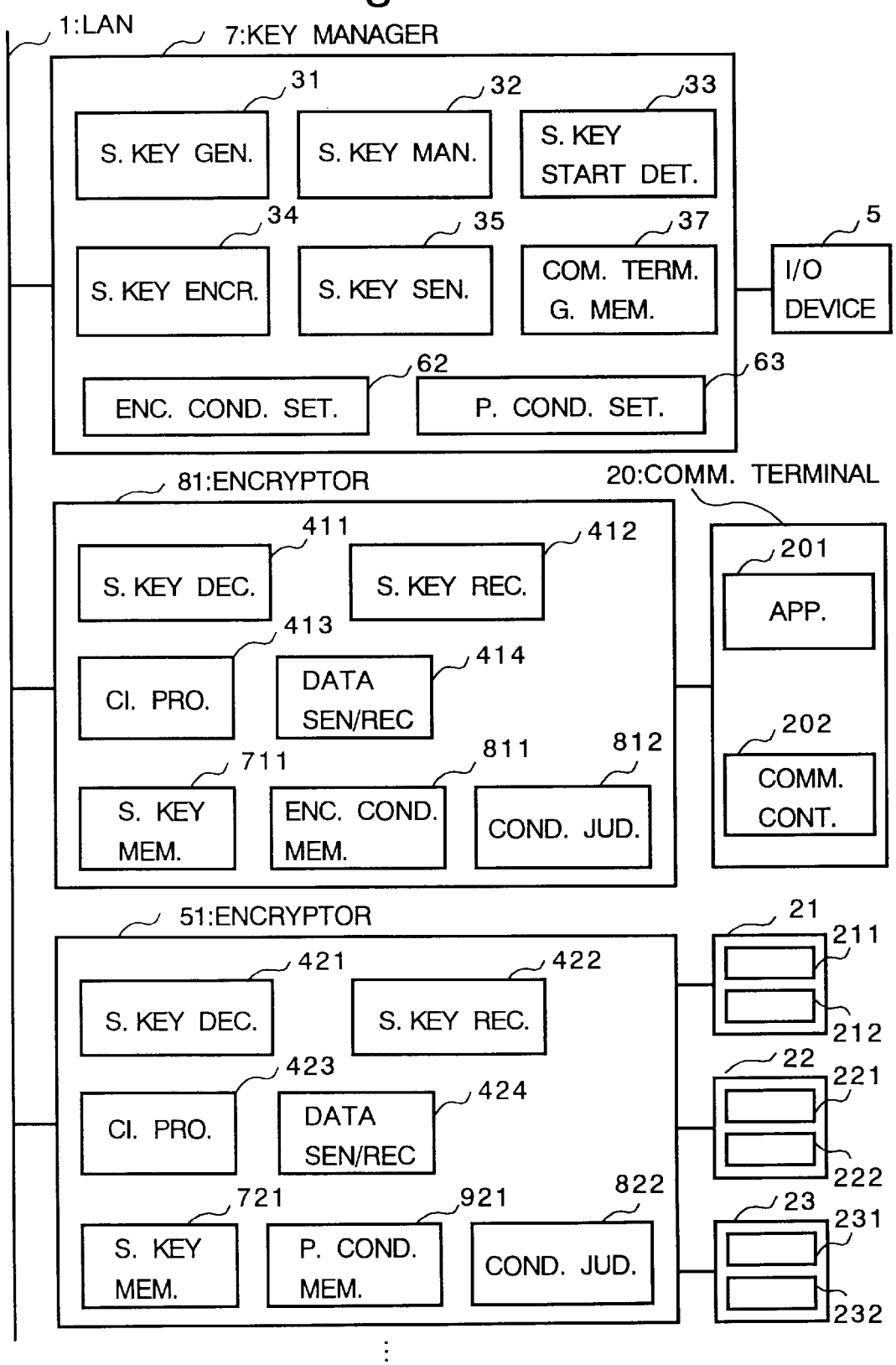
FIG. 22 is a block diagram showing the cryptosystem according to the third embodiment of the invention.

FIG. 22 is a block diagram showing the key manager 7, the encryptors 81 and 51, and the communication terminals 20–23 in the third embodiment of the invention.

The key manager 7 is a modification of the key manager 6 of FIG. 11 described in the above embodiment and further includes a port condition setting unit 63. The encryptor 51 is the HUB encryptor for connecting the communication terminals 21–23. The encryptor 51 is a modification of the encryptor 82 of FIG. 11 described in the above embodiment and includes a port condition memorizing unit 921 instead of the encryption condition memorizing unit 821. The port condition memorizing unit 921 memorizes the port condition including the basic pass condition and the special pass condition for each port connected to the communication terminal. The condition judging unit 822 compares the information (such as the application, the communicating direction and the communication terminal of the communicating partner) of the communication data input from the communication terminals 21–23 with the port condition memorized in the port condition memorizing unit 921. The condition judging unit 822 determines which pass condition to be used for the communication data among the pass condition memorized in the port condition memorizing unit 921, including the basic pass condition and the special pass condition. The condition judging unit 822 selects the communication mode between plaintext communication and ciphertext communication, where the data is encrypted by a session key specified in the basic pass condition or the special pass condition. The encryptor 81 is the NODE encryptor for connecting one communication terminal, the communication terminal 20. The input/output device 5, the encryptor 81 and the communication terminals 20–23 are the same as ones in FIG. 11.

In the port condition setting unit 63 of the key manager 7, the port condition is set for the HUB encryptor by the key managing person and distributed to the port condition memorizing units 921, . . . in the corresponding HUB encryptors 51, . . . In another way, the port condition is set and memorized in the port condition memorizing units 921, . . . in the encryptors 51, . . . , respectively and independently. In this case, the port condition setting unit 63 of the key manager 7 can be removed. However, it is desirable that port condition is set by the port condition setting unit 63 of the key manager 7 for overall control of the system.

The session key memorizing units 711 and 721 memorize correspondence of the key generated by the session key generating unit 31 of the key manager 7 and ID of the key in the encryption condition memorizing unit 811 or the port condition memorizing unit 921. For example, IDs of the session keys are specified as "key A", "key B" and "key C" for the basic pass condition and the special pass condition. The IDs are memorized in the encryption condition memorizing unit 811 instead of actual session keys. The session key memorizing units 711 and 721 memorize IDs of the session keys, "key A", "key B" and "key C" and the corresponding session keys distributed from the key manager 7.

In the above-described way, the key managing person, who sets the encryption condition and the port condition, does not need to know the actual session keys. The session keys are indicated by IDs in the encryption condition and the port condition. Thus, if the session keys are periodically generated and updated to keep the security of the session keys, it is not required to change the encryption condition and the port condition every update of the session keys.

Figure 23:
FIG. 23 shows an example of the encrypting condition to be memorized in the encrypting condition memorizing unit shown in FIG. 22.

FIG. 23 shows an example of the encryption condition to be memorized in the encryption condition memorizing unit 811.

The following explains the encryption condition shown in FIG. 23:

Basic pass condition: applications (all), ---"key A"

Special pass condition 0: destination IP addresses (all) & application (mail), ---transparent Special pass condition 1: destination IP address (communication terminal 26) & application (AP 11) & communicating direction (output), ---"key B"

The basic pass condition and the special pass condition can be set as specified above in the encryption condition.

The basic pass condition is used as a default pass and any communication data which does not match the special pass condition is treated by the basic pass condition. Accordingly, the destination IP address cannot be specified in the basic pass condition.

On the contrary, it is always required to set the destination IP address in the special pass condition. Any communication data matching with any of the special pass condition is encrypted by the session key indicated in the special pass condition. When the communication is set "transparent", the data is not encrypted and is output from the encryptor in plaintext.

In the encryption condition, it is not always required to set the special pass condition. The encryption condition requires at least the basic pass condition. If communication data does not match the basic pass condition or the special pass condition, the communication data is all abandoned.

Hereinafter, the destination IP address, the application, and communicating direction specified in the encryption condition is also called a destination IP address filter, an application filter, and a communicating direction filter.

The features of the basic pass condition and the special pass condition will be explained in the following.

One basic pass condition can be set in the NODE encryptor, where one plaintext port is provided. The destination IP address cannot be specified in the basic pass condition. And the application filter, the communicating direction filter and the session key can be specified in the basic pass condition.

By indicating the application filter, a particular application can be specified, or all the data is specified to be passed or all abandoned.

By the communicating direction filter, direction can be specified. That is, the communicating direction filter indicates that the data is sent from the plaintext port to the ciphertext port of the encryptor or the data is received in the opposite direction. The communicating direction is defined as "outputting direction" (output) for the direction from the plaintext port to the ciphertext port, while the direction from the ciphertext port to the plaintext port is defined as "inputting direction" (input). Further, both directions including "outputting direction" and "inputting direction" can be specified. Without specifying the communicating direction in the basic pass condition and the special pass condition, the data can be sent in both directions.

The session key is specified in each condition of the application filter and the communicating direction filter and used for encrypting the communication data which matches specified condition. The session key is fixed as the key of the group, to which the encryptor belongs, in case of the basic pass condition. If the session key is not specified, the communication data is "transparent" (plaintext communication is performed).

A plurality of kinds of the special pass condition can be set. In this embodiment, 64 kinds of special pass condition at maximum can be set in one encryptor. In the special pass condition, the destination IP address filter, the application filter, the communicating direction filter and the session key can be specified.

It is required to indicate the destination IP address in the special pass condition. The valid bit length of the IP address is also required to be specified.

Two elements of the IP address and the valid bit length of the IP address are specified for indicating the communicating partner in the encryption condition. As for the IP address, four numerals are aligned with dots (.) in each interval. Numerals 0–255 can be used for each of the above four numerals, because the numerals 0–255 can be shown 8-bit binary number. The valid bit length shows which numerals of the four in (8 bits * 4) bits are used. Any bit, excluded by the valid bit length, is treated as 0. For example, in case of the IP address of "133. 141. 70. 151", when the valid bit length =32 bits is specified, the communication terminal for the communicating partner should be only the communication terminal having the IP address of "133. 141. 70. 151". For another example, in case of the same IP address "133. 141. 70. 151", when the valid bit length is set to 24 bits, any of 256 communication terminals can be used as the communicating partner having 256 IP addresses from "133. 141. 70. 0" to "133. 141. 70. 255". This is called an IP broadcast address. In this way, one or plural communication terminals can indicate a broadcast address for the communicating partner based on the valid bit length of the IP address.

The application filter and the communicating direction filter can be specified for the special pass condition in the same way as the above basic pass condition.

The session key encrypts the communication data matching with each condition of the destination IP address filter, the application filter and the communicating direction filter. A plurality of session keys is memorized in the session key memorizing unit 711 and one of the plurality of session keys are selected and specified in the special pass condition. One session key is selected and specified for each special pass condition. Or, if the session key is not specified in the special pass condition, it can be set as "transparent" to perform plaintext communication.

The destination IP address should be specified in the special pass condition, thus the IP broadcast address cannot be specified by the special pass condition. Namely, the application using a broadcast communication is specified by the basic pass condition.

FIG. 24 shows an example of port condition to be memorized in the port condition memorizing unit 921 as follows:

(port 1)

Basic pass condition 1: applications (all), ---"key A"

(port 2)

Basic pass condition 2: application (mail), ---transparent

Special pass condition 1: destination IP address (communication terminal 26) & application (AP 11) & communicating direction (output), ---"key B"

(port 3)

Basic pass condition 3: application (AP 22) & communicating direction (input), ---"key A"

Special pass condition 1: destination IP address (communication terminal 26) & application (AP 11) & communicating direction (output), ---"key B"

Special pass condition 2: destination IP address (communication terminal 28) & application (SPPR), ---"key C"

The HUB encryptor 51 includes a plurality of ports and, in the example of FIG. 22, three communication terminals 21–23 are connected to each of the plurality of ports. The port condition is respectively memorized for "port 1", "port 2" and "port 3". The basic pass condition and special pass condition can be set as the port condition.

Regarding the basic pass condition and the special pass condition, the difference between the NODE encryptor and the HUB encryptor will be explained below.

One basic pass condition is set for one NODE encryptor. While one basic pass condition is set for each one of the plurality of ports of the HUB encryptor. The special pass condition can be shared by the plurality of ports in the HUB encryptor.

The special pass condition is not always required in the port condition. On the contrary, at least the basic pass condition is required for each port as the port condition.

The special pass condition has a priority over the basic pass condition. If a plurality of kinds of special pass condition are set, each special pass condition can have a priority in a predetermined order. In the third embodiment of the invention, it is previously determined that the special pass condition memorized in the encryption condition memorizing unit has a priority over the special pass condition memorized in the port condition memorizing unit.

Figure 25:
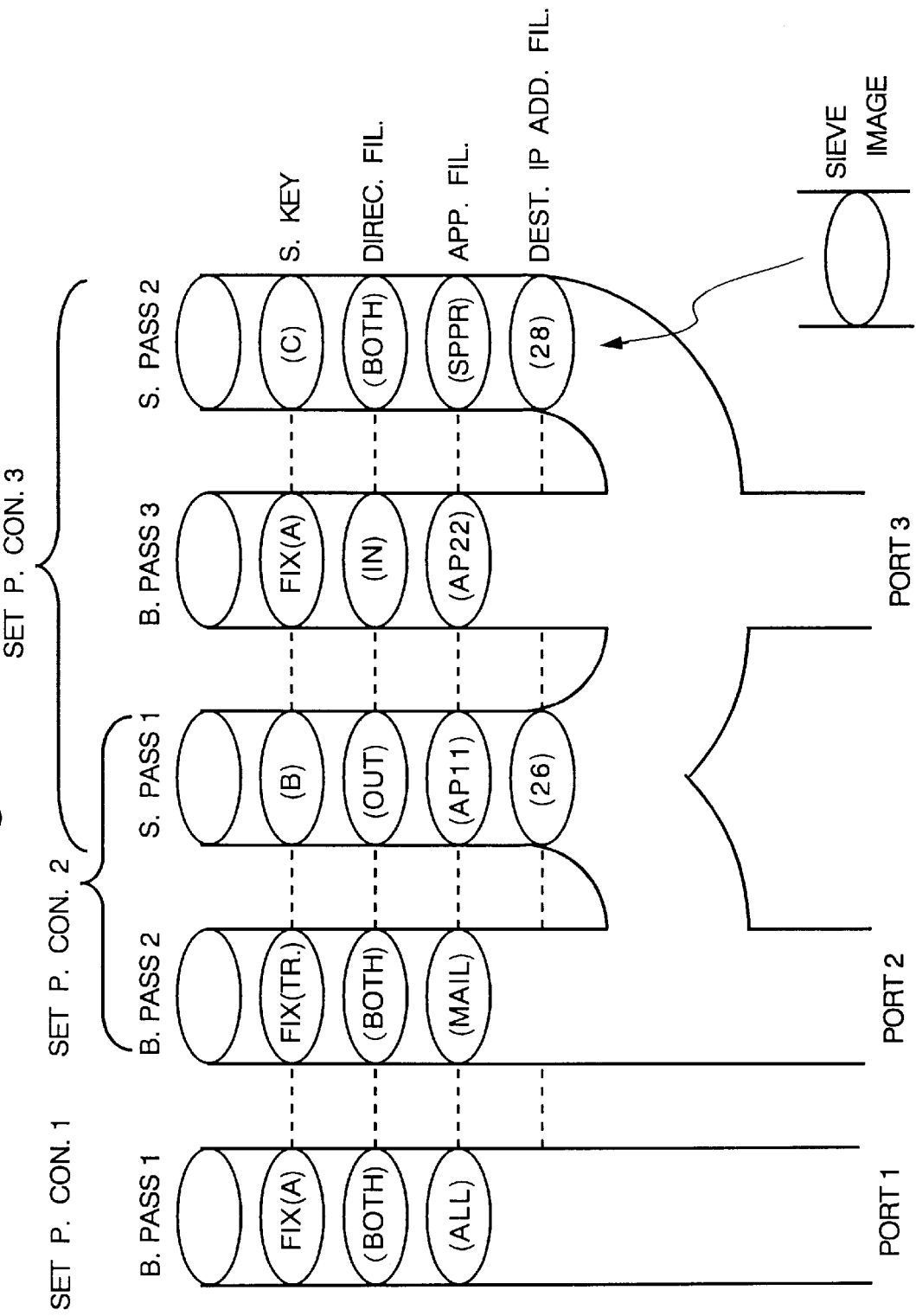
FIG. 25 shows relation between the basic pass condition and the special pass condition of the port condition of FIG. 24.

FIG. 25 shows a conceptional relation among the basic pass condition and the special pass condition of the port condition shown in FIG. 24.

In the conceptional relation shown in FIG. 25. only basic pass condition is set in the port 1 . The basic pass condition and the special pass condition 1 are set in the port 2, and the basic pass condition and two kinds of special pass conditions are set in the port 3. The special pass condition 1 is shared by the ports 2 and 3. In the figure, each pipe shape corresponds to each pass condition. The oval shapes, inserted in each pipe for each pass condition, shows various selecting process by the filter. Parenthesized words or numerals in the ovals denote port conditions of FIG. 24. In the special pass condition, for example, (28) of the destination IP address filter indicates the communication terminal 28. (SPPR) of the application filter denotes the application SPPR. (Both) of the communicating direction filter indicates bidirectional communication. (C) of the session key indicates "key C" for ID of the session key.

The session key indicated by the basic pass condition 1 and 3 is "key A", which is the session key for the group where the encryptor belongs, and the session key is fixed. "Transparent (TR)" is set in the basic pass condition 2.

The basic pass condition and the special pass condition are set in this way, thus the cryptosystem of the invention provides some selections of communication style for the user's convenience as well as security carried out by the encryptor according to the invention. For example, if a user, who usually belongs to the cipher world, wants to access the net news in plaintext, the cryptosystem of the invention enables the user to communicate with the news server by switching the communication mode to plaintext communication. Further, another session key can be indicated using the special pass condition besides the session key assigned to the group. When predetermined groups of the communication terminals are defined as physical groups, the communication terminals can be grouped into logical groups while they belong to the above physical groups. The logical groups can be formed by one condition or a combination of conditions such as the destination IP address, the application, the communicating direction, and the session key.

Figure 26:
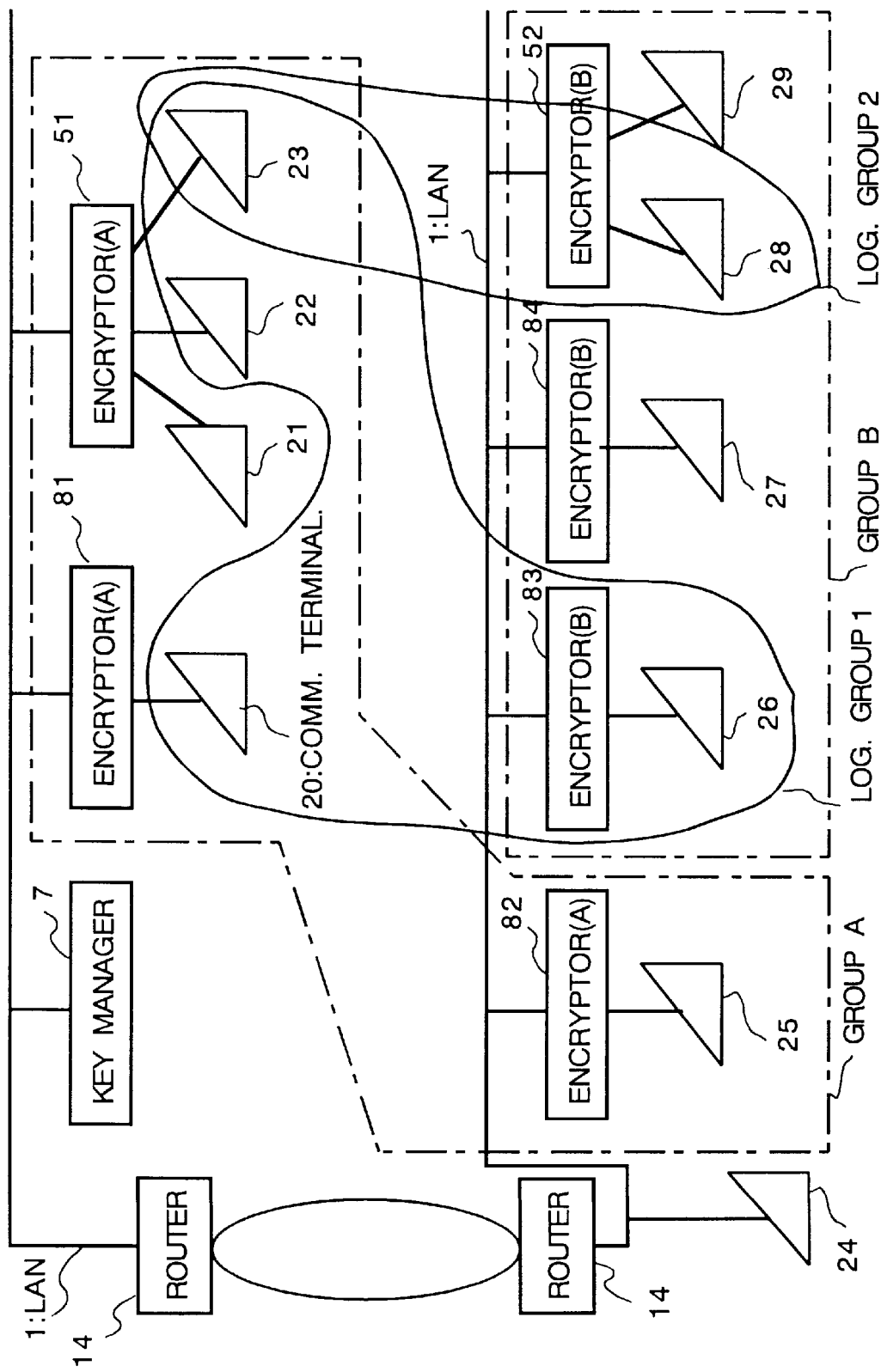
FIG. 26 shows new logical groups of the network system of FIG. 19.

FIG. 26 shows new logical groups of the cryptosystem of FIG. 19, where the encryption condition and the port condition shown in FIGS. 23 and 24 are set in the encryptors 81 and 51.

In case of the specific application (AP11), the communication terminals 20, 22 and 23 belonging to "group A" can output the communication data to the communication terminal 26. The communication terminals 20, 22 and 23 form a new group "logical group 1" with the communication terminal 26 of "group B" by setting the special pass condition 1, though the communication terminals 20, 22 and 23 belong to the group A. When the communication terminals 20, 22 and 23 executes the application (AP11). the logical group 1 is formed. The logical group 1 is formed only when the communicating direction is "output" from the communication terminals 20, 22 and 23 to the communication terminal 26.

"Logical group 2" is formed by the condition set in the special pass condition 2 of the port 3 in FIG. 24. In this case, the logical group 2 is formed when the communication terminal 23 communicates with the communication terminal 28 while the communication terminal 23 executes the application (SPPR). As explained above, a new logical group can be formed by setting the special pass condition among the communication terminals of predetermined groups.

For another example, more than one sub-groups can be formed in the group A based on the special pass condition set in the encryptor.

Further, when a plurality of communication terminals are connected to one encryptor, each communication terminal can be used differently by setting the port condition for each port. For example, the communication terminal 21 belongs only to the group A in the example shown in FIG. 24. The communication terminal 22 is basically a communication terminal for the application (mail), which communicates with the communication terminal executing the application (mail) in plaintext regardless of the group. The communication terminal 22 outputs data to the communication terminal 26 when the application (AP11) is executed.

The communication terminal 23 receives the data from the other communication terminals when the application (AP22) is executed. The communication terminal 23 also executes the application (AP11) and outputs the data to the communication terminal 26. The communication terminal 23 further executes the application (SPPR) and communicates with the communication terminal 28.

In the above way, each of the plurality of communication terminals, connected to the same encryptor, can execute different processes, by respectively setting the port condition for each port.

Figure 27:
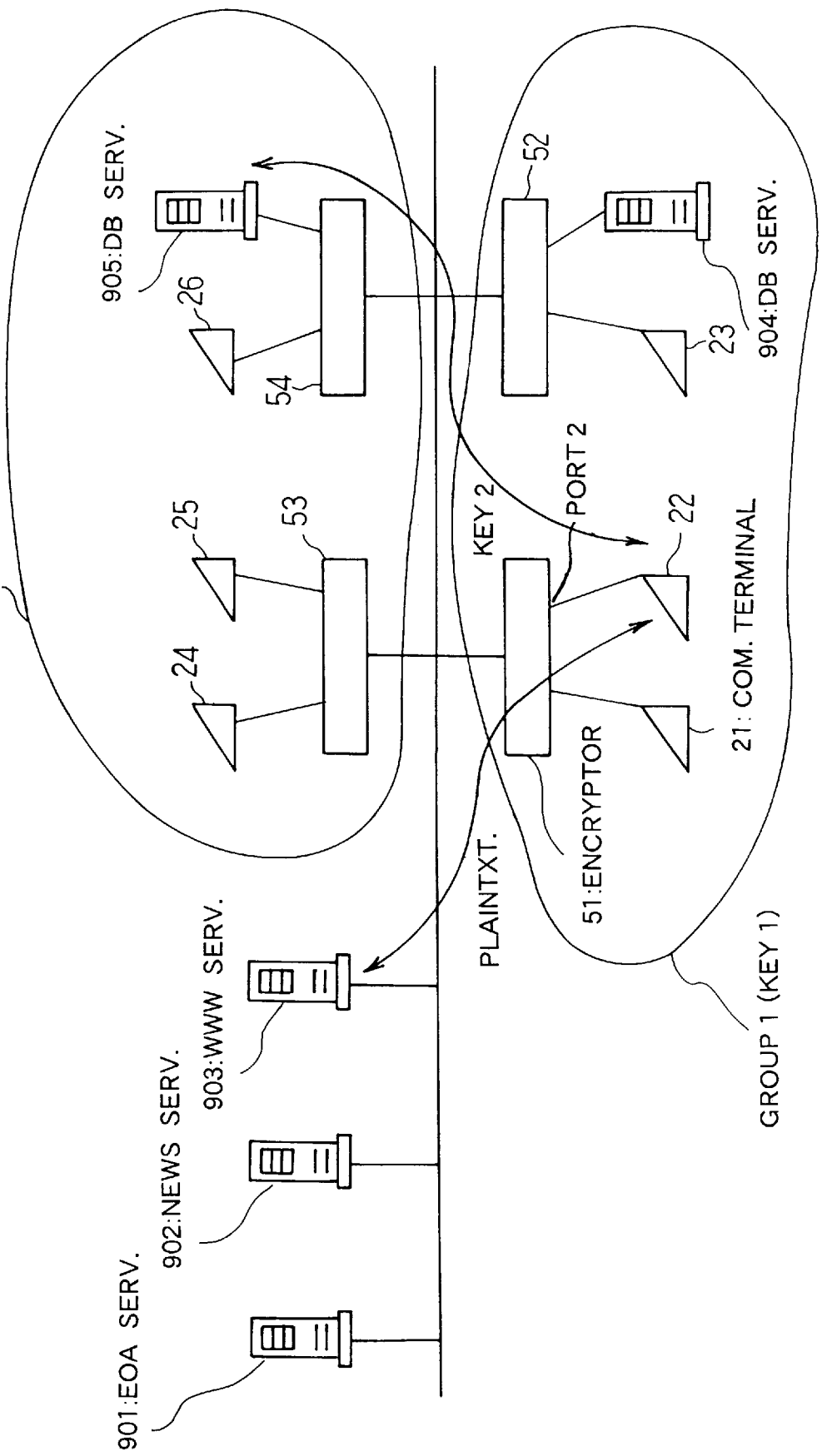
FIG. 27 shows an example of a network including the HUB encryptor.

FIG. 27 shows a network example including the HUB encryptor.

Figure 28:
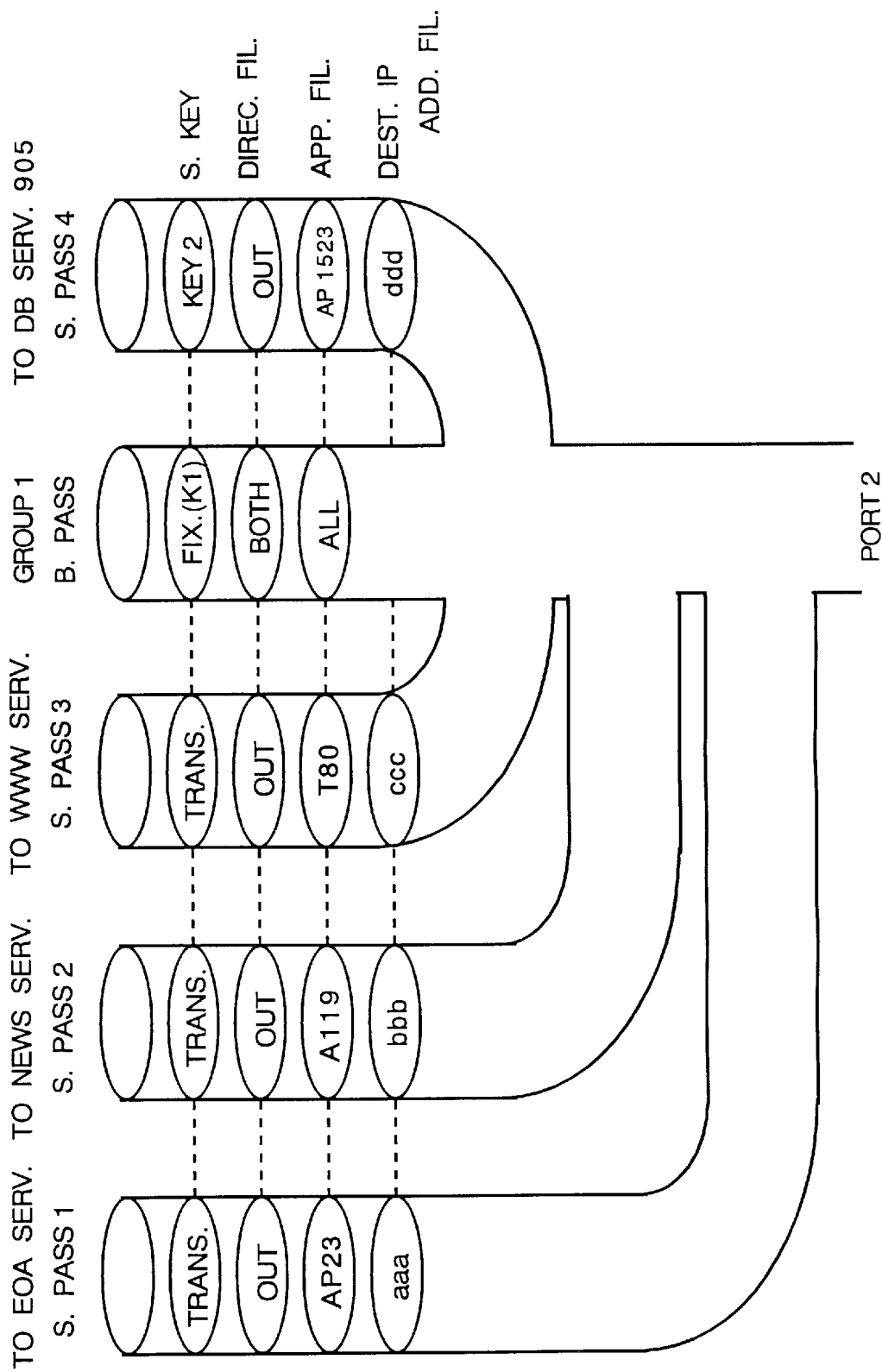
FIG. 28 shows the port condition set in the communication terminal 22 in the network of FIG. 27.

In FIG. 27, "group 1" is formed by the communication terminals 21 and 22, connected to the encryptor 51, and the communication terminal 23 and a DB (Data Base) server 904, connected to the encryptor 52. "Session key 1" is used for the group 1. "Group 2" is formed by the communication terminals 24 and 25, connected to the encryptor 53, and the communication terminal 26 and a DB server 905, connected to the encryptor 54. "Session key 2" is used for the group 2. The encryptors 51–54 are HUB encryptors. The communication terminal 22 connected to the port 2 of the encryptor 51 communicates with an EOA (Engineering Office Automation) server 901, a news server 902 and a WWW server 903 in plaintext. The communication terminal 22 also communicates with the DB server 905 in ciphertext. In this case, the port condition is set in the encryptor 51 as described below (FIG. 28 only shows port condition of the port 2).

Basic pass condition: applications (all), ---"key 1"

Special pass condition 1: destination IP address (aaa) & application (AP23) & communicating direction (output), ---transparent Special pass condition 2: destination IP address (bbb) & application (A119) & communicating direction (output), ---transparent Special pass condition 3: destination IP address (ccc) & application (T80) & communicating direction (output), ---transparent Special pass condition 4: destination IP address (ddd) & application (AP1523) & communicating direction (output), ---"key 2"

In the above condition, "aaa" shows IP address of the EOA server, "bbb" shows IP address of the news server, "ccc" shows IP address of the WWW server and "ddd" shows IP address of the DB server 905. The basic pass condition indicates that the communication belongs to the group 1, that is, the data processed by all applications and in both direction is encrypted/decrypted by the session key 1. The special pass condition 1 is set for communicating with the EOA server in plaintext. The special pass condition 2 is set for communicating with the news server in plaintext. The special pass condition 3 is set for communicating with the WWW server in plaintext. The special pass condition 4 is set for communicating with the DB server 905 in ciphertext using the session key 2.

Figure 29:
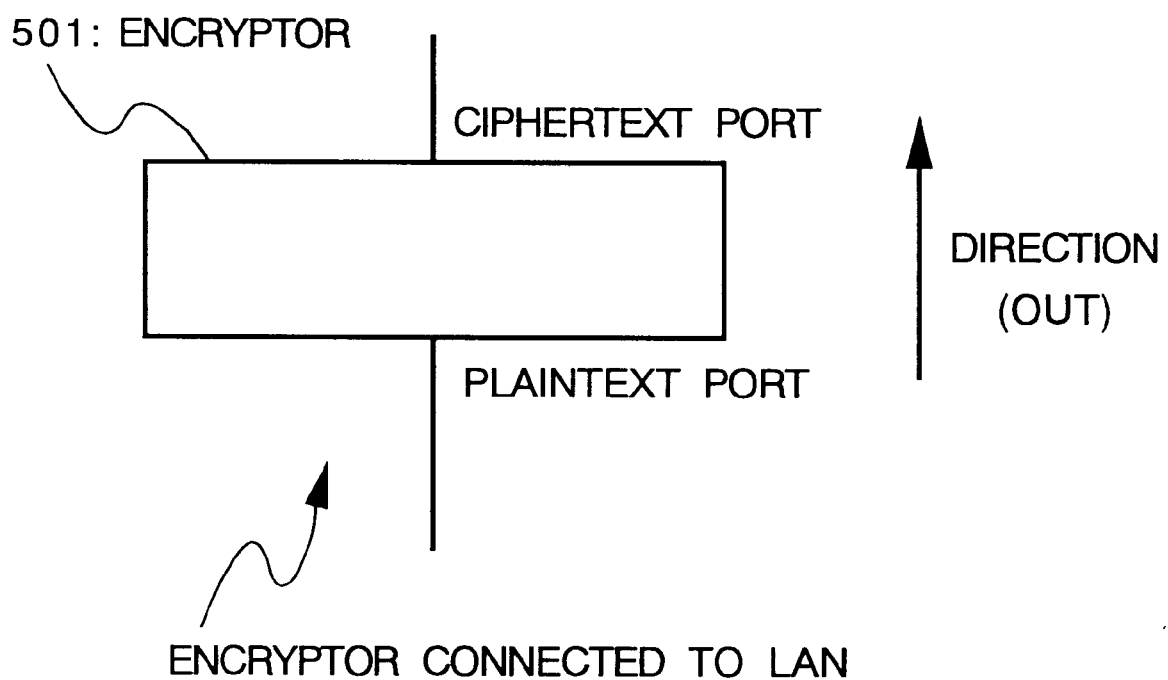
FIG. 29 shows the encryptor for connecting to the LAN.

FIG. 29 shows the encryptor for connecting to the LAN. The encryptor 501, connected to the LAN, encrypts plaintext data input from the plaintext port and outputs the data from the ciphertext port.

Figure 30:
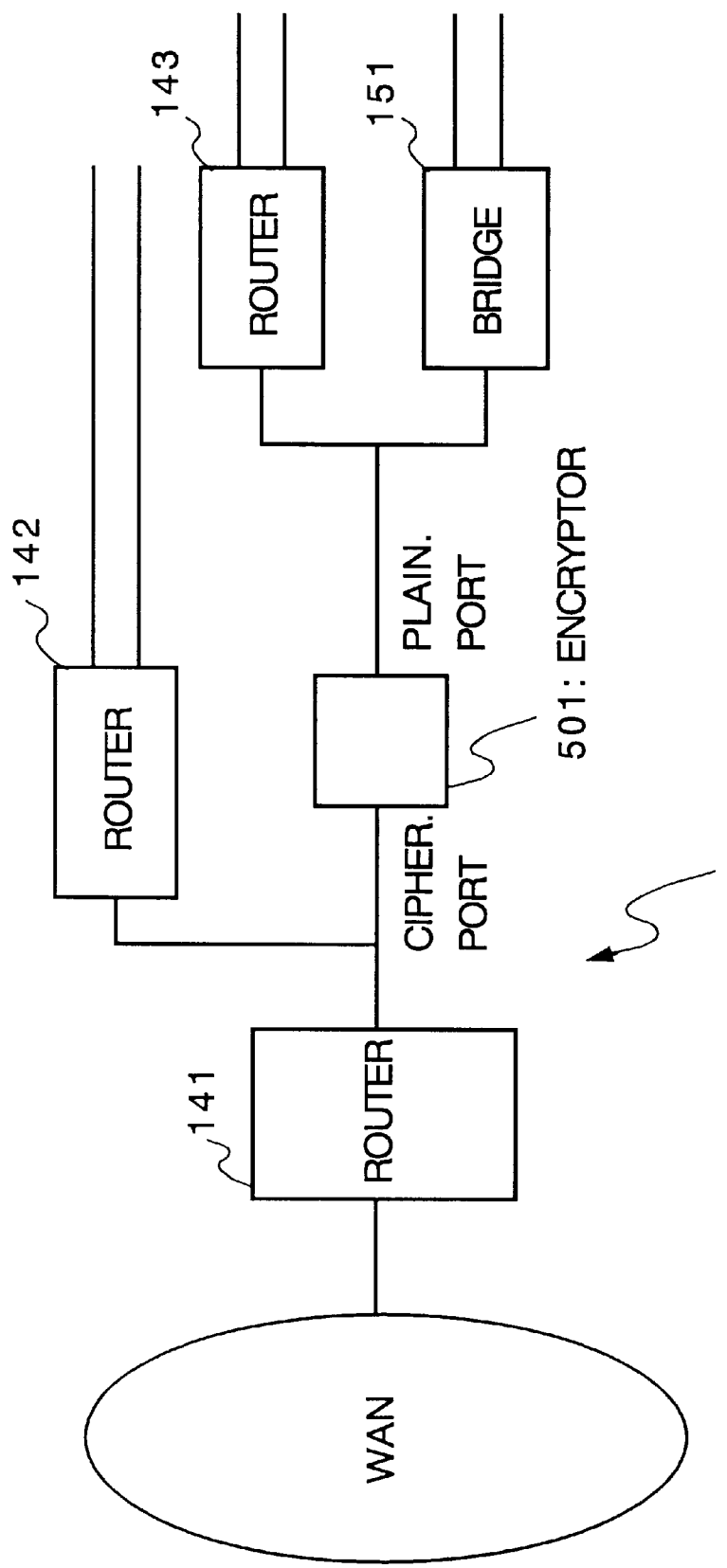
FIG. 30 shows an example of a cryptosystem including the encryptor connected to the LAN.
Figure 31:
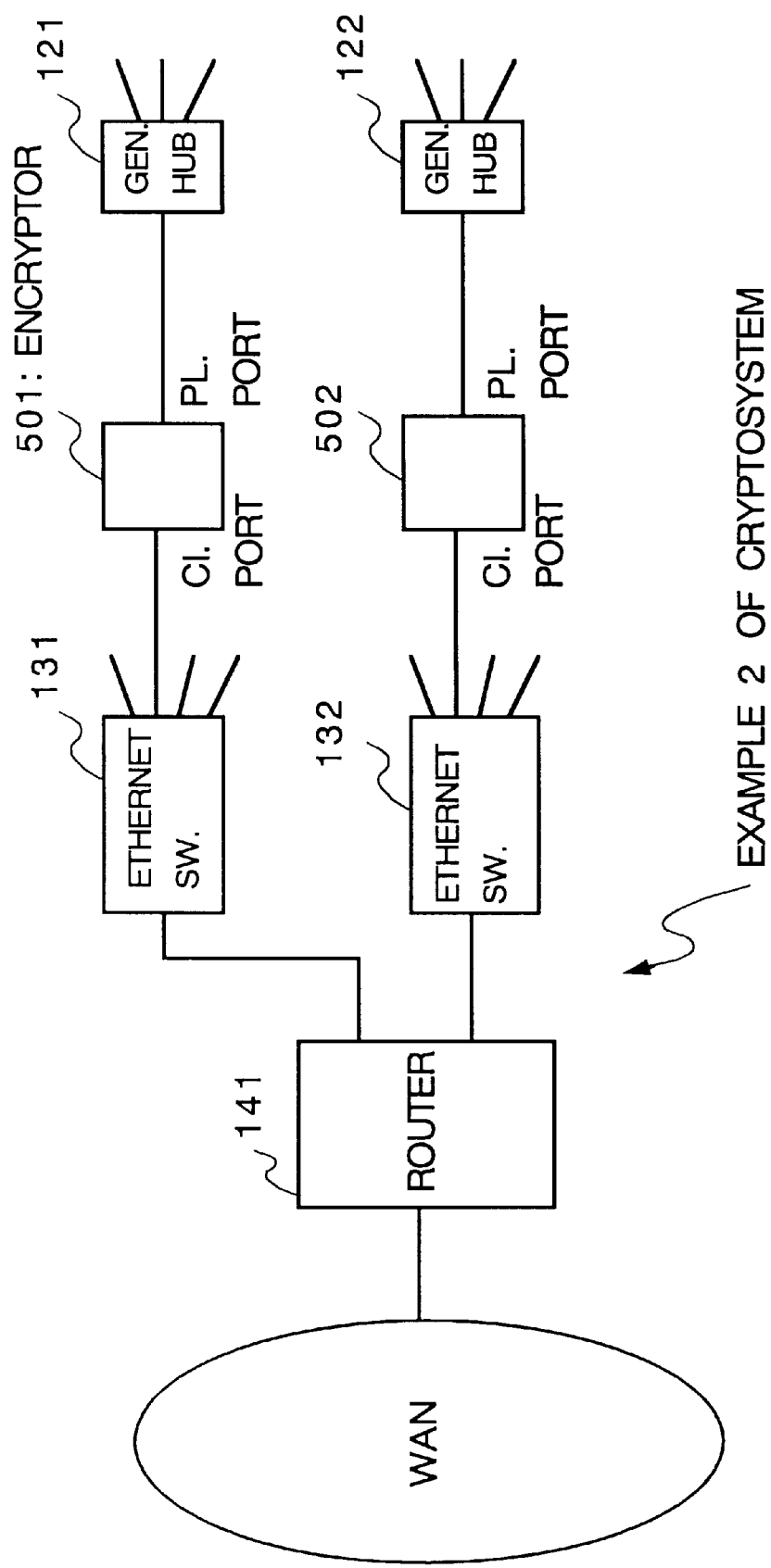
FIG. 31 shows another example of a cryptosystem including the encryptor connected to the LAN.

FIGS. 30 and 31 show examples of the cryptosystem, where the encryptor 501 is connected to the LAN.

In FIG. 30, the ciphertext port of the encryptor 501 is connected to the router 141 which is connected to the router 142 and the LAN. The router 143 and a bridge 151 are connected to the plaintext port of the encryptor 501. Plaintext data is input to the plaintext port of the encryptor 501 from the router 143 and the bridge 151. The input data is encrypted by the encryptor 501 and the encrypted result is output from the ciphertext port. The encrypted data is sent to the communicating partner through the wide area network (WAN). Or the encrypted data can be sent to the communicating partner through the router 142.

FIG. 31 shows the example of the cryptosystem, where the encryptors 501 and 502 are connected to the LAN.

The router 141 is connected to the WAN and Ethernet switches 131 and 132 are connected to the router 141. The ciphertext port of the encryptor 501 for connecting to the LAN is connected to one of the ports of the Ethernet switch 131. The plaintext port of the encryptor 501 is connected to a general HUB 121. The ciphertext port and the plaintext port of the encryptor 502 are connected in the same way. Plaintext data received by the general HUB 121 or 122 is input to the plaintext port of the encryptor 501 or 502, is encrypted and output to the Ethernet switch 131 or 132 from the ciphertext port. The data flows in ciphertext through the WAN, the Ethernet switch 131 or 132 and the router 141, that is, the output direction side of the ciphertext port of the encryptor 501 or 502.

Figure 32:
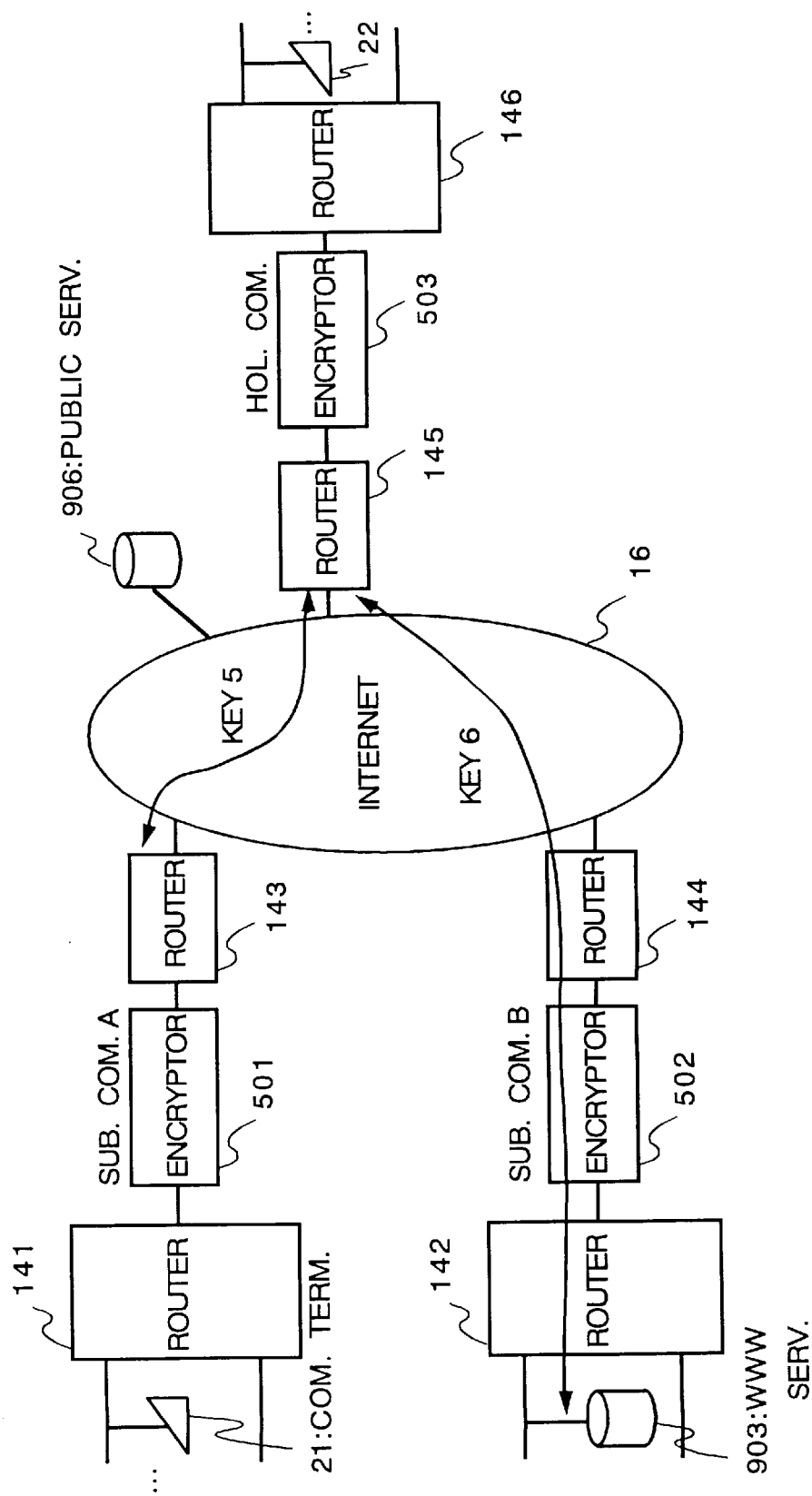
FIG. 32 shows an example of network including the encryptor connected to the LAN.

FIG. 32 shows another network example, where the encryptor is connected to the LAN.

A subsidiary company "A", a subsidiary company "B" and a holding company mutually communicate through the Internet 16. In the network of the subsidiary company "A", the encryptor 501 is connected to the router 143 for the Internet 16. In the network of the subsidiary company "B", the encryptor 502 is connected to the router 144 for the Internet 16. In the network of the holding company, the encryptor 503 is connected to the router 145 for the Internet 16. In this network configuration, in case of mutual communication among the holding company and the subsidiary companies "A" and "B". the communication data is encrypted by the encryptors 501, 502 and 503 through the network of the Internet, which provides communication security.

Figure 33:
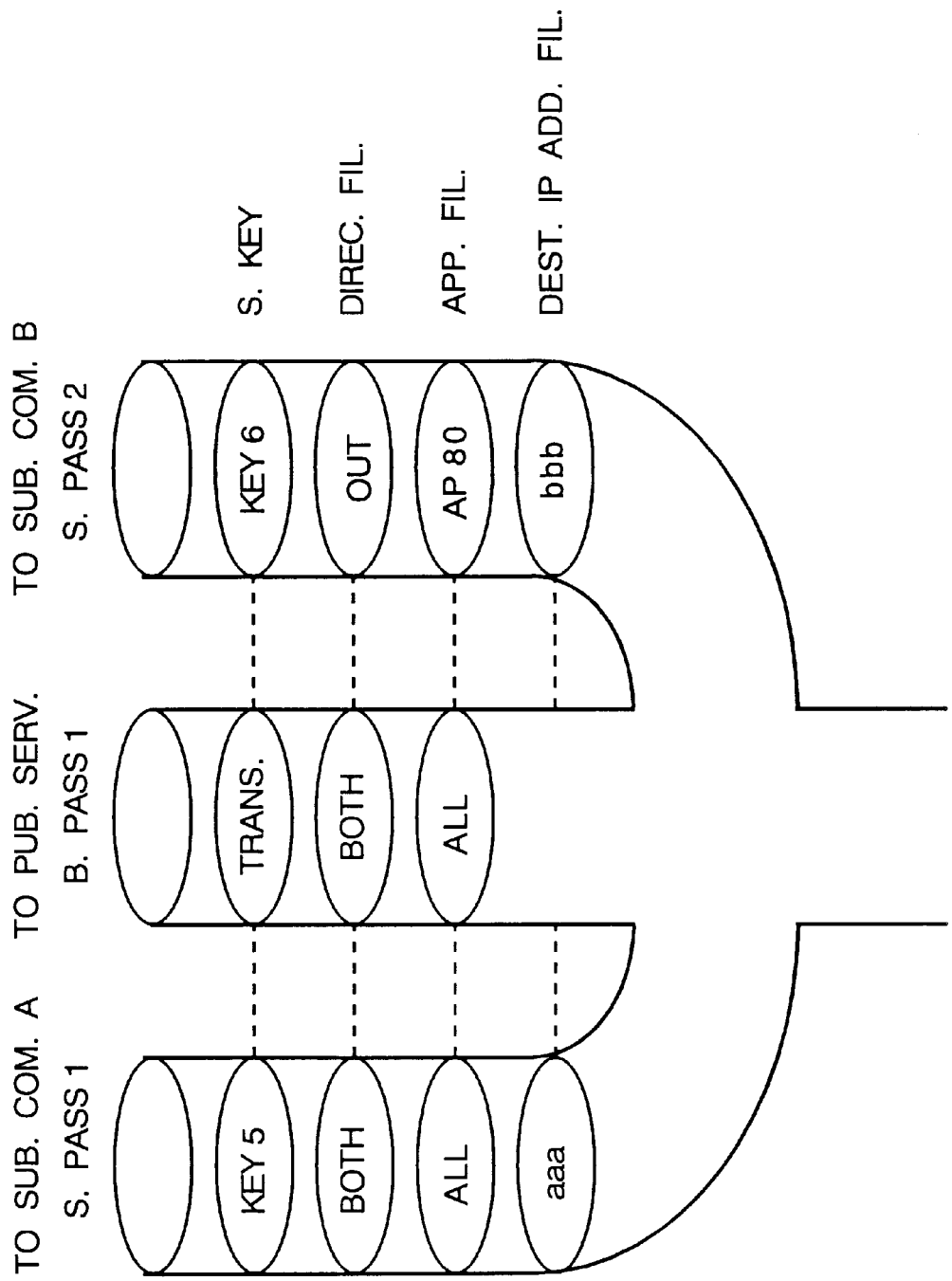
FIG. 33 shows the encrypting condition set in the encryptor shown in FIG. 32.

The holding company and the subsidiary company "A" mutually communicate using "session key 5". The holding company communicates with the subsidiary company "B" using "session key 6" for access only to the WWW server. The holding company wants to access various public servers 906 on the Internet 16 in plaintext. In this case, the encryption condition is set in the encryptor 503 of the holding company as follows and they are shown in FIG. 33.

Basic pass condition 1: applications (all), ---transparent
   Special pass condition 1: IP address (aaa) & applications (all), ---"key 5"
   Special pass condition 2: IP address (bbb) & application (AP80) & communicating direction (output), ---"key 6"

In the above condition, "aaa" shows the IP address of the router 141 located in the subsidiary company "A". "bbb" shows the IP address of the router 142 located in the subsidiary company "B".

The encryptor for connecting the LAN has one plaintext port, thus the encryptor memorizes not the port condition but encryption condition.

As stated in the above description of the embodiment, when one encryptor provides a plurality of ports, each of which is connected to the communication terminal, the port condition is set and memorized in each port for encrypting the data. Thus, encryption condition can be set based on the destination IP address, the application, the communicating direction and the session key as well as selecting the communication mode between the ciphertext communication and plaintext communication. Logical groups can be newly constructed based on the destination IP address, the application, the communicating direction and the session key besides the predetermined physical groups for ciphertext communication. Each port condition, set in a plurality of the communication terminals connected to one encryptor, can be different and the user uses each communication terminal in various ways. The embodiment provides the user more effective and more convenient cryptosystem.

Embodiment 4

In a fourth embodiment of the present invention, another cryptosystem, where cipher communication can be performed among a plurality of cipher managing domains. Each cipher managing domain is formed by the key manager, the encryptor and the communication terminal. The common session key is shared for mutual communication among the plurality of cipher managing domains. Further, in the cryptosystem of the fourth embodiment, logical groups are formed by the communication terminals belonging to different cipher managing domains by setting the common session key in the encryption condition and the port condition in the encryptors.

Figure 34:
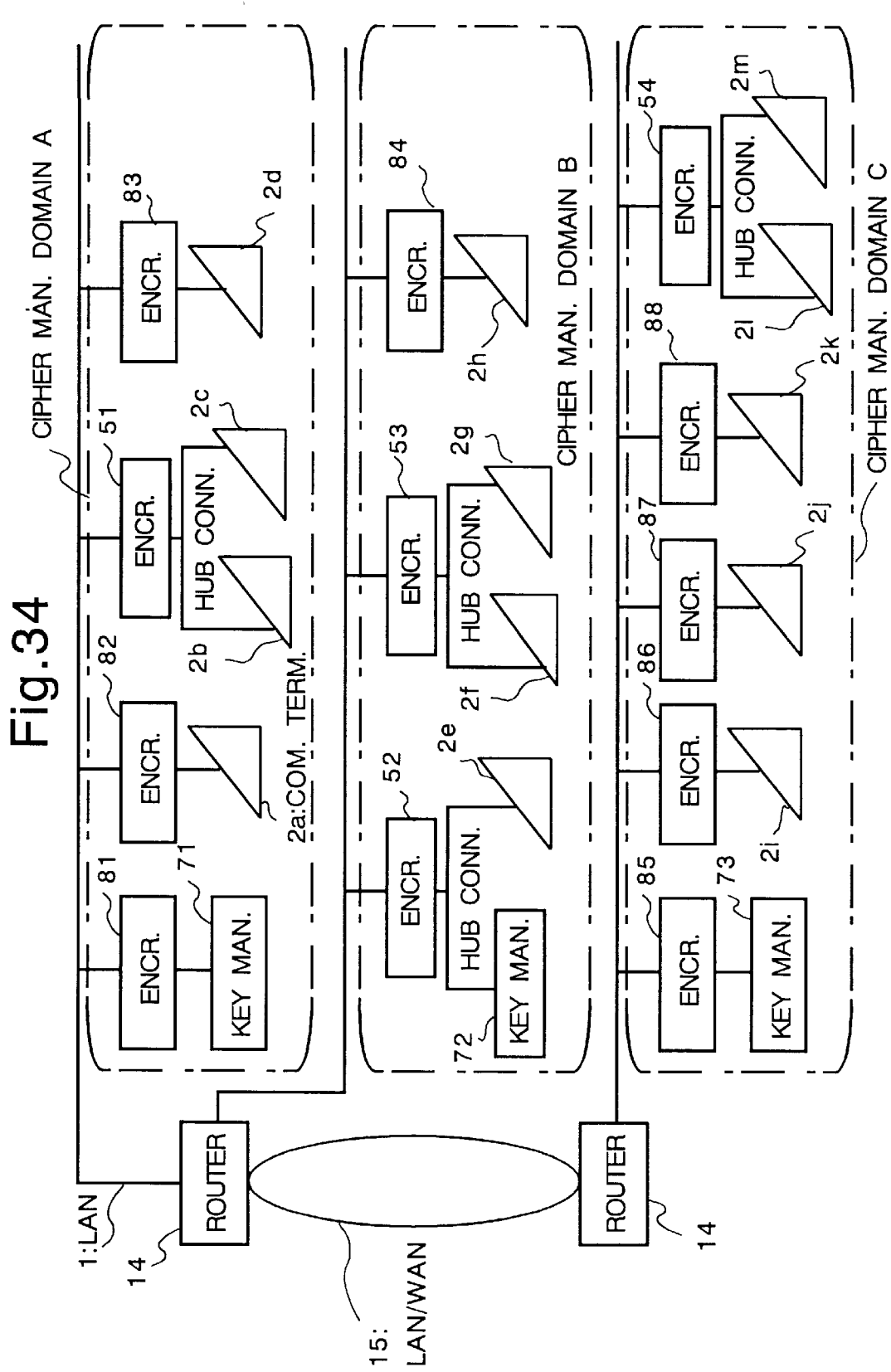
FIG. 34 shows a network system of a cryptosystem according to the fourth embodiment of the invention.

FIG. 34 shows a network example of the cryptosystem according to the fourth embodiment.

The cryptosystem of the figure includes cipher managing domains A, B and C, each of which includes one key manager, a plurality of encryptors and a plurality of communication terminals. The three cipher managing domains are mutually connected via the routers 14 and the LAN/WAN 15 in the network.

Usually, the cipher managing domains cannot perform ciphertext communication mutually because key managers 71–73, belonging to different domains, generate and manage the session key, respectively, in the cipher managing domains A–C. In this embodiment, ciphertext communication can be performed by sharing the common session key among the plurality of cipher managing domains.

In the cryptosystem of this embodiment, one of the plurality of key managers is defined as a master key manager to generate the common session key and to distribute the common session key to each of the other key managers. In this example of FIG. 34, the key manager 71 of the cipher managing domain A is defined as the master key manager for generating and distributing the common session key. The key managers 72 and 73 receive the common session key from the key manager 71.

The session key, used in only one cipher managing domain, is called "local key", hereinafter.

Figure 35:
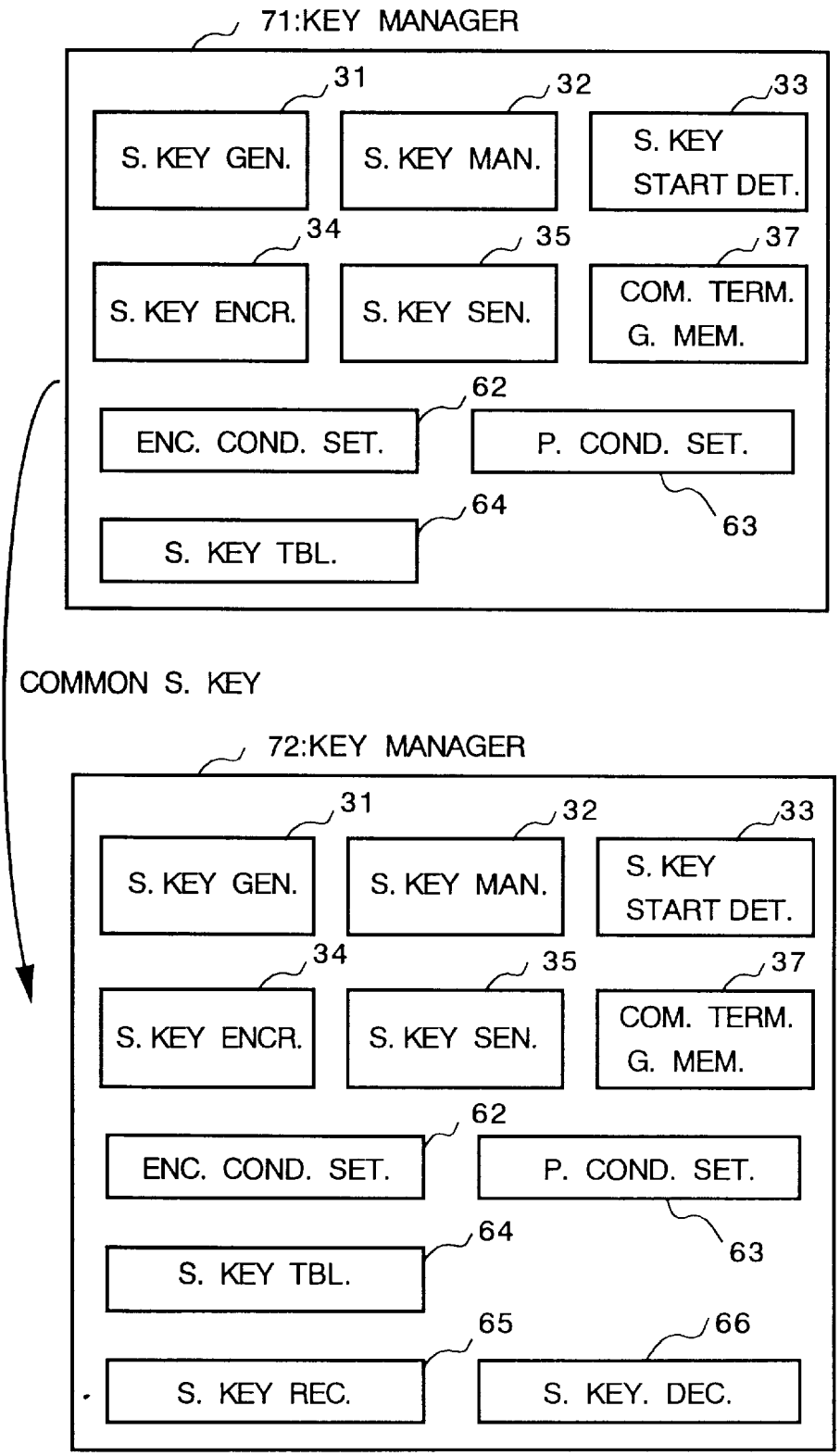
FIG. 35 is a block diagram showing the key manager according to the fourth embodiment.

FIG. 35 is a block diagram showing the key managers 71 and 72.

The key managers 71 and 72 further include session key tables 64 besides the configuration of the key manager 7 shown in FIG. 22. The session key generating units 31 of the key managers 71 and 72 generate a plurality of session keys and the session keys are memorized in the session key tables 64. In this embodiment, each of the key managers 71–73 generates 32 session keys at maximum.

FIG. 36 shows an example of the session key table 64. The session key table 64 includes columns for indicating the key number, permission flags showing permission of generating key, generated keys and attributes for the keys. The common session key or the local key corresponding to each of the key numbers 1–32 is specified in the column for the key. The local key is periodically generated to update for increasing security of the local key. The common session key is not permitted to update, thus the permission flag for the common session key is settled "not permitted" ("x" in the figure). "Common (A, B)" is written in the attribute for the common session key to indicate the key is the common session key between the cipher managing domains A and B.

The key manager 72 further includes a session key receiving unit 65 and the session key decrypting unit 66 as well as the session key table besides the configuration of the key manager 7 of FIG. 22. The session key receiving unit 65 receives the common session key encrypted by and distributed from the key manager 71 and the session key decrypting unit 66 decrypts the common session key.

The communication terminal group memorizing units 37 of the key managers 71–73 memorize the address of the key manager, the encryptor and the communication terminal for the cipher managing domains A–C, respectively.

The other elements shown in FIG. 35 are the same as ones described in the third embodiment. The NODE encryptors 81–88 and the HUB encryptors 51–54 are the same as ones shown in the block diagram of FIG. 22.

In the cipher managing domain A, the key manager 71 generates the common session key and a plurality of the local keys to distribute them to each of the encryptors 81–83 and 51 belonging to the cipher managing domain A. The common session key is distributed to the key managers 72 and 73. The key manager 71 periodically generates the local key and updates the local key of each encryptor.

The key manager 71 sets the encryption condition in the encryption condition memorizing units 811–831 of the encryptors 81–83 by the encryption condition setting unit 62. The port condition is set by the port condition setting unit 63 of the key manager 71 and is memorized in the port condition memorizing unit 921.

Also in the cipher managing domains B and C, the key managers 72 and 73 periodically generate and update the local keys for using in each domain. The common session key distributed from the key manager 71 is used in the cipher managing domains B and C. The key managers 72 and 73 set the encryption condition and the port condition where the local key and the common session key are indicated to use, in the encryptors included in each domain which the key managers belong to.

The following is a procedure of generating and distributing the common session key of the key manager 71.

In a first procedure, keys, whose numbers are 5, 8, 32 are predetermined as the common session keys 1–3 between the cipher managing domains A and B.

(1) The session key generating unit 31 of the key manger 71 generates 32 session keys.

(2) The session key managing unit 32 writes the 32 session keys generated by the session key generating unit 31 at the above (1) in the session key table 64. The session key managing unit 32 sets the permission flags for the session keys whose numbers are 5, 8 and 32 as "not permitted" ("x" in the figure) in the session key table 64. Further, the session key managing unit 32 writes "common (A, B)" indicating to use the common session key for ciphertext communication between the cipher managing domains A and B in the attribute column for the key numbers of 5, 8 and 32.

(3) The session key managing unit 32 encrypts the common session keys 1–3 by the session key encrypting unit 34 and sends the encrypted common session keys to the key manager 72 of the cipher managing domain B by the session key sending unit 35.

(4) In the key manager 72 of the cipher managing domain B, the session key receiving unit 65 receives the encrypted common session keys 1–3 sent from the session key sending unit 35 of the key manager 71. The session key managing unit 32 of the key manager 72 sends the received encrypted common session keys to the session key decrypting unit 66. The session key decrypting unit 66 decrypts the encrypted common session keys. The session key managing unit 32 of the key manager 72 sets the permission flags for the keys of 5, 8 and 32 as "not permitted" ("x" in the figure) in the session key table 64. Further, the session key managing unit 32 writes "common (A, B)" indicating to use the common session key for cipher communication between the cipher managing domains A and B in the attribute column for the key numbers of 5, 8 and 32. If the common session keys have been already written for key numbers of 5, 8 and 32 in the session key table 64 of the key manager 72, the common session keys are updated.

(5) The session key generating unit 31 of the key manager 72 generates the local key for ciphertext communication in its own cipher managing domain. The session key managing unit 32 writes the session key generated by the session key generating unit 31 as the local key in column for keys, whose permission flag indicates "permitted" ("O" in the figure) in the session key table 64. The local keys of the key managers 71 and 72 are distributed to the encryptors in their own cipher managing domains as well as the above embodiment.

Another procedure of generating and distributing the common session key of the key manager 71 will be explained below.

"Common session key 1" is defined as the common session key for ciphertext communication among the cipher managing domains A, B and C. "Common session key 2" is defined as the common session key for ciphertext communication between the cipher managing domains A and B. "Common session key 3" is defined as the common session key for ciphertext communication between the cipher managing domains A and C. "Common session key 4" is defined as the common session key for ciphertext communication between the cipher managing domains B and C. In this case, the key manger 71 generates the common session keys 1–4 and distributes the common session keys 1, 2 and 4 to the key manager 72 of the cipher managing domain B. The common session keys 1, 3 and 4 are distributed to the key manager 73 of the cipher managing domain C.

In the above first procedure, the key numbers of 5, 8 and 32 are predetermined as the key numbers for registering the common session keys using between the key managers 71 and 72. While, according to the second procedure, four arbitrary session keys, for example, are selected as the common session keys from 32 session keys generated by the key manager 71 and the permission flags corresponding to the selected session keys are set as "not permitted". The key manager 71 indicates which common session key is used for ciphertext communication among plural cipher managing domains in the column for attribute of the session key table 64. The key manager 71 distributes the key number, the common session key and the attribute information to the key manager of corresponding cipher managing domain. The key manager, where the above information is distributed, writes the common session key in the column of distributed key number, sets the corresponding permission flag "not permitted" and indicates with which cipher managing domain to share the common session key in the column for the attribute of the session key table 64. The common session keys can be distributed and managed in the above way.

After the common session keys are distributed to the cipher managing domains B and C, each of the key managers 71–73 sets the encryption condition and the port condition in the encryptor of each own cipher managing domain by the encryption condition setting unit 62 and the port condition setting unit 63. The encryption condition and the port condition including the basic pass condition and the special pass condition are set in the same way as the above embodiment.

Figure 37:
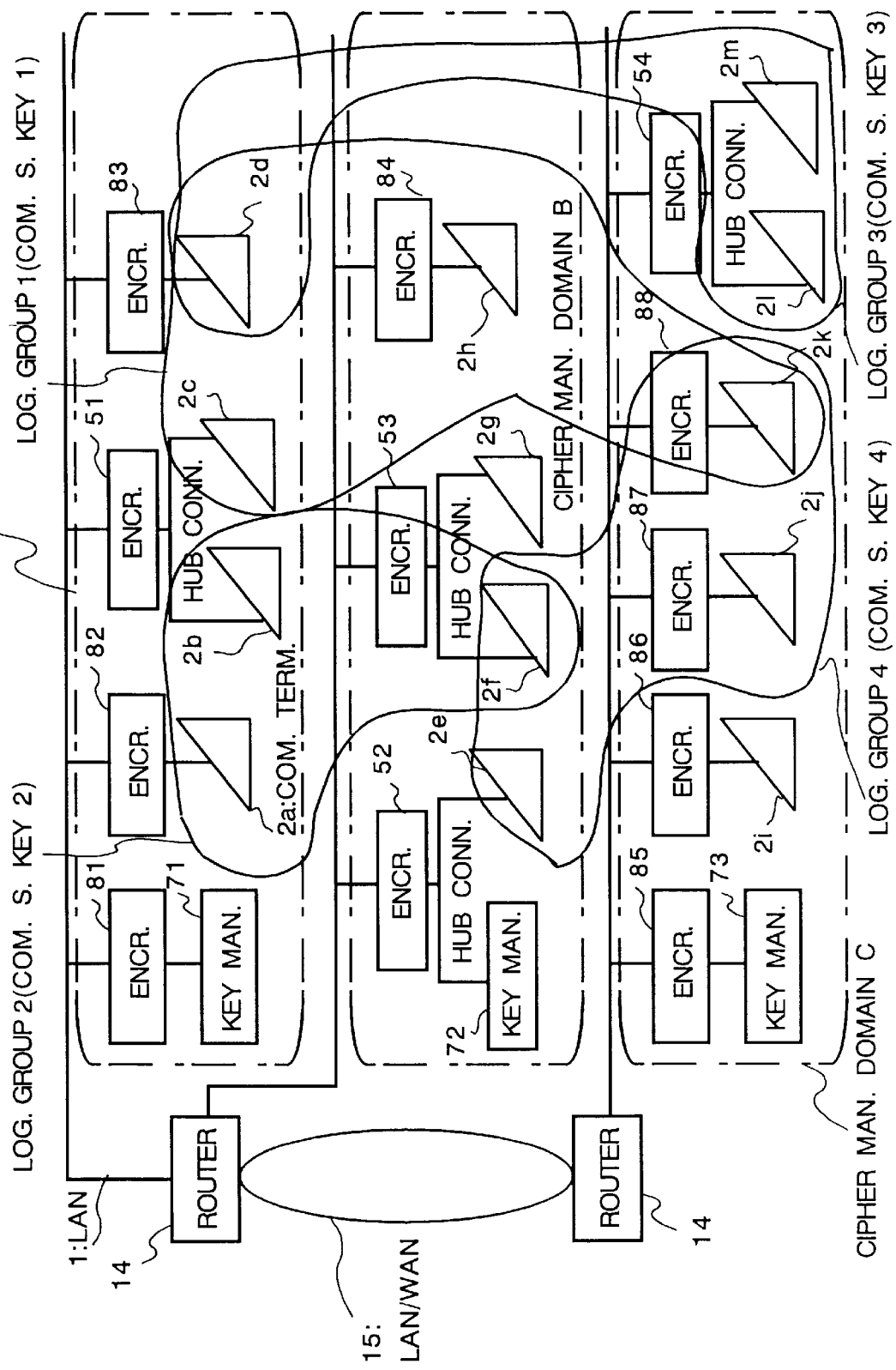
FIG. 37 shows another grouping of the network system of FIG. 34, where each group includes a plurality of encryptors beyond the cipher managing domain.
Figure 38:
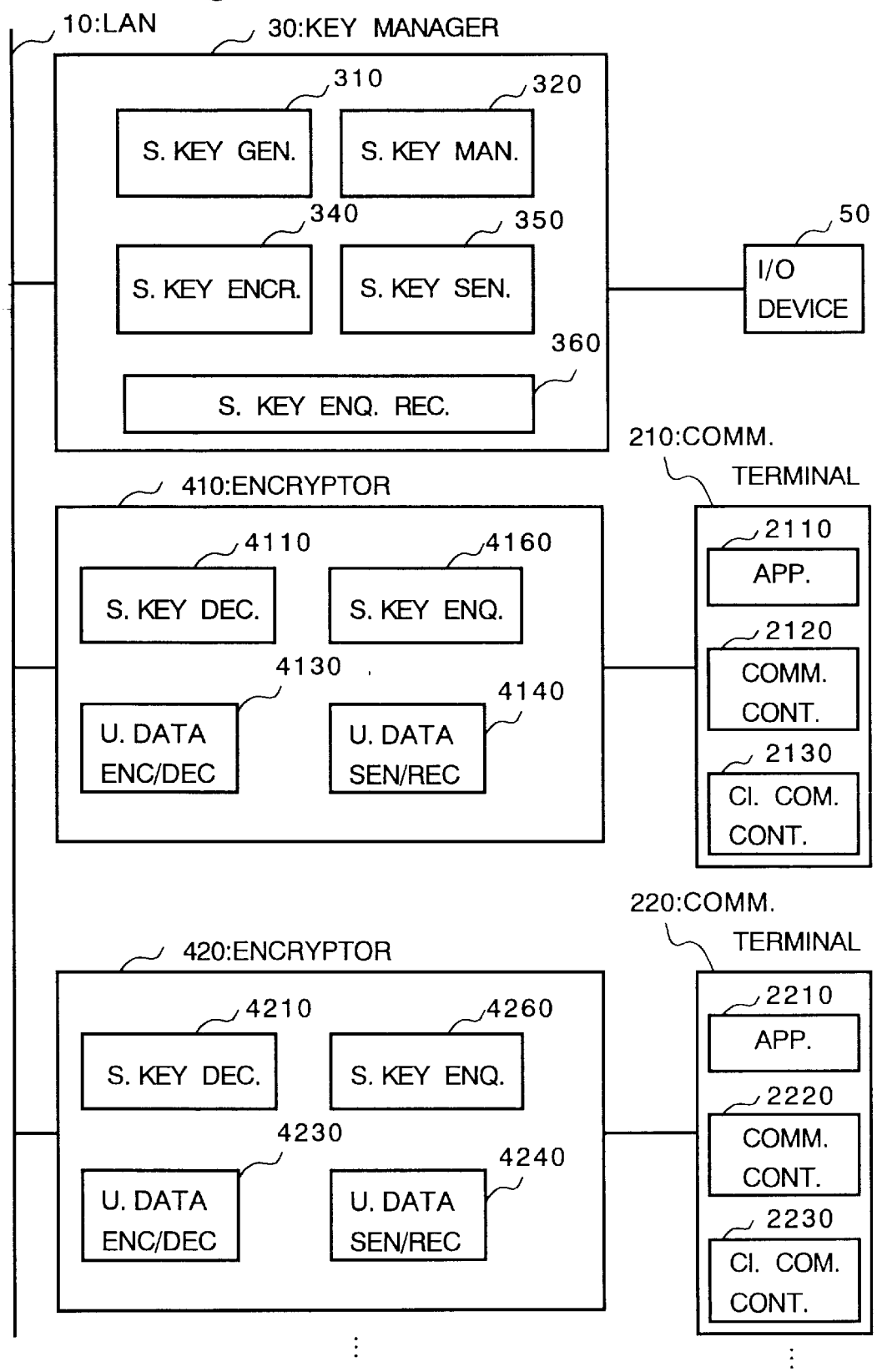
FIG. 38 shows a configuration of a conventional cipher communication system.
Figure 39:
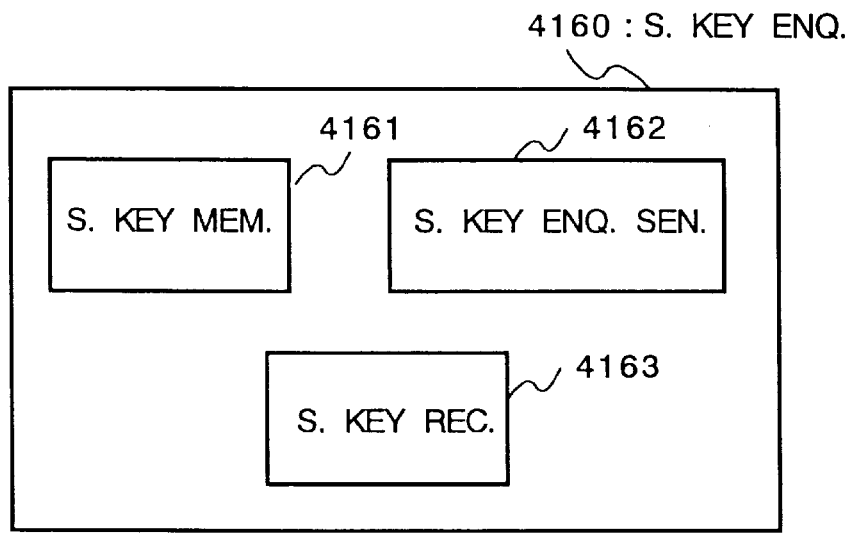
FIG. 39 shows a configuration of the session key enquiry unit of FIG. 38 in detail.
Figure 40:
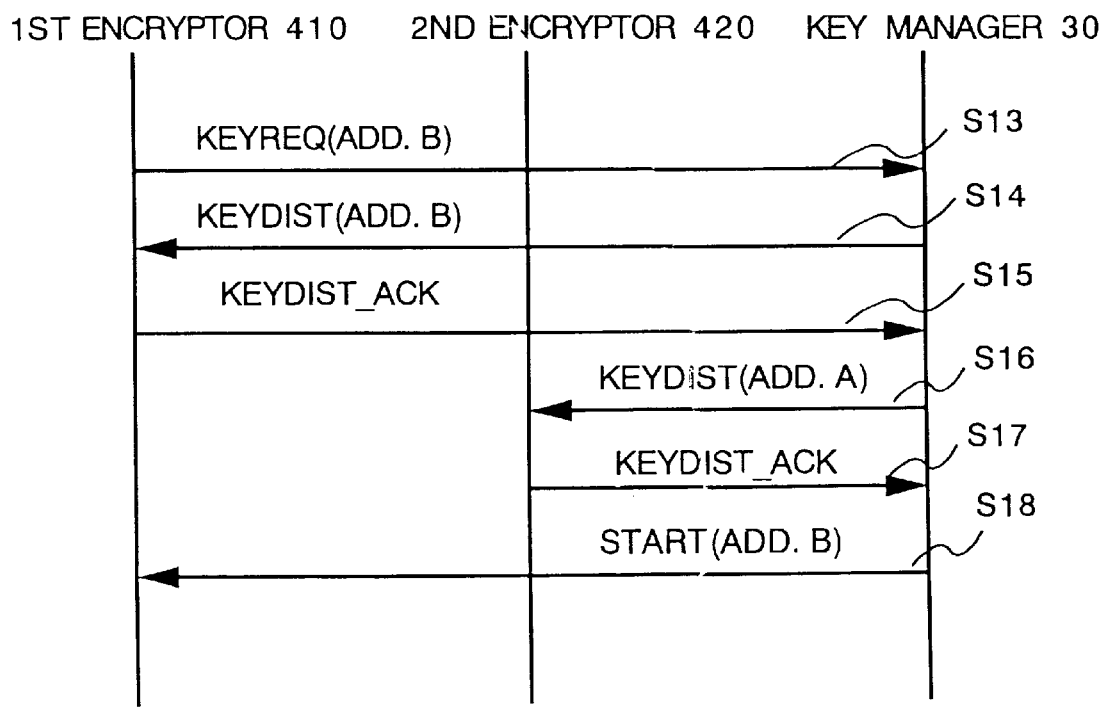
FIG. 40 is a sequence chart showing a procedure of distributing the session key in the conventional cipher communication system.

FIG. 37 shows another example of network system, where the logical groups are formed beyond each cipher managing domain in case of setting the encrypting condition and the port condition using the common session keys 1–4.

"Logical group 1", where ciphertext communication is performed using "common session key 1" for encrypting/decrypting data, includes the communication terminals 2c, 2d, 2h and 2k. "Logical group 2", where ciphertext communication is performed using "common session key 2" for encrypting/decrypting data, includes the communication terminals 2a, 2b and 2f. "Logical group 3", where ciphertext communication is performed using "common session key 3" for encrypting/decrypting data, includes the communication terminals 2d, 2l and 2m. "Logical group 4", where ciphertext communication is performed using "common session key 4" for encrypting/decrypting data, includes the communication terminals 2e, 2f, 2i and 2k. In this way, the common session key is shared among a plurality of the cipher managing domains, each of which has its own session keys, thus logical groups can be newly formed including plural communication terminals beyond the cipher managing domain, where each communication terminal belongs.

As described above, according to the fourth embodiment of the invention, a network includes a plurality of cipher managing domains having the key manager, the encryptor and the communication terminals. In each cipher managing domain, the key manager generates the local key and manages ciphertext communication inside of its own cipher managing domain. Among the communication terminals, each of which belongs to different cipher managing domain, ciphertext communication can be performed by sharing the common session key by plural communication terminals and setting the encryption condition and the port condition using the common session key. Information of the destination IP address, the application, communicating direction and the session key can be set in the basic pass condition and the special pass condition, thus the logical groups can be formed by the plurality of the communication terminals beyond each cipher managing domain. The cryptosystem of the embodiment increases the security of the system and increases the convenience of the user because ciphertext communication can be performed by setting the destination IP address, the application and the communicating direction with the common session key.

Having thus described several particular embodiments of the present invention, various alterations, modifications, and improvements will readily occur to those skilled in the art. Such alterations, modifications, and improvements are intended to be part of this disclosure, and are intended to be within the scope of the present invention. Accordingly, the foregoing description is by way of example only, and is not intended to be limiting. The present invention is limited only as defined in the following claims and the equivalents thereto.

What is claimed is:

1. A cryptosystem comprising:

a communication apparatus;

an encryptor for encrypting/decrypting communication data sent/received by the communication apparatus using a session key; and a key manager for managing the session key, wherein the encryptor comprises a mode switch for setting a communication mode wherein the communication mode is one of a mode in which communication data is encrypted/decrypted by the session key and a mode in which communication data is not encrypted/decrypted by the session key, wherein the key manager includes a valid/invalid setting unit for setting valid/invalid information showing validity/invalidity of the mode switch of the encryptor and sending the valid/invalid information to the encryptor, and wherein the encryptor further comprises a validity/invalidity judging unit for judging that the communication data is to be encrypted/decrypted based on the mode switch and the valid/invalid information.

2. The cryptosystem of claim 1, wherein the encryptor further comprising:

a session key memorizing unit for memorizing at least one session key for encrypting/decrypting communication data sent/received by the communication apparatus;

a cipher processing unit for encrypting/decrypting the communication data using the session key; and a data sending/receiving unit for sending/receiving the communication data processed by the cipher processing unit.

3. The cryptosystem of claim 1 further comprising a group of communication apparatuses, wherein the key manager includes:

a communication apparatus group memorizing unit for memorizing a group of communication apparatuses; and a session key generating unit for generating the session key to be used in the group of communication apparatuses and outputting the session key to the group of communication apparatuses memorized in the communication apparatus group memorizing unit.

4. The cryptosystem of claim 3, wherein the key manager comprises a session key encrypting unit for encrypting the session key generated by the session key generating unit and a session key sending unit for sending the session key to the encryptor corresponding to the group memorized in the communication apparatus group memorizing unit, and wherein the encryptor further comprises a session key receiving unit for receiving the session key encrypted and sent by the session key sending unit of the key manager and a session key decrypting unit for decrypting the session key encrypted.

5. The cryptosystem of claim 1, wherein the encryptor comprises:

an encryption condition memorizing unit for memorizing an encryption condition of the communication data;

a condition judging unit for judging that the communication data is to be encrypted/decrypted based on the encryption condition, and wherein the key manager comprises an encryption condition setting unit for setting the encryption condition and sending the encryption condition to the encryptor to memorize in the encryption condition memorizing unit.

6. A cryptosystem comprising:

a communication apparatus;

an encryptor encrypting/decrypting communication data sent/received by the communication apparatus using a session key; and a key manager for managing the session key, wherein the encryptor comprises:
an encryption condition memorizing unit for memorizing an encryption condition of the communication data; and
a condition judging unit for judging that the communication data is to be encrypted/decrypted based on the encryption condition, and
wherein the key manager comprises an encryption condition setting unit for setting the encryption condition and sending the encryption condition to the encryptor to memorize in the encryption condition memorizing unit.

7. The cryptosystem of claim 6, wherein the encryption condition is set based on at least one communication apparatus of a communicating partner.

8. The cryptosystem of claim 6, wherein the encryption condition is set based on an application program which processes the communication data.

9. The cryptosystem of claim 6, wherein the encryption condition is set based on a communicating direction.

10. The cryptosystem of claim 6, wherein the encryptor includes a session key memorizing unit which memorizes a plurality of session keys, wherein the encryption condition indicates a session key to be used for encrypting the communication data, and wherein the condition judging unit determines which one of the plurality of session keys is to be used for encrypting/decrypting the communication data based on the encryption condition.

11. The cryptosystem of claim 6, wherein the encryptor comprises a mode switch for setting a communication mode wherein the communication mode is one of a mode in which communication data is encrypted/decrypted by the session key and a mode in which communication data is not encrypted/decrypted by the session key, wherein the key manager comprises a valid/invalid setting unit for setting the valid/invalid information showing validity/invalidity of the mode switch of the encryptor and sending the valid/invalid information to each of the encryptors, and wherein the encryptor further comprises a validity/invalidity judging unit for judging that the communication data is to be encrypted/decrypted based on the mode switch and the valid/invalid information.

12. A cryptosystem comprising:

a first cipher managing domain including a first key manager, a first encryptor, and a first communication apparatus; and a second cipher managing domain including a second key manager, a second encryptor, and a second communication apparatus, wherein the first key manager comprises:
a first session key table for memorizing a plurality of session keys; and
a first session key generating unit for generating a first local session key to be used in the first cipher managing domain and a common session key to be used for cipher communication between the first communication apparatus of the first cipher managing domain and the second communication apparatus of the second cipher managing domain, memorizing the first local session key and the common session key in the first session key table, and transmitting the common session key to the second key manager, and wherein the second key manager comprises:
a second session key table for memorizing a plurality of session keys; and
a second session key generating unit for receiving the common session key from the first key manager, memorizing the common session key in the second session key table, generating a second local session key to be used in the second cipher managing domain, and memorizing the second local session key in a part of the second session key table where the common session key is not memorized.

13. The cryptosystem of claim 12, further comprising a third cipher managing domain including a third key manager, a third encryptor, and a third communication apparatus, wherein the first session key generating unit generates a common session key used for cipher communication between the second communication apparatus of the second cipher managing domain and the third communication apparatus of the third cipher managing domain and transmits the common session key to the second key manager and the third key manager, wherein the third key manager comprises:
a third session key table for memorizing a plurality of session keys; and
a third session key generating unit for receiving the common session key from the first key manager, memorizing the common session key in the third session key table, generating a third local session key to be used in the third cipher managing domain, and memorizing the third session key in a part of the third session key memorizing unit where the common session key is not memorized.

14. A cryptosystem comprising:

a communication apparatus;

an encryptor encrypting/decrypting communication data sent/received by the communication apparatus using a session key; and a key manager managing the session key, wherein the encryptor comprises:
an encryption condition memorizing unit for memorizing an encryption condition of the communication data; and
a condition judging unit for judging that the communication data is to be encrypted/decrypted based on the encryption condition,
wherein the encryption condition includes at least one special pass condition for indicating the encryption condition for a special communication data, and a basic pass condition for all communication data except the special communication data matching the special pass condition.

15. The cryptosystem of claim 14, wherein the encryption condition is set based on an application program which processes the communication data.

16. The cryptosystem of claim 14, wherein the encryption condition is set based on at least one communication apparatus of a communicating direction.

17. The cryptosystem of claim 14, wherein the encryption condition is set based on at least one communication apparatus of a communicating partner.

18. The cryptosystem of claim 14, wherein the encryptor includes a session key memorizing unit which memorizes a plurality of session keys, and wherein the encryption condition indicates which session key to be used.

19. The cryptosystem of claim 14, wherein the encryptor further comprises:

at least one port for connecting the communication apparatus and the key manager; and a port condition memorizing unit for memorizing the basic pass condition and the special pass condition as a port condition for each port.

20. The cryptosystem of claim 19, wherein the key manager generates the port condition and distributes the port condition to the port condition memorizing unit of the encryptor.

* * * * *